US011217076B1

(12) United States Patent
Siminoff et al.

(10) Patent No.: US 11,217,076 B1
(45) Date of Patent: Jan. 4, 2022

(54) CAMERA TAMPERING DETECTION BASED ON AUDIO AND VIDEO

(71) Applicant: Amazon Technologies, inc., Seattle, WA (US)

(72) Inventors: James Siminoff, Pacific Palisades, CA (US); Michael Jason Mitura, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 16/259,601

(22) Filed: Jan. 28, 2019

Related U.S. Application Data

(60) Provisional application No. 62/623,852, filed on Jan. 30, 2018, provisional application No. 62/623,840, filed on Jan. 30, 2018.

(51) Int. Cl.
| | |
|---|---|
| *G08B 13/16* | (2006.01) |
| *G10L 25/30* | (2013.01) |
| *G06N 3/08* | (2006.01) |
| *H04N 7/18* | (2006.01) |
| *G10L 15/02* | (2006.01) |
| *G06N 20/00* | (2019.01) |
| *G10L 15/16* | (2006.01) |
| *G10L 15/20* | (2006.01) |

(52) U.S. Cl.
CPC ........... *G08B 13/1672* (2013.01); *G06N 3/08* (2013.01); *G06N 20/00* (2019.01); *G10L 15/02* (2013.01); *G10L 25/30* (2013.01); *H04N 7/181* (2013.01); *H04N 7/188* (2013.01); *G10L 15/16* (2013.01); *G10L 15/20* (2013.01)

(58) Field of Classification Search
CPC ...... G08B 13/1672; G10L 15/16; G10L 15/20
See application file for complete search history.

(56) References Cited

U.S. PATENT DOCUMENTS

| | | | |
|---|---|---|---|
| 2004/0181402 A1* | 9/2004 | Bartkowiak | H04Q 1/46 704/226 |
| 2009/0135010 A1* | 5/2009 | Fosty | G08B 13/1672 340/541 |
| 2017/0092268 A1* | 3/2017 | Kristjansson | G10L 15/16 |

FOREIGN PATENT DOCUMENTS

| | | | | |
|---|---|---|---|---|
| CN | 102592588 A | * | 7/2012 | |
| CN | 103871405 A | * | 6/2014 | |
| CN | 104021791 A | * | 9/2014 | |
| WO | WO-2013035537 A1 | * | 3/2013 | ........... G10L 19/018 |

OTHER PUBLICATIONS

Lee, Gil-beon, et al., Unified Camera Tamper Detection based on Edge and Object Information, Sensors, www.mdpi.com/journal/sensors, Received: Mar. 13, 2015 / Accepted: Apr. 27, 2015 / Published May 4, 2015, 17 pgs.

\* cited by examiner

*Primary Examiner* — Feng-Tzer Tzeng
(74) *Attorney, Agent, or Firm* — Greenberg Traurig, LLP

(57) ABSTRACT

Tampering with an audio/video (A/V) recording and communication device is detected based on audio data captured by a microphone and/or video data captured by a camera of the A/V recording and communication device. The detection of the tampering may be based on, for example, processing of the audio and/or video data. Additional data may be collected and/or other actions taken in response to detection of the tampering.

21 Claims, 21 Drawing Sheets

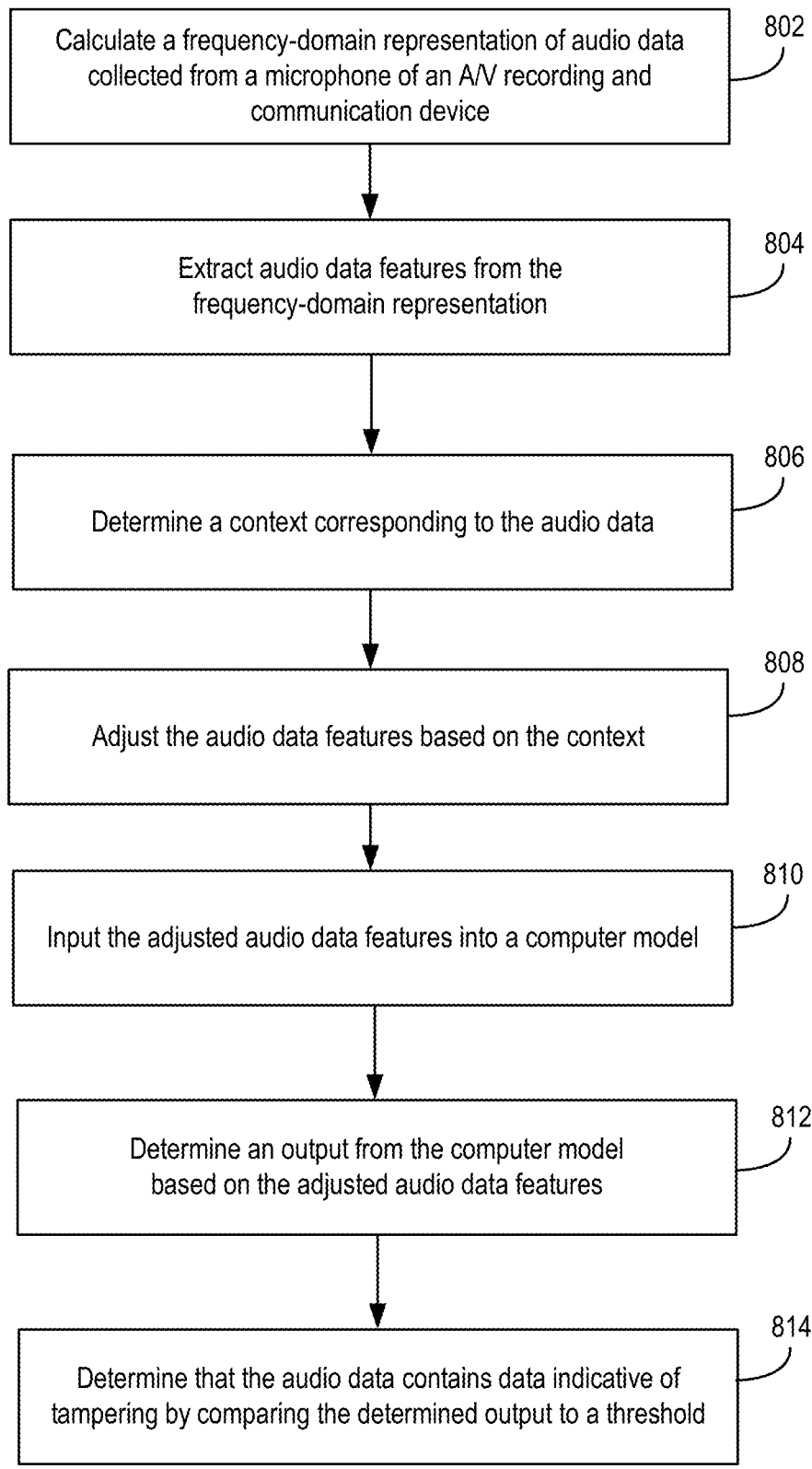

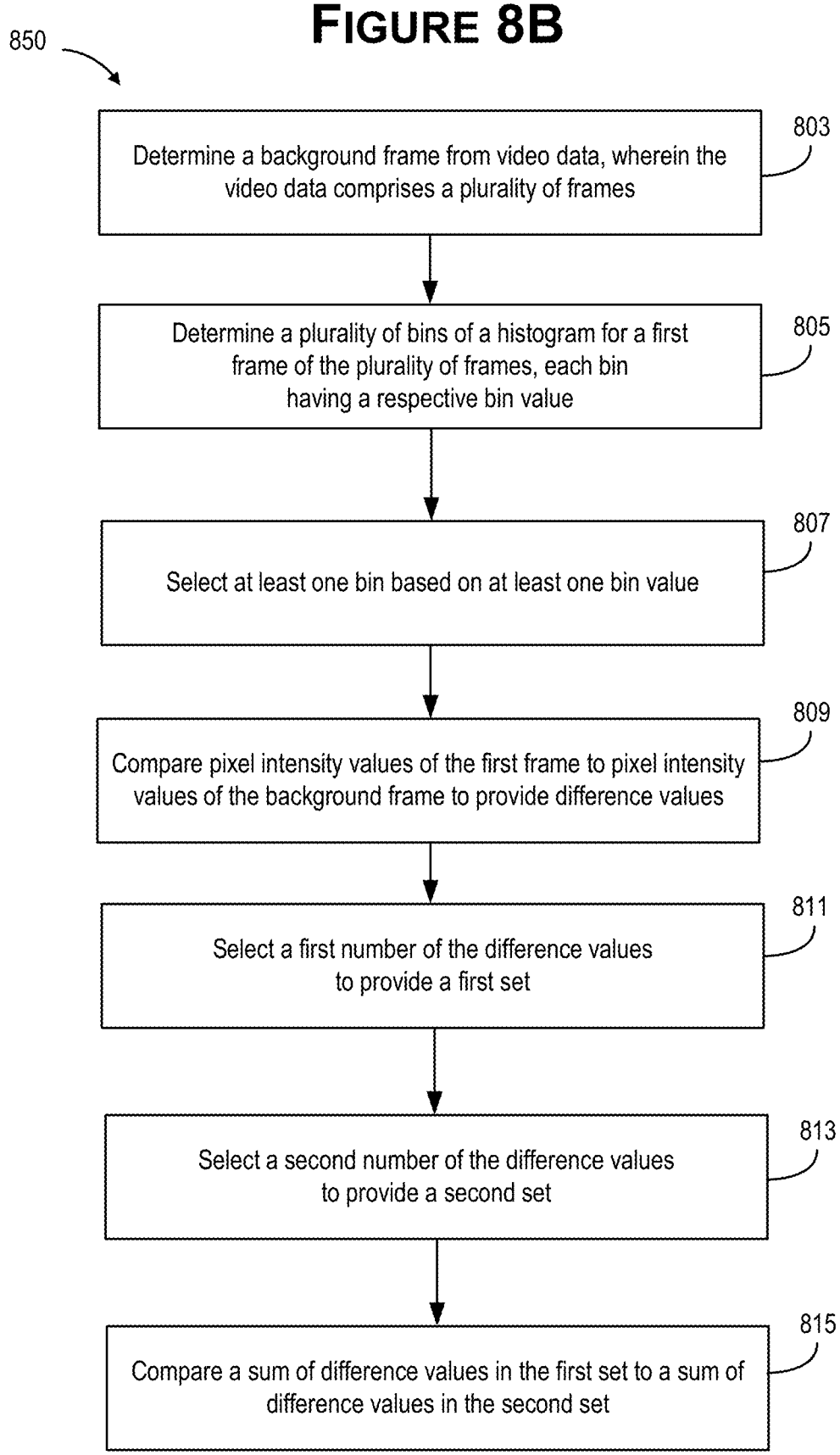

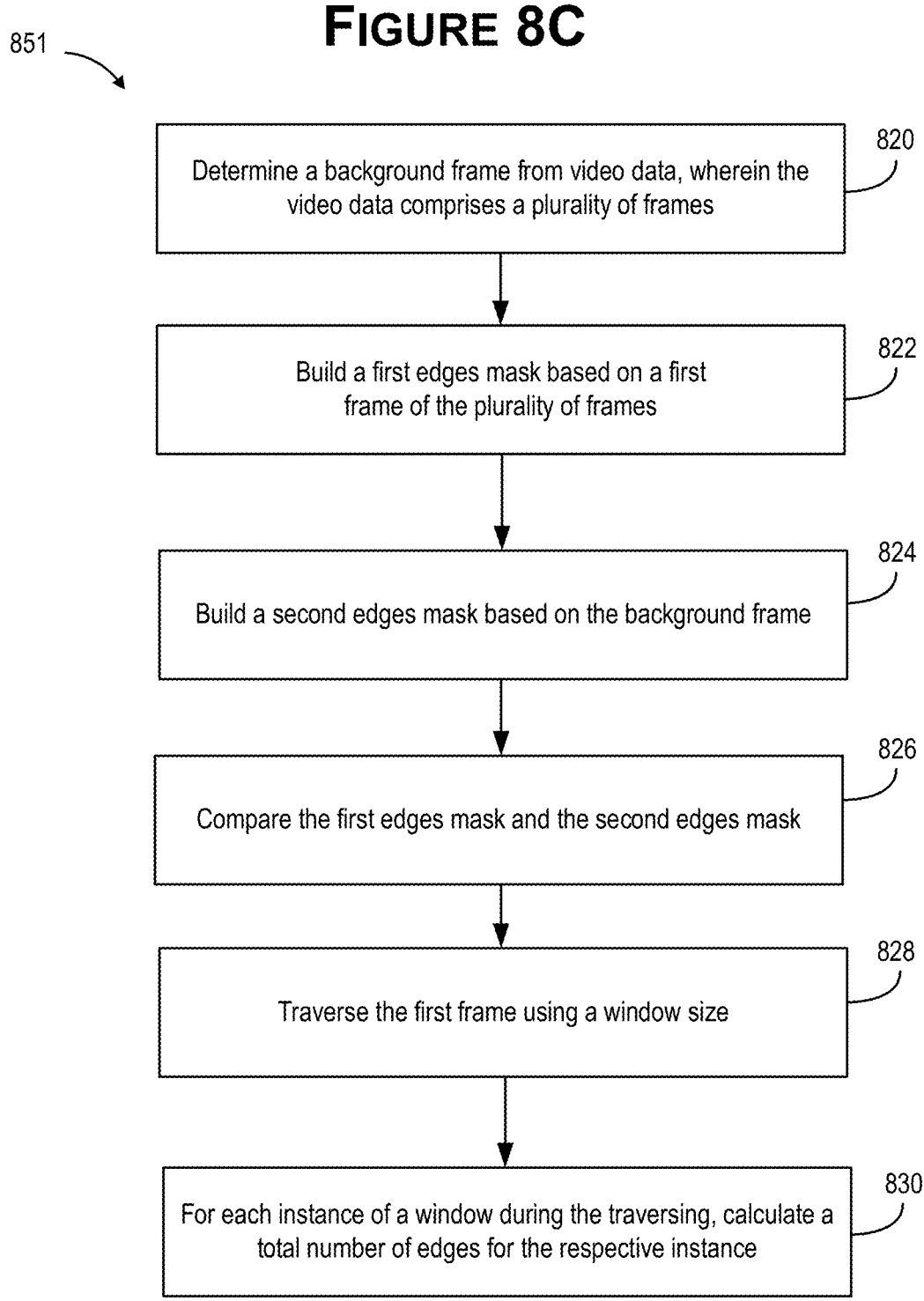

CAMERA TAMPERING DETECTION BASED ON AUDIO AND VIDEO

CROSS-REFERENCE TO RELATED APPLICATIONS

This application claims priority to provisional application Ser. No. 62/623,852, filed on Jan. 30, 2018, and to provisional application Ser. No. 62/623,840, filed on Jan. 30, 2018, the entire contents of each of which are hereby incorporated by reference.

BACKGROUND

Home security is a concern for many homeowners and renters. Those seeking to protect or monitor their homes often wish to have video and audio communications with visitors, for example, those visiting an external door or entryway. Audio/video (A/V) recording and communication devices, such as surveillance cameras, whether alone or integrated within other devices such as doorbells or lighting fixtures, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present detection of tampering based on audio data from a microphone and/or video data from a camera will be discussed in detail with an emphasis on highlighting the advantageous features. These embodiments depict the novel and non-obvious detection of tampering based on audio data from a microphone and/or video data from a camera shown in the accompanying drawings, which are for illustrative purposes only. These drawings include the following figures, in which like numerals indicate like parts:

FIG. 8A is a flow chart illustrating an example method of processing audio data collected by an A/V recording and communication device, where the processing determines that the audio data contains data indicative of tampering, according to various aspects of the present disclosure;

FIG. 8B is a flow chart illustrating an example method of processing video data collected by an A/V recording and communication device using histogram analysis, according to various aspects of the present disclosure;

FIGS. 8C and 8D illustrate flow charts of example methods of processing video data collected by an A/V recording and communication device using edge analysis, according to various aspects of the present disclosure;

DETAILED DESCRIPTION

Figure 1:
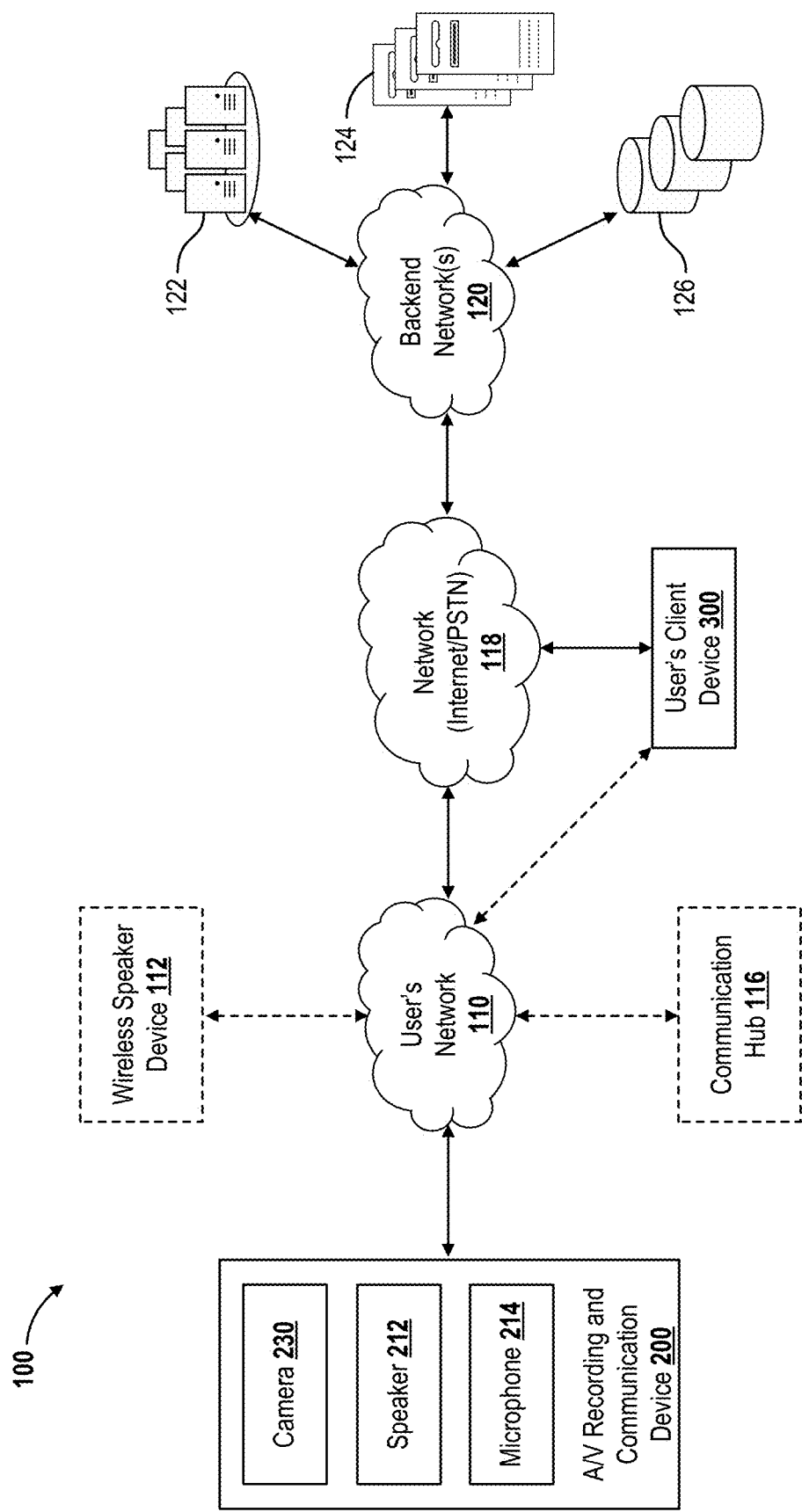
FIG. 1 is a functional block diagram illustrating a system for streaming and storing audio/video (A/V) content captured by an A/V recording and communication device according to various aspects of the present disclosure.

The following detailed description describes the present embodiments with reference to the drawings. Example methods, apparatuses, and systems described herein are not intended to limit the scope of the description to the precise form or forms detailed herein. Instead the following description is intended to be illustrative so that others may follow its teachings.

One of the concerns regarding home security for many homeowners and renters is suspicious activity that occurs on or near (e.g., in the neighborhood of) a building or other property of the homeowner or renter. One form of suspicious activity is tampering by one or more persons with a security and/or monitoring device (e.g., a camera) that is intended to protect, for example, a home or business location. The tampering may be, for example, intended to disable or otherwise interfere with the proper operation and/or ability of the security and/or monitoring device to detect criminal and/or other improper or undesired behavior and/or activities. Such behavior and/or activity can be detected based at least in part on a determination that tampering has occurred and/or is presently occurring.

The present disclosure includes methods for determining an occurrence of tampering based on audio data collected by a microphone and/or video data from a camera of one or more A/V recording and communication devices. One or more of these devices may be located on the property of the homeowner or renter, and/or one or more of these devices may be located geographically proximate the property (e.g., one or more A/V recording and communication devices located in a neighborhood of the property).

The determination of an occurrence of tampering may be based on, for example, processing of the audio data (e.g., by extracting and analyzing audio features as described below). In one example, the audio data is collected by a microphone of an A/V recording and communication device. The audio data can include, for example, characteristic sounds associated with the tampering of, for example, a video camera by a perpetrator. Processing of the audio data can determine, for example, that these characteristic sounds are similar to and/or characteristic of prior audio data that has been stored in a database and/or used to train a computer model that analyzes the audio data. In one example, the database can include audio data corresponding to and/or collected from prior instances of known tampering (e.g., audio data collected from A/V recording and communication devices for which tampering is known to have previously occurred can be stored in a database, and an audio data analysis algorithm can be created to match this prior known tampering). In various cases, processing of the audio data can be, for example, performed on an A/V recording and communication device that collects the audio data and/or performed on other computing devices (e.g., a server in communication with the A/V recording and communication device over a wired and/or wireless network).

In various embodiments, the determination of an occurrence of tampering may also be based on, for example, processing of the video data (e.g., by analyzing one or more frames of the video data as described below). In one example, the video data is collected by a camera of an A/V recording and communication device. The video data can indicate, for example, occlusion of images captured by a camera (e.g., caused by a blocking or an obscuring of a lens of the camera) that is associated with the tampering of, for example, the camera by a perpetrator.

In some embodiments, one or more frames of the video data captured by the camera is analyzed to detect, for example, occlusion. This frame analysis can include, for example, histogram and/or edge analysis of one or more of the frames. A result from the histogram analysis and/or edge analysis can be used, for example, to determine that the video data contains data indicative of tampering.

In some embodiments, processing of the video data can determine, for example, that characteristics of the video data (e.g., video features extracted from the newly-captured video data) are similar to characteristics of prior video data that has been stored in a database and/or used to train a computer model that analyzes the newly-captured video data. In one example, the database can include video data corresponding to and/or collected from prior instances of known tampering (e.g., video data collected from A/V recording and communication devices for which tampering is known to have previously occurred can be stored in a database, and a video data analysis algorithm can be created to match this prior known tampering). In various cases, processing of the video data can be, for example, performed on an A/V recording and communication device that collects the video data and/or performed on other computing devices (e.g., a server in communication with the A/V recording and communication device over a wired or wireless network).

In some cases, processing of the audio and/or video data can be, for example, supplemented by analysis of other data, which analysis is used at least in part to make a determination of an occurrence of tampering. For example, video data can be collected from a camera of an A/V recording and communication device, and analysis of the video data can determine that the camera is moving, which may indicate tampering and supplement determinations of tampering made based on audio data. In another example, audio data can be collected from a microphone of an A/V recording and communication device, and analysis of the audio data can determine that the camera is being touched or otherwise tampered with and supplement determinations of tampering made based on video data. In another example, data from other sensors can be collected in addition to or alternatively to the video and/or audio data. These other sensors can include, for example, passive infrared sensors (PIRs) that can be used, for example, to detect motion of a person and/or other object.

As a result of a determination of an occurrence of tampering, one or more communications can be transmitted to a computing device (e.g., a client device) associated with the homeowner or renter and/or another user, a communication hub (e.g., a premises security hub), a monitoring server, a centralized security system (e.g., a security system that is networked to receive audio, image, and/or other data from multiple A/V recording and communication devices, where each device is associated with a different user), and/or another computing device.

In addition, or alternatively, one or more other actions can be performed as a result of a determination of an occurrence of tampering. These actions may include, for example, causing computing or other functions to occur on devices other than the A/V recording and communication device(s) from which audio and/or video data was collected and used to determine the occurrence of tampering. These functions may include, for example, activation of a camera on one or more other A/V recording and communication devices to collect video data, and/or causing initiation of audio and/or video data streaming or other providing of audio and/or video data from one or more A/V recording and communication devices (e.g., including the devices that collected the video data used to detect the tampering). These functions may also include, for example, one or more functions performed by the communication hub, the monitoring server, and/or the centralized security system (e.g., additional signal processing of collected audio data and/or video data).

Another action performed as a result of a determination of an occurrence of tampering may include, for example, sending a notification to a homeowner or other user associated with one or more of the A/V recording and communication devices above. Yet other actions performed as a result of the determination may include, for example, automatically arming a security system and/or sounding an alarm (and/or other bell or sound, such as a doorbell) that is associated with the A/V recording and communication device that collects the audio and/or video data used to determine the occurrence of tampering. In some cases, other A/V recording and communication devices (e.g., in the same neighborhood of the A/V recording and communication device that collects the audio and/or video data used to determine the occurrence of tampering) and/or their associated security system(s) can be automatically armed and/or have an associated alarm sound activated.

FIG. 1 discloses an example system 100 of the present disclosure. The system includes an A/V recording and communication device 200, which includes a camera 230, a speaker 212, and a microphone 214, among other components. An example A/V recording and communication device is shown and described in more detail with respect to FIG. 2.

While the present disclosure provides numerous examples of methods and systems including A/V recording and communication doorbells, the present embodiments are equally applicable for A/V recording and communication devices 200 other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. An example A/V recording and communication security camera may further omit other components. In another example, the present embodiments may include one or more A/V recording and communication floodlight controllers instead of, or in addition to, one or more A/V recording and communication doorbells.

The A/V recording and communication device 200 may be located near the entrance to a structure (not shown), such as a dwelling, a business, a storage facility, etc. The A/V recording and communication device 200 includes a camera 230, a speaker 212, and a microphone 214. The camera 230 may comprise, for example, a high definition (HD) video camera, such as one capable of capturing video images at an image display resolution of 720p, 1080p, 2120p or any other image display resolution. While not shown, the A/V recording and communication device 200 may also include other hardware and/or components, such as a housing, a communication module (which may facilitate wired and/or wireless communication with other devices), one or more motion sensors (and/or other types of sensors), a button, etc. The A/V recording and communication device 200 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth herein.

With further reference to FIG. 1, the A/V recording and communication device 200 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 may be connected to another network 118, which may comprise, for example, the Internet and/or a public switched telephone network (PSTN). As described below, the A/V recording and communication device 200 may communicate with the user's client device 300 via the user's network 110 and, optionally, the network 118 (Internet/PSTN). The user's client device 300 may comprise, for example, a mobile telephone (which may also be referred to as a cellular telephone), such as a smartphone, a personal digital assistant (PDA), or another communication device. The user's client device 300 comprises a display (not shown) and related components capable of displaying streaming and/or recorded video images. The user's client device 300 may also comprise a speaker and related components capable of broadcasting streaming and/or recorded audio, and may also comprise a microphone.

The A/V recording and communication device 200 may also communicate, via the user's network 110 and the network 118 (Internet/PSTN), with a backend network(s) 120 of servers and/or backend devices, such as (but not limited to) one or more remote storage devices 126 (which may be referred to interchangeably as "cloud storage device(s)"), one or more backend servers 124, and one or more backend APIs 122. While FIG. 1 illustrates the storage device 126, the server 124, and the backend API 122 as components separate from the network 120, it is to be understood that the storage device 126, the server 124, and/or the backend API 122 may be considered to be components of the network 120, in an embodiment.

The network 118 may be any wireless network or any wired network, or a combination thereof, configured to operatively couple the above-mentioned modules, devices, and systems as shown in FIG. 1. For example, the network 118 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (who may be referred to interchangeably as "visitor," "intruder," "burglar," or other terms) arrives at the A/V recording and communication device 200, the A/V recording and communication device 200 detects the visitor's presence and begins capturing video images within a field of view of the camera 230. The A/V communication device 200 may also capture audio through the microphone 214. The A/V recording and communication device 200 may detect the visitor's presence by detecting motion using the camera 230 and/or a motion sensor (e.g., one or more passive infrared sensors (PIRs) or any other type of motion sensor), and/or by detecting that the visitor has pressed a front button of the A/V recording and communication device 200 (e.g., if the A/V recording and communication device 200 is a doorbell).

In response to the detection of the visitor, the A/V recording and communication device 200 may send an alert to the user's client device 300 (FIG. 1) via the user's network 110 and the network 118. The A/V recording and communication device 200 also sends streaming video, and may also send streaming audio, to the user's client device 300. If the user answers the alert, two-way audio communication may then occur between the visitor and the user through the A/V recording and communication device 200 and the user's client device 300. The user may view the visitor throughout the duration of the call, but the visitor cannot see the user (unless the A/V recording and communication device 200 includes a display, which it may in some embodiments).

The video images captured by the camera 230 of the A/V recording and communication device 200 (and the audio captured by the microphone 214) may be uploaded to the cloud and recorded on the remote storage device 126 (FIG. 1). In some embodiments, the video and/or audio may be recorded on the remote storage device 126 even if the user chooses to ignore the alert sent to the client device 300.

With further reference to FIG. 1, the system 100 may further comprise a backend API 122 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicates with one another using their public APIs. In some embodiments, the API backend may hold the bulk of the user data and offer the user management capabilities, leaving the clients to have very limited state.

The backend API 122 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

In some embodiments, the system 100 of FIG. 1 also includes a wireless speaker device 112. The wireless speaker device 112 may be capable of communicating over one or more networks. When connected to the user's network 110, the wireless speaker device 112 may serve to produce an audible sound responsive to the A/V recording and communication device 200 receiving an input (e.g., a visitor pressing the doorbell button on the A/V recording and communication device 200).

The wireless speaker device 112 may connect to the user's network 110 via Wi-Fi, in one aspect of the present disclosure. The wireless speaker device 112 may also communicate directly with, and communicate with other devices via, a communication hub 116. Other communication protocols and/or standards may also be used. The wireless speaker device 112 may be a stand-alone product or component capable of emitting an audible sound, amongst other functions, to a user within audible range of the wireless speaker device 112.

In an example operation, a user pressing a button on the A/V recording and communication device 200 causes the transmission of a message or signal to a computing device over a network. That computing device may then echo that message, or transmit a different message, to the wireless speaker device 112. That message may, among other things, include instructions that cause the wireless speaker device to produce one or more audible sounds. Other example wireless speaker devices may be described in greater detail below.

In some embodiments, the system 100 further includes communicatively coupled thereto the communication hub 116. The communication hub 116 may be capable of communicating directly (e.g., via Wi-Fi Direct, Bluetooth, Zigbee, etc.), and/or via the user's network 110, with the A/V recording and communication device 200, the client device 300, the wireless speaker 112, other devices present within the user's home, and/or other devices across the network 118.

In some implementations, the communication hub 116 is a "smart" hub capable of facilitating communication among two or more devices across a network. For example, the communication hub 116 may relay information between the A/V recording and communication device 200 and the user's client device 300, to facilitate bidirectional audio and/or video transmissions therebetween (e.g., establishing two-way audio communication between a visitor at the A/V recording and communication device 200 and the user's client device 300) without the need of a backend server device.

The communication hub 116 may also provide device internetworking functionality, allowing one device to communicate to another device without a separate backend server or computing device. For instance, two A/V recording and communication devices 200 (e.g., one at the front door and one at the back door of a user's home) may communicate to one another through the communication hub 116. One A/V recording and communication device 200 may, upon experiencing a triggering event, broadcast a message to other A/V recording and communication devices 200 in the user's network 110, instructing those devices to carry out some action. In this manner, device-to-device cooperation may be achieved, without requiring backend server interaction (although, backend server communication may also occur).

In some embodiments, the A/V recording and communication device 200 and/or the communication hub 116 may comprise part of a broader home or premises security system. In such embodiments, the system 100 may further include one or more security sensors (not shown). The security sensors may include, for example, door open sensors, motion sensors, glass break sensors, and the like. In such embodiments, the communication hub 116 may further act as a control system for the security sensors and may activate and deactivate the security sensors, may send alerts to the user client device 300 responsive to data from the security sensors (e.g., data indicative of an intrusion), may output alerts to a monitoring service or monitoring center responsive to data from the security sensors, and/or may trigger an audible or other alarm (e.g., on the wireless speaker device 112) responsive to data from the security sensors. In various embodiments, the communication hub 116 may be configured to alter a state of the security system. For example, the communication hub may be configured to alter the state of the security system from an unarmed state, in which data from the security sensors, such as data indicative of a door or window being opened, is not indicative of an intrusion, to an armed state, in which data from one or more of the security sensors is indicative of an intrusion.

Figure 2:
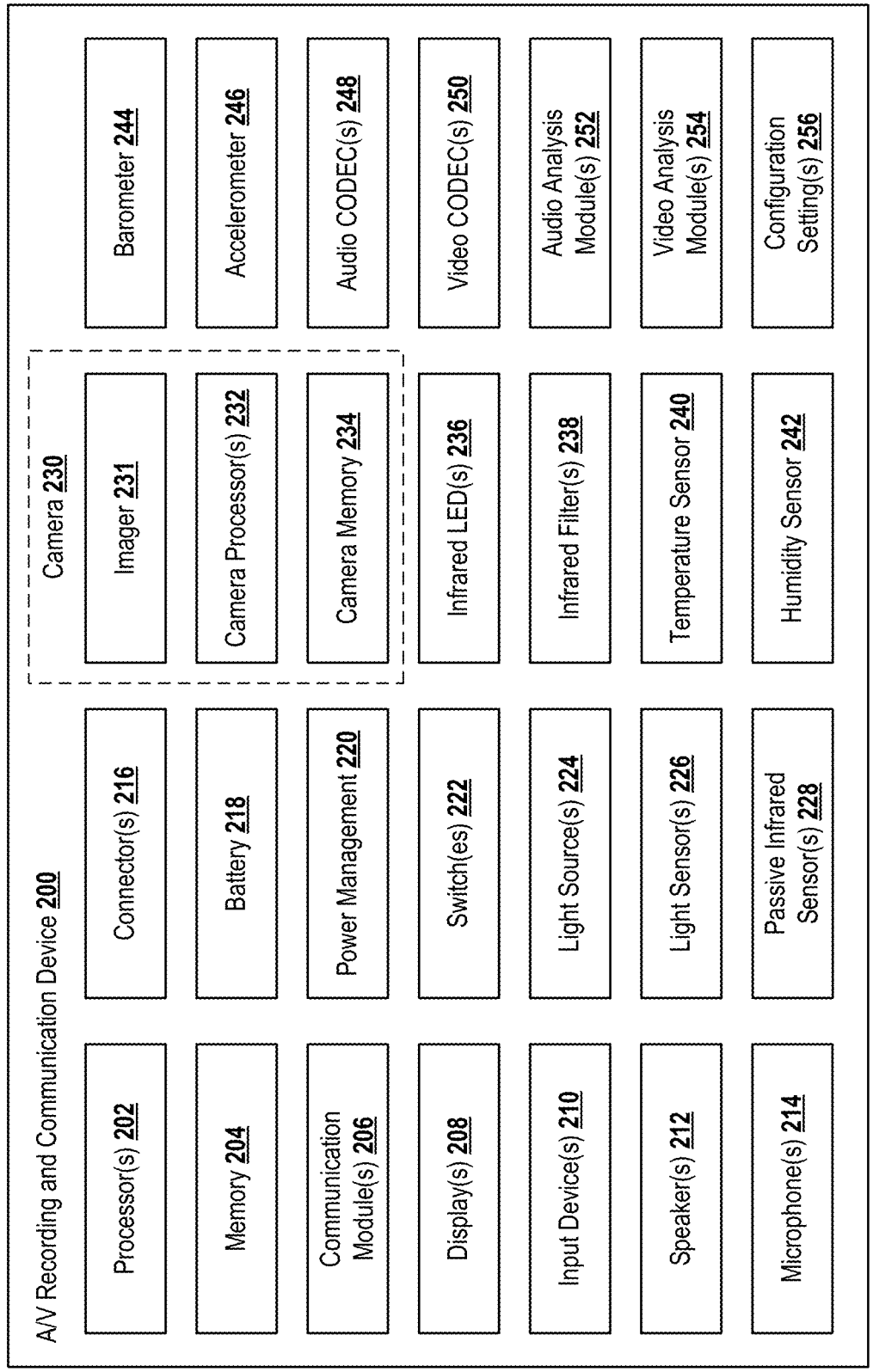
FIG. 2 is a functional block diagram of the components of the A/V recording and communication device of FIG. 1 according to various aspects of the present disclosure.

FIG. 2 is a functional block diagram of the components within or in communication with, an example A/V recording and communication device 200, according to an aspect of the present embodiments. The A/V recording and communication device 200 may include an accelerometer 246, a barometer 244, a humidity sensor 242, and a temperature sensor 240, which may collectively be embodied in a bracket printed circuit board (PCB), in some embodiments. The accelerometer 246 may be one or more sensors capable of sensing motion and/or acceleration. The barometer 244 may be one or more sensors capable of determining the atmospheric pressure of the surrounding environment in which the bracket PCB may be located. The humidity sensor 242 may be one or more sensors capable of determining the amount of moisture present in the atmospheric environment in which the bracket PCB may be located. The temperature sensor 240 may be one or more sensors capable of determining the temperature of the ambient environment in which the A/V recording and communication device may be located. In some embodiments, the bracket PCB or other implementation of the accelerometer 246, a barometer 244, a humidity sensor 242, and/or temperature sensor 240 may be located outside the housing of the A/V recording and communication device 200 so as to reduce interference from heat, pressure, moisture, and/or other stimuli generated by the internal components of the A/V recording and communication device 200.

The A/V recording and communication device 200 may also include a light sensor(s) 226, one or more light sources 224, such as LEDs, one or more speaker(s) 212, and a microphone(s) 214, one or more of which may be implemented on a front PCB, in an embodiment. The light sensor(s) 226 may be one or more sensors capable of detecting the level of ambient light of the surrounding environment in which the A/V recording and communication device 200 may be located. The light sources 224 may be one or more light-emitting diodes (LEDs) capable of producing visible and/or infrared light when supplied with power. The speaker(s) 212 may be any electromechanical device capable of producing sound in response to an electrical signal input. The microphone(s) 214 may include an acoustic-to-electric transducer or sensor capable of converting sound waves into an electrical signal.

The speaker(s) 212 and the microphone(s) 214 may be coupled to the camera processor 232 through one or more audio CODEC(s) 248. For example, the transfer of digital audio from the user's client device 300 and the speaker(s) 212 and the microphone(s) 214 may be compressed and decompressed using the audio CODEC(s) 248, coupled to the camera processor 232. Once compressed by the audio CODEC(s) 248, digital audio data may be sent through a communication module 206 to the network 118, routed by the one or more servers 124, and delivered to the user's client device 300. When the user speaks, after being transferred through the network 118, digital audio data is decompressed by the audio CODEC(s) 248 and emitted to the visitor via the speaker(s) 212.

The A/V recording and communication device 200 may further include one or more video CODEC(s) 250 and/or software instructions to leverage video CODEC(s) 250 for the purposes of compression and/or decompression of images and/or videos. In an example operation, an imager 231 captures light from a scene, which is then interpreted and processed by one or more camera processors 232 to convert captured light signals into raw image/video data. The camera processor(s) 232 and/or processor(s) 202 may then compress that raw image/video data using the one or more video CODEC(s) 250, to reduce the amount of data stored or transmitted by the A/V recording and communication device 200. Any combination of known video CODECs may be included within the video CODEC(s) 250. In some embodiments, the video CODEC(s) 250 alternatively or additionally includes special purpose or proprietary video CODEC(s).

With further reference to FIG. 2, the A/V recording and communication device 200 may further include a power management module 220, a processor(s) 202 (which may also be referred to as "microcontroller," "CPU," or "controller"), the communication module 206, and power PCB memory 204, one or more of which may be implemented on a main PCB or power PCB, in an embodiment. In certain embodiments, the power management module 220 may comprise an integrated circuit capable of arbitrating between multiple voltage rails, thereby selecting the source of power for the A/V recording and communication device 200. The battery 218 and/or the connector(s) 216 may each provide power to the power management module 220. The power management module 220 may have separate power rails dedicated to the battery 218, the spring contacts, and the connector(s) 216. The power management module 220 may also serve as a conduit for data between the connector(s) 216 and the processor(s) 202.

The connector(s) 216 may be electrically coupled with an AC/DC adapter, in some embodiments. The A/V recording and communication device 200 may thus be configured to connected to a source of external AC (alternating-current) power, such as a household AC power supply (which may also be referred to as AC mains). The AC power supply may provide a voltage in the range of 110-220 VAC, for example. The incoming AC power may be received at the connector(s) 216 from an AC/DC adapter, which may convert the incoming AC power to DC (direct-current) and may step down the voltage from 110-220 VAC to a lower output voltage of about 12 VDC and an output current of about 2 A, for example. In various embodiments, the output of an AC/DC adapter may be in a range of from about 9V to about 15V, for example, and in a range of from about 0.5 A to about 5 A, for example. These voltages and currents are only examples provided for illustration and are not limiting in any way.

With further reference to FIG. 2, in certain embodiments the processor(s) 202 may comprise an integrated circuit including a processor core, memory, and programmable input/output peripherals. The processor(s) 202 may receive input signals, such as data and/or power, from the passive infrared sensor(s) 228 (or any other type of motion sensor(s)), the bracket PCB, the power management module 220, the light sensor(s) 226, the microphone(s) 214, and/or the communication module 206, and may perform various functions as further described below. When the processor(s) 202 is triggered by the passive infrared sensor(s) 228, the processor(s) 202 may be triggered to perform one or more functions. When the light sensor(s) 226 detects a low level of ambient light, the light sensor(s) 226 may trigger the processor(s) 202 to enable "night vision," as further described below. The processor(s) 202 may also act as a conduit for data communicated between various components and the communication module 206.

The display(s) 208 may be any electronic video display, such as a liquid-crystal display (LCD). The display(s) 208 may permit the A/V recording and communication device 200 to show information to visitors, output status information of the A/V recording and communication device 200 for users, and/or otherwise serve to communicate information to people (e.g., display a message to a hearing-impaired visitor). In some implementations, the display(s) 208 include embedded therein a digitizer, capacitive layer, or a resistive layer that allows the display(s) 208 to act as a touchscreen.

The input device(s) 210 may be any kind of human interface device (HID) that receives input from a user and translates that input into computer-understandable information. Some example input units include a keyboard, a mouse, a touchpad, and/or a touchscreen, among other possible input devices. In some instances, the input device(s) 210 may refer to an on-screen keyboard or pointer device of a touchscreen. A user may interact with input device(s) 210 to enter a text input, and/or press a button (physical or virtual), which may trigger execution of a command. Regardless of the kind of input device used, the input device(s) 210 may provide an interface through which a user can interact with A/V recording and communication devices of the present application.

For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 231 to see primarily infrared light as opposed to visible light. When the light sensor(s) 226 detects a low level of ambient light (which may comprise a level that impedes the performance of the imager 231 in the visible spectrum), the infrared LED(s) 236 may shine infrared light through the A/V recording and communication device 200 enclosure out to the environment, and the infrared filter(s) 238 may enable the imager 231 to see this infrared light as it is reflected or refracted off of objects within the field of view of the A/V recording and communication device 200. This process may provide the A/V recording and communication device 200 with the "night vision" function mentioned above.

With further reference to FIG. 2, the communication module 206 may comprise an integrated circuit including processor core(s), memory, and programmable input/output peripherals. The communication module 206 may also be configured to transmit data wirelessly to a remote network device, and may include one or more transceivers (not shown). The communication module 206 may enable wired and/or wireless communication through one or more wired and/or wireless networks, such as, without limitation, Ethernet, Wi-Fi, cellular, Bluetooth, and/or satellite networks. The communication module 206 may receive inputs, such as power and/or data, from the camera PCB, the processor(s) 202, input device(s) 210 including buttons, and/or the power PCB memory 204. When one or more buttons are pressed, the communication module 206 may be triggered to perform one or more functions. When the reset button is pressed, the communication module 206 may be triggered to erase any data stored at the power PCB memory 204 and/or at the camera memory 234. The communication module 206 may also act as a conduit for data communicated between various components and the processor(s) 202. The power PCB memory 204 may comprise flash memory configured to store and/or transmit data. For example, in certain embodiments the power PCB memory 204 may comprise serial peripheral interface (SPI) flash memory.

In some embodiments, the A/V recording and communication device 200 includes switch(es) 222, which can selectively couple and decouple two or more electric terminals. For instance, the switch(es) 222 may include a switch—controlled by the processor(s) 202 or another component of the A/V recording and communication device 200—that serves to couple and decouple a light source with a power source. As a specific example, the switch(es) 222 may include a relay that, when activated, energizes a flood light. The switch(es) 222 may include relays, transistors, manual switches, and/or some combination thereof.

The light source(s) 224 may include any type of light bulb, light emitting diode (LED), LASER, or other light source of any wavelength or combination of wavelengths. In some embodiments, the light source(s) 224 includes infrared LEDs to provide non-human-detectable illumination of a scene, enabling a "night vision" function of the A/V recording and communication device 200. Other light source(s) 224 may provide information to a user or visitor (e.g., indicators for charging, recording, etc.). Some light source(s) 224 may serve as an alert or visual siren (e.g., alternating flashing LEDs). Any combination of light sources may be included within the light source(s) 224 without departing from the scope of the present application.

The A/V recording and communication device 200 may include functionality for the local processing of information, without the need of a server or backend computing device. In some embodiments, the A/V recording and communication device 200 includes an audio analysis module(s) 252, a video analysis module(s) 254, and configuration settings 256, among other special purpose software units. Each of these modules may be stored as instructions and/or data on a memory device of the A/V recording and communication device 204, such as the memory 204, EEPROMs, and/or other non-volatile memory thereon. The specific configuration and software used to instantiate these modules may be modifiable and updateable (e.g., may be updated from a remote computing device over a network).

The audio analysis module(s) 252 may be operable to analyze audio signals or digital audio data to extract or quantify qualities of those audio signals or digital audio data. In some cases, the audio analysis module(s) 252 might include analog electrical analysis prior to digitizing audio signals. As one example, the audio analysis module(s) 252 may include analog filters (e.g., low-pass filters, high-pass filters, band-pass filters, etc.), which can isolate a particular range of frequencies within an audio signal prior to being digitized. Such analog filters may reduce latency and/or computational complexity required to perform spectral analysis.

The audio analysis module(s) 252 may also include one or more digital analysis modules. Such modules—which might use known audio analysis techniques and/or proprietary techniques described in greater detail herein—may conduct spectral analyses, statistical analyses (e.g., amount of randomness), or amplitude determinations (e.g., relative volume of a sound), among other analyses. Higher level functions may also be implemented within the audio analysis module(s) 252. For instance, the audio analysis module(s) 252 may carry out pattern detection, pattern matching, speech detection, speaker identification, and/or other proprietary sound detection, which may be described in greater detail below.

The video analysis module(s) 254 may be configured to analyze images and/or video data to identify the contents of images/video, classify portions of images/videos with some label, and/or otherwise derive information from images and/or video for subsequent use thereof. For example, a particular triggering event (e.g., sounding an alarm) may occur based on the detection of a particular object within an image or video feed. The video analysis module(s) 254 provide image and video analysis tools that enable the A/V recording and communication device to perform local processing of captured images without the need for backend processing. Such "onboard" video processing may be preferred over backend processing in circumstances where transmission latency over a wide area network would substantially reduce the efficacy of a particular method. The video analysis module(s) 254 may generally perform "computer vision" operations, including known techniques and/or novel techniques as described herein.

In some cases, the audio analysis module(s) 252 and the video analysis module(s) 254 may include software libraries, circuits, CODECs, classifiers, filters, machine learning tools, and/or other modules that are commonly used in audio and/or video processing. In other cases, the audio analysis module(s) 252 and/or the video analysis module(s) 254 are proprietary software and/or hardware modules that carry out application-specific audio/video analyses. For example, a particular module may be a classifier that determines whether a video frame represents a daytime scene or a nighttime scene. Such specific audio/video classifiers, models, or modules may be described in greater detail below.

The audio analysis module(s) 252 and the video analysis module(s) 254 may further include modules for compressing audio and/or video data. For instance, an audio segment may be compressed by reducing the bitrate of that audio segment, thereby shrinking the amount of data representing that audio segment at the cost of audio quality. Likewise, a video clip may be compressed by reducing a video clip's resolution and/or its per-pixel bitrate (e.g., color depth). In other cases, a video clip might be compressed using "P-frame" or "delta-frame" techniques, in which only changes between successive video frames are encoded. Any type of audio/video compression techniques may be employed on the A/V recording and communication device 200 without departing from the scope of the present disclosure.

The A/V recording and communication device 200 may also include configuration setting(s) 256. In some embodiments, the configuration setting(s) 256 represent the "state" of the A/V recording and communication device 200. For example, the A/V recording and communication device 200 may be placed into an "armed" mode when its owner is away from home. A configuration file, flag, or the like may be modified, which might affect some aspects of the A/V recording and communication device's 200 operation. For instance, an A/V recording and communication device 200 in "armed" mode may produce a siren sound in response to a triggering event, which would not otherwise occur if the A/V recording and communication device 200 was not in the "armed" mode.

The configuration setting(s) 256 may also represent a particular configuration, parameters, weightings, or other settings of a quantitative model, classifier, machine learning algorithm, or the like. As one example, a support vector machine (SVM) may be represented as a hyperplane that divides two regions of vector space into two respective classifications. The coefficients defining the hyperplane may be included within the configuration setting(s) 256. As another example, an artificial neural network (ANN) may comprise a set of interconnected nodes, with specific weights between each node connection. These connection weights may also be included within the configuration setting(s) 256.

The A/V recording and communication device 200 may carry out methods for detecting a particular audio event or a particular object within a video frame. In some implementations, the A/V recording and communication device 200 includes a classifier or machine learning algorithm that is executed locally on the processor(s) 202. The parameters or weightings of the classifier or machine learning algorithm—that is, the configuration setting(s) 256—may be updated (e.g., received from a computing device via the communication module(s) 206). Thus, the configuration setting(s) 256 may include parameters, coefficients, or weightings that enable or improve the audio analysis module(s) 252 and the video analysis module(s) 254 to carry out particular tasks, as may be described in greater detail herein.

In some cases, various embodiments of the processor(s) 202 and/or the memory 204 may include thereon instructions that, upon execution, implement computer vision and/or image or video analysis functions. Alternatively, or additionally, the A/V recording and communication device 200 might include one or more integrated circuits in communication with the processor(s) 202 to carry out aspects of computer vision functions, such as object recognition, image or video compression, and/or face detection, among other functions.

As described herein, "computer vision" refers to methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 3, embodiments of the present A/V recording and communication device 200 may include a computer vision module. The computer vision module may include any of the components (e.g., hardware) and/or functionality described herein with respect to computer vision, including, without limitation, one or more cameras, sensors, and/or processors. In some of the present embodiments, the microphone 246, the camera, and/or the imaging processor 240 may be components of the computer vision module.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; estimation of application-specific parameters, such as object pose or object size; image recognition—classifying a detected object into different categories; image registration—comparing and combining two different views of the same object.

Decision making—Making the final decision required for the application, for example match/no-match in recognition applications.

One or more of the present embodiments may include a vision processing unit (which may be a component of the computer vision module). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many-core DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches: geometric, which looks at distinguishing features; or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the video analysis module(s) 254, the imager 231, and/or the processor(s) 202 or 232 may receive information about the person using any one, or any combination of more than one, of the foregoing biometrics.

Additionally, or alternatively, the A/V recording and communication device 200 may also transmit captured audio/video to a computing device, such as a backend server, over a network for subsequent processing thereof. Such a backend server may, in some cases, conduct audio, image, and/or video analyses to determine the presence or absence of some object or event. If a detection is made, the backend server may then transmit messages to the A/V recording and communication device 200, a client device 300, and/or other devices. In some instances, transmitted audio/video may be stored in a storage device (e.g., in a database), to serve as training data for the purpose of generating and/or improving a classifier or machine learning tool.

With further reference to FIG. 2, the A/V recording and communication device 200 may comprise components that facilitate the operation of a camera. For example, an imager 231 may comprise a video recording sensor and/or a camera chip. In one aspect of the present disclosure, the imager 231 may comprise a complementary metal-oxide semiconductor (CMOS) array, and may be capable of recording high definition (e.g., 720p, 2120p, etc.) video files. A camera processor 232 may comprise an encoding and compression chip. In some embodiments, the camera processor 232 may comprise a bridge processor. The camera processor 232 may process video recorded by the imager 231 and audio recorded by the microphone(s) 214, and may transform this data into a form suitable for wireless transfer by the communication module 206 to a network. The camera memory 234 may comprise volatile memory that may be used when data is being buffered or encoded by the camera processor 232. For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 231 to see primarily infrared light as opposed to visible light. When the light sensor(s) 226 detects a low level of ambient light (which may comprise a level that impedes the performance of the imager 231 in the visible spectrum), the Infrared LED(s) 236 may shine infrared light through the A/V recording and communication device 200 enclosure out to the environment, and the Infrared filter(s) 238 may enable the imager 231 to see this infrared light as it is reflected or refracted off of objects within the field of view of the doorbell. This process may provide the A/V recording and communication device 200 with the "night vision" function mentioned above.

Figure 3:
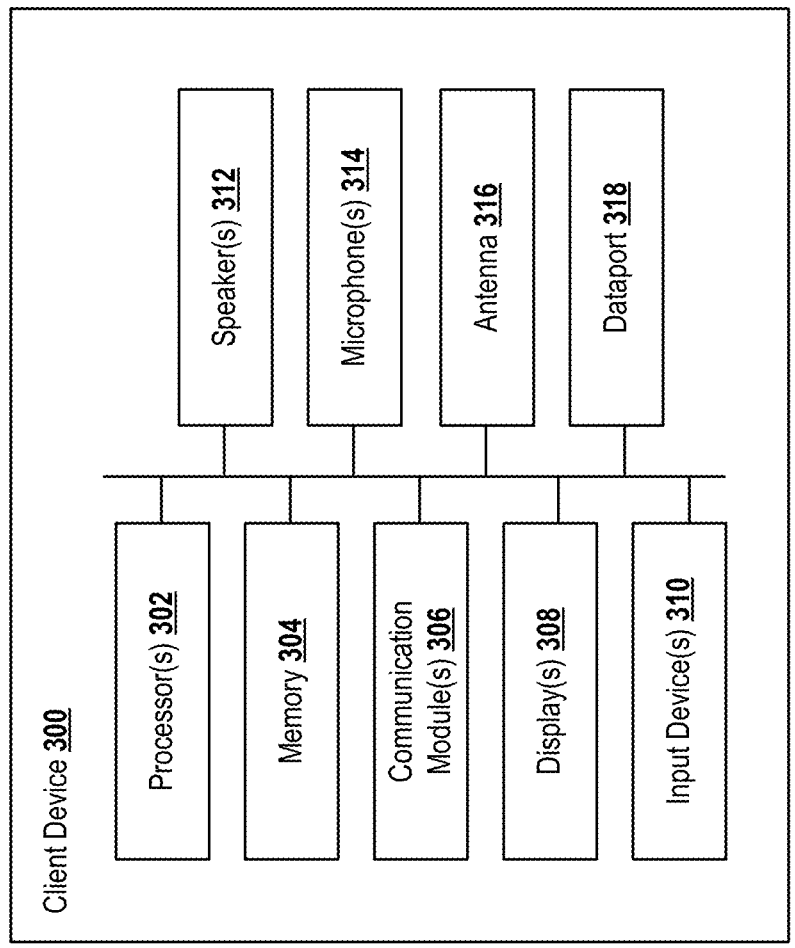
FIG. 3 is a functional block diagram of a client device on which the present embodiments may be implemented according to various aspects of the present disclosure.

FIG. 3 is a functional block diagram of an example client device 300 on which the present embodiments may be implemented according to various aspects of the present disclosure. The user's client device 300 described with reference to FIG. 1 may include some or all of the components and/or functionality of the client device 300 illustrated in FIG. 3. The client device 300 may comprise, for example, a smartphone.

With reference to FIG. 3, the example client device 300 includes a processor(s) 302, a memory 304, a display(s) 308, a communication module(s) 306, an input device(s) 310, a speaker(s) 312, a microphone(s) 314, a connector(s) 316, a battery 318, and a dataport 318. These components are communicatively coupled together by an interconnect bus. The processor(s) 302 may include any processor used in smartphones and/or portable computing devices, such as an ARM processor (a processor based on the RISC (reduced instruction set computer) architecture developed by Advanced RISC Machines (ARM).). In some embodiments, the processor(s) 302 may include one or more other processors, such as one or more conventional microprocessors, and/or one or more supplementary co-processors, such as math co-processors.

The memory 304 may include both operating memory, such as random access memory (RAM), as well as data storage, such as read-only memory (ROM), hard drives, flash memory, or any other suitable memory/storage element. The memory 304 may include removable memory elements, such as a CompactFlash card, a MultiMediaCard (MMC), and/or a Secure Digital (SD) card. In some embodiments, the memory 304 may comprise a combination of magnetic, optical, and/or semiconductor memory, and may include, for example, RAM, ROM, flash drive, and/or a hard disk or drive. The processor(s) 302 and the memory 304 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor(s) 302 may be connected to the memory 304 via the dataport 318.

The display(s) 308 may include any user interface or presentation elements suitable for a smartphone and/or a portable computing device, such as a keypad, a display screen, a touchscreen, a microphone, and a speaker. The communication module(s) 306 is configured to handle communication links between the client device 300 and other, external devices or receivers, and to route incoming/outgoing data appropriately. For example, inbound data from the dataport 318 may be routed through the communication module(s) 306 before being directed to the processor(s) 302, and outbound data from the processor(s) 302 may be routed through the communication module(s) 306 before being directed to the dataport 318. The communication module(s) 306 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 318 may be any type of connector used for physically interfacing with a smartphone and/or a portable computing device, such as a mini-USB or USB-C port or an IPHONE®/IPOD® 30-pin connector or LIGHTNING® connector. In other embodiments, the dataport 318 may include multiple communication channels for simultaneous communication with, for example, other processors, servers, and/or client terminals.

The memory 304 may store instructions for communicating with other systems, such as a computer. The memory 304 may store, for example, a program (e.g., computer program code) adapted to direct the processor(s) 302 in accordance with the present embodiments. The instructions also may include program elements, such as an operating system. While execution of sequences of instructions in the program causes the processor(s) 302 to perform the process steps described herein, hard-wired circuitry may be used in place of, or in combination with, software/firmware instructions for implementation of the processes of the present embodiments. Thus, the present embodiments are not limited to any specific combination of hardware and software.

The input device(s) 310 may include any combination of hardware and/or software elements that receive user input and/or facilitate the interpretation of received input. The input device(s) 310 may be hardware (e.g., physical buttons and switches), software (e.g., virtual buttons, sliders, etc.), or some combination thereof (e.g., software-controlled haptic feedback for simulating button clicks). In some instances, the input device(s) 310 includes a touchscreen or touch-based digitizer. The input device(s) 310 may include a virtual keyboard or other virtual input elements as well.

The speaker(s) 312 may include any combination of speakers or other sound-emitting devices. The speaker(s) 312 may be operable to produce a variety of sounds, such as audio from live video, notification or alert sounds, or other audible sounds.

The microphone(s) 314 may include any combination of transducers that convert pressure waves into electrical signals. The microphone(s) 314 may capture audio, which may, in some instances, be transmitted to a separate computing device or server. That transmitted audio may then be relayed to an A/V recording and communication device 200 (e.g., to provide a substantially live audio transmission to a video doorbell).

The antenna 316 may enable the client device 300 to communicate wirelessly. For instance, the antenna 316 permits the client device 300 to communicate over cellular networks, via one or more communication standards (e.g., GSM, CDMA, LTE, etc.). The antenna 316 may allow the client device 300 to communicate over other wireless protocols, such as Wi-Fi or Bluetooth, among other wireless protocols. The antenna 316 may include multiple antennae, depending on the particular implementation.

In addition to the above, the client device 300 may include a variety of other components, such as batteries, connectors, light indicators, cameras, and sensors, among other components.

Figure 4:
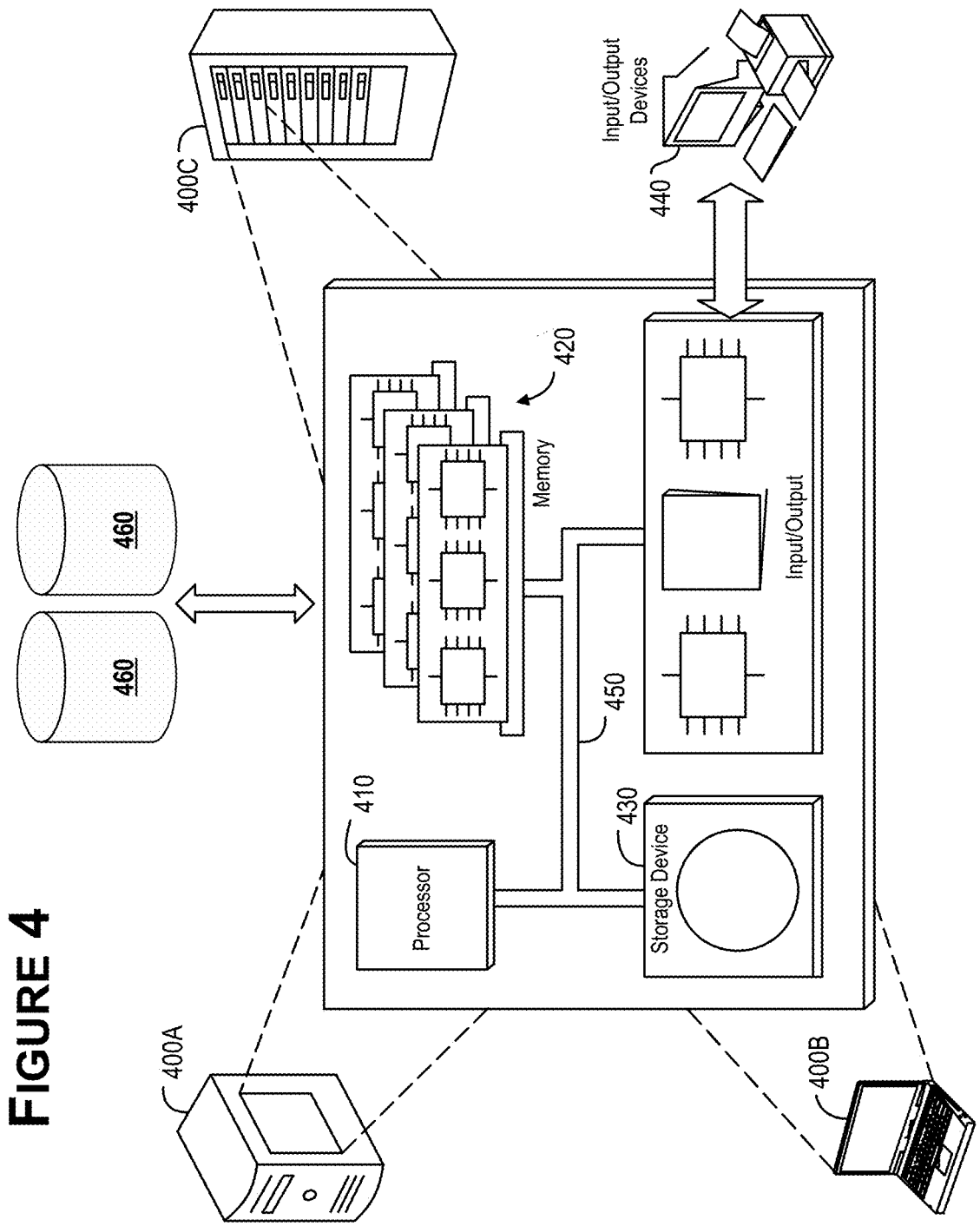
FIG. 4 is a functional block diagram of a general-purpose computing system on which the present embodiments may be implemented according to various aspects of the present disclosure.

FIG. 4 is a functional block diagram of a general-purpose computing system on which the present embodiments may be implemented according to various aspects of the present disclosure. The computer system 400 may be embodied in at least one of a personal computer (also referred to as a desktop computer) 400A, a portable computer (also referred to as a laptop or notebook computer) 400B, and/or a server 400C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 400 may execute at least some of the operations described above. The computer system 400 may include at least one processor 410, memory 420, at least one storage device 430, and input/output (I/O) devices 440. Some or all of the components 410, 420, 430, 440 may be interconnected via a system bus 450. The processor 410 may be single- or multi-threaded and may have one or more cores. The processor 410 may execute instructions, such as those stored in the memory 420 and/or in the storage device 430. Information may be received and output using one or more I/O devices 440.

The memory 420 may store information, and may be a computer-readable medium, such as volatile or non-volatile memory. The storage device(s) 430 may provide storage for the system 400, and may be a computer-readable medium. In various aspects, the storage device(s) 430 may be a flash memory device, a hard disk device, an optical disk device, a tape device, or any other type of storage device.

The I/O devices 440 may provide input/output operations for the system 400. The I/O devices 440 may include a keyboard, a pointing device, and/or a microphone. The I/O devices 440 may further include a display unit for displaying graphical user interfaces, a speaker, and/or a printer. External data may be stored in one or more accessible external databases 460.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a backend component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 5A:
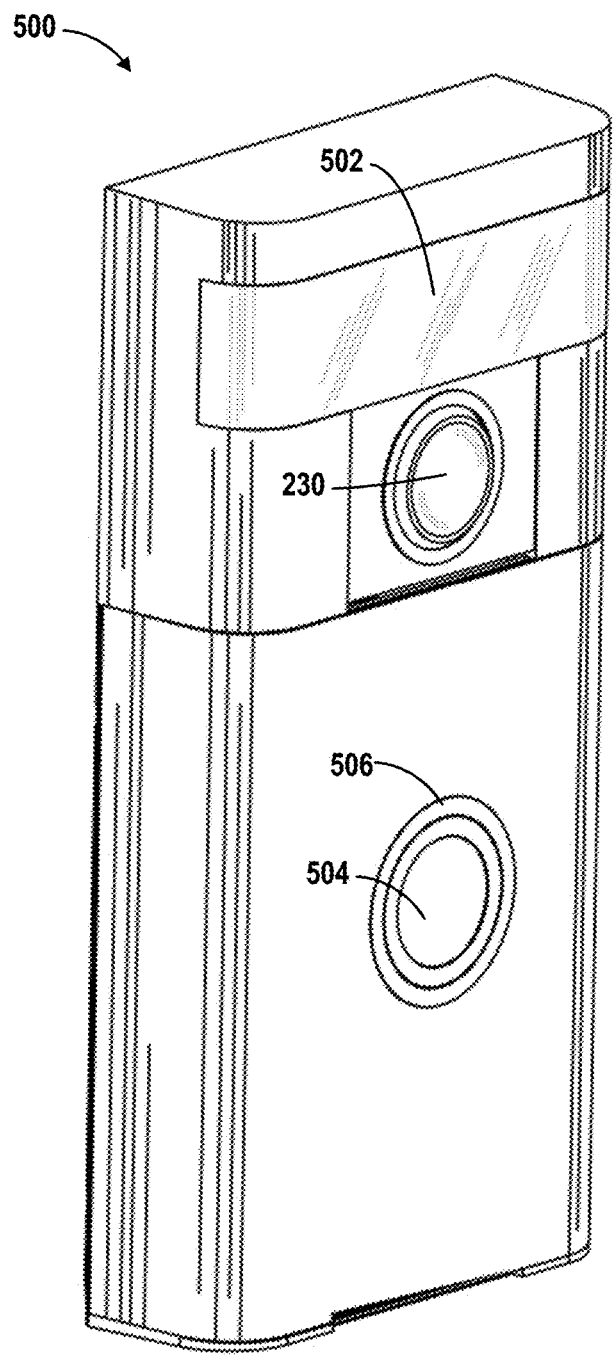
FIGS. 5A-5C depict example A/V recording and communication devices according to various aspects of the present disclosure.
Figure 5B:
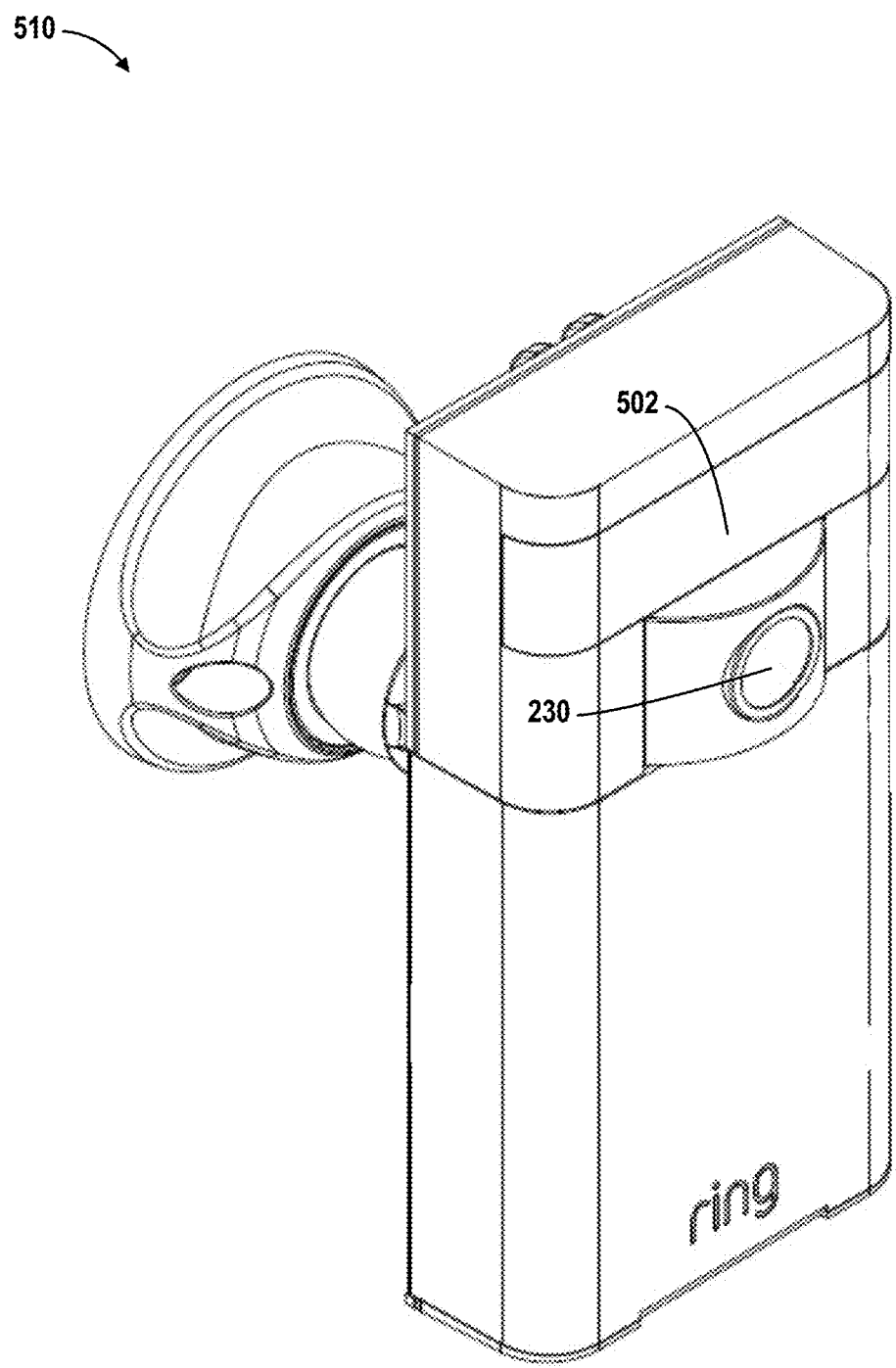
Figure 5C:
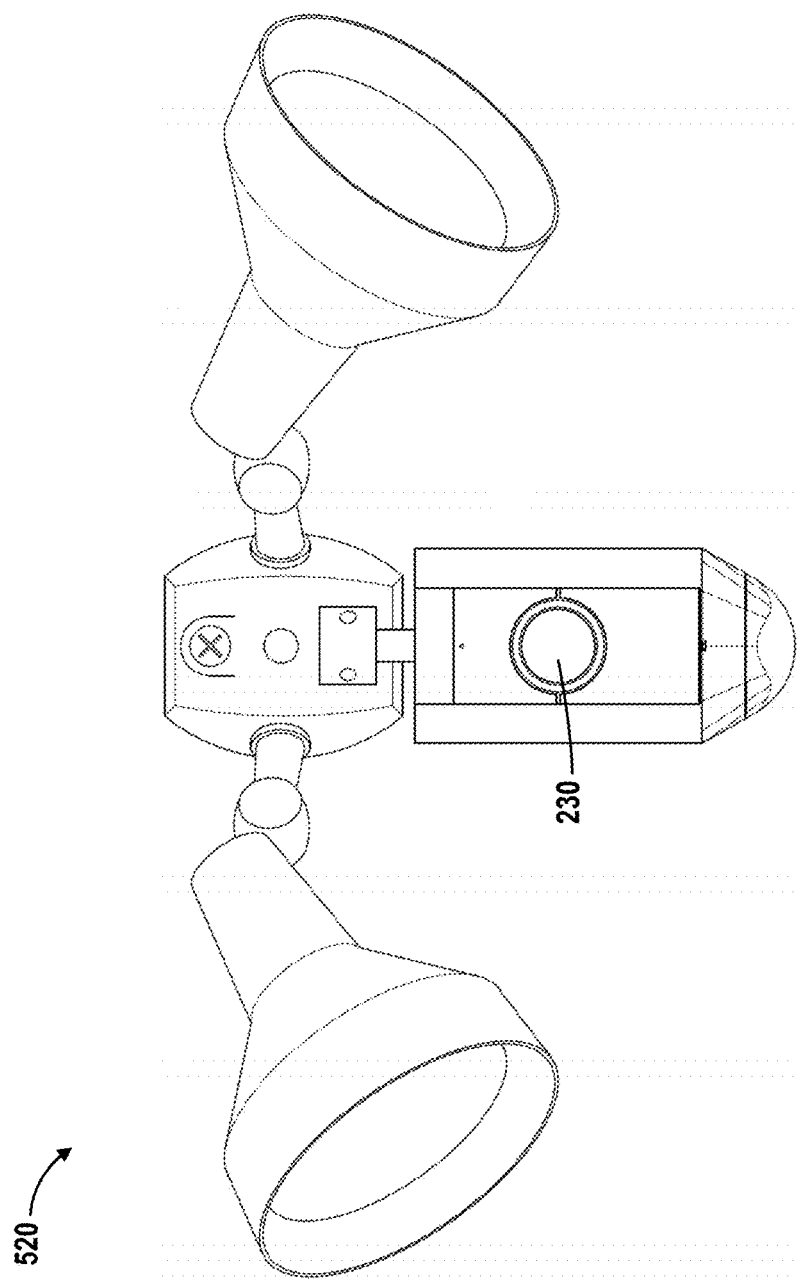

FIGS. 5A, 5B and 5C depict example A/V recording and communication devices 500, 510, 520. The A/V recording and communication device 500 (FIG. 5A) may be referred to herein as a "video doorbell" or some variant thereof. The A/V recording and communication device 510 (FIG. 5B) may be referred to herein as a "security cam" or some variant thereof. The A/V recording and communication device 520 (FIG. 5C) may be referred to herein as the "floodlight cam," "spotlight cam," or some variant thereof. The A/V recording and communication devices 500, 510, 520 may be embodiments of the A/V recording and communication device 200 described with respect to FIG. 2, and thus may each include some or all of the elements of the A/V recording and communication device 200. The A/V recording and communication devices 500, 510, 520 may also include additional hardware and/or software elements not explicitly contemplated in the present disclosure. Although FIGS. 5A-5C illustrate example A/V recording and communication device implementations, other form factors, shapes, mounting hardware, arrangement of components, or aesthetic aspects may be used without departing from the scope of the present disclosure.

Each of the video doorbell 500, the security cam 510, and the floodlight cam 520 may include a camera 230 that captures video data when activated. The video doorbell 500 and the security cam 510 may further include a lens 502. In some embodiments, the lens 502 may comprise a Fresnel lens, which may be patterned to deflect incoming light into one or more infrared sensors located within the video doorbell 500 or the security cam 510 (e.g., the passive infrared sensors 226 (FIG. 2)).

The video doorbell 500 may further include a button 504 and a light pipe 506. The button 504 may make contact with a button actuator (not shown) located within the video doorbell 500 when the button 504 is pressed by a visitor. When pressed, the button 504 may trigger one or more functions of the doorbell 500, such as an audible alert, transmitting a notification to a user, etc. The light pipe 506 may allow light produced within the doorbell 500 (e.g., by the light source(s) 224 (FIG. 2)) to pass through.

In various embodiments, one or more of the A/V recording and communication devices 200 may be installed at a location, and may also be associated with a security system deployed at the location and controlled, for example, via the communication hub 116 and/or the backend server 124. An A/V recording and communication device 200 may be known to be associated with a particular user, user account, and/or user client device 300 based on a cross-listing stored at a local device (e.g., the communication hub 116) and/or at a backend server or network (e.g., the backend server 124).

As discussed above, one aspect of the present embodiments includes the realization that the determination of an occurrence of tampering (e.g., in the proximity of a home or business location) is an event that indicates a potentially dangerous or otherwise threatening situation. The failure to detect the tampering may prevent taking protective or other measures that are appropriate for this type of situation. The present embodiments solve this problem by leveraging the functionality of A/V recording and communication devices, such as A/V recording and communication doorbells, to determine an occurrence of tampering based on analysis of audio data collected by a microphone and/or video data collected by a camera of the A/V recording and communication device, and in response to transmit one or more communications, and/or perform one or more other actions.

As further discussed above, another aspect of the present embodiments includes the realization that, when tampering occurs, video evidence of the perpetrator(s) can be invaluable in the effort to apprehend the perpetrator(s). Currently, however, there is no known mechanism for generating such video image data in response to the determination of an occurrence of tampering. The present embodiments solve this problem by leveraging the functionality of A/V recording and communication devices to determine an occurrence of tampering based on analysis of audio data collected by a microphone and/or video data collected by a camera of the A/V recording and communication device, and in response to record video image data, including additional video image data if video data is used to determine an occurrence of tampering. The video captured and/or recorded in response to determining an occurrence of tampering may be from the A/V recording and communication device from which audio and/or video used to determine the occurrence of tampering was captured, and/or may be from other cameras. The present embodiments thus advantageously leverage the distributed nature of A/V recording and communication devices, such as A/V recording and communication doorbells, to create a network of devices capable of detecting tampering occurrences and, in response, generating video evidence. The video evidence can be used to identify and apprehend criminal suspects, thereby helping to make neighborhoods and communities safer.

One or more operations for determining an occurrence of tampering may be performed by a server or backend system, such as the backend API 122 of FIG. 1, for example. Alternatively, or additionally, one or more operations for determining an occurrence of tampering may be performed by another computing device or system, such as the communication hub 116, for example.

In one example, some or all operations for determining an occurrence of tampering may be performed by a first A/V recording and communication device. As another example, some or all operations for determining the occurrence of tampering may be performed by a second A/V recording and communication device. The second A/V recording and communication device may be associated with the user, or may be associated with a different user (e.g., a user in a same neighborhood or other geographically proximate location to the first A/V recording and communication device). In yet another example, some or all operations for determining an occurrence of tampering may be performed by a plurality of A/V recording and communication devices, such as first and second A/V recording and communication devices.

For ease of description, a method of determining an occurrence of tampering is first described below with respect to an embodiment in which all aspects of the method are performed by a single backend server. In other embodiments, various aspects of the method may be performed by other computing devices and/or systems, such as by a premises security hub (e.g., the communication hub 116). In still further embodiments, various aspects of the method may be performed by multiple computing devices and/or systems working in concert, such as by a backend server and a premises security hub.

FIGS. 6A-6D illustrate flow charts for example methods 600 and 601 for determining an occurrence of tampering based on audio data received from a microphone of an A/V recording and communication device and/or video data from a camera of an A/V recording and communication device (e.g., the A/V recording and communication device 200), and various actions taken in response to the determination, according to various aspects of the present disclosure.

In various embodiments, one or more portions of the methods 600 and/or 601 (e.g., block 610, block 611, block 618, block 624, block 626 and/or block 632) may be performed locally, at the location of the A/V recording and communication device(s), such as by one or more processors of the A/V recording and communication device itself and/or by one or more processors of a home automation hub, a premises security hub, or the like (e.g., the communication hub 116).

Figure 6A:
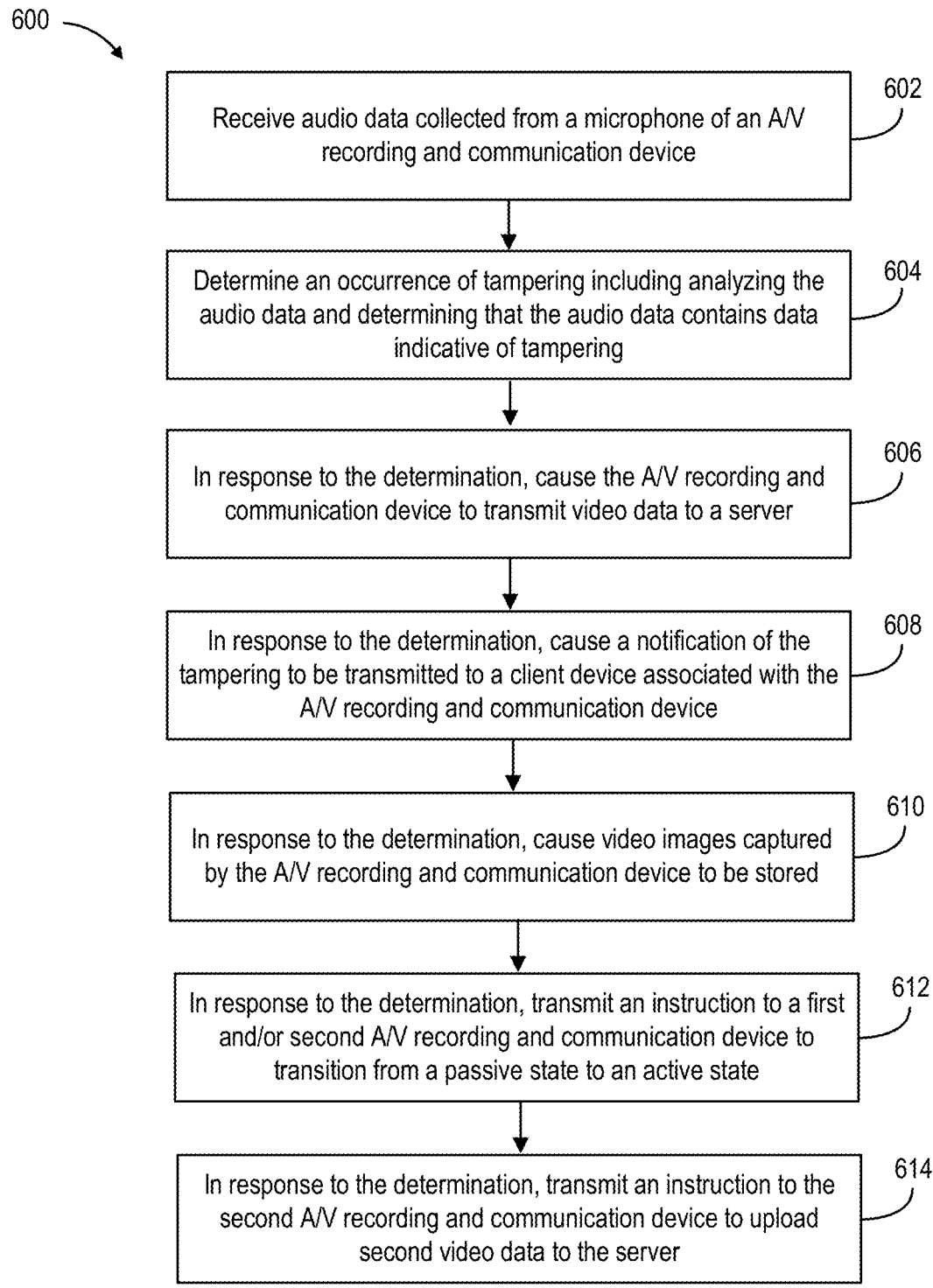
FIGS. 6A-6D illustrate flow charts for example methods for determining an occurrence of tampering based on audio data received from a microphone of an A/V recording and communication device and/or video data from a camera of an A/V recording and communication device, and various actions taken in response to the determination, according to various aspects of the present disclosure.

FIG. 6A describes a method 600 for determining an occurrence of tampering based on audio data received from a microphone of an A/V recording and communication device. The method 600 of FIG. 6A may include, at block 602, receiving audio data from a first A/V recording and communication device, wherein the first A/V recording and communication device is associated with a user. The audio data may be received, for example, by a server (e.g., the backend server 124). The audio data may be collected by a microphone of the first A/V recording and communication device. For example, the audio data may have been captured by one of the A/V recording and communication devices 500, 510, 520 of FIGS. 5A-5C, or by some other A/V recording and communication device 200.

In an embodiment, the microphone (e.g., the microphone 214) used to collect the audio data is a so-called "weak" microphone (e.g., using a sampling rate of 8 kHz or less, 1bit/sample, and one channel). In other embodiments, microphones having a sampling rate greater than 8 kHz may be used.

The audio data received from the A/V recording and communication device may be received substantially in real-time, in an embodiment. That is, the A/V recording and communication device may stream the audio data to the server, such that the server performing the method 600 receives the audio data with little time lag between capture of the audio data at the A/V recording and communication device and receipt of the audio data at the server.

The method 600 may further include, at block 604, determining an occurrence of tampering including analyzing the audio data and determining that the audio data contains data indicative of tampering. In an embodiment, this determination may be made by the server and/or the first A/V recording and communication device. If the first A/V recording and communication device makes this determination, the first A/V recording and communication device may transmit a communication to the server including an indication that an occurrence of tampering has been determined. Upon receiving this communication, the server itself may make a determination that the audio data collected by the microphone contains data indicative of tampering. Additional embodiments regarding determining that audio data contains data indicative of tampering are described with respect to FIG. 8 below.

Various actions as described below may be taken responsive to determining an occurrence of tampering (e.g., the audio data contains data indicative of tampering). In an embodiment, the first A/V recording and communication device and/or the server may perform various actions in response to this determination. In other embodiments, additionally, or alternatively, other computing devices or systems may perform one or more actions in response to this determination.

Example actions are discussed with respect to the following portions of the method 600. Various embodiments of the method 600 may omit one or more of the following portions.

The method 600 may further include, at block 606, in response to the determination of an occurrence of tampering, causing the A/V recording and communication device to transmit video data collected by a camera to the server. In an embodiment, the first A/V recording and communication device may include the camera, and may transmit the video data to the server.

In an embodiment, a computing device other than the first A/V recording and communication device (e.g., the second A/V recording and communication device above) may include the camera that collects the video data. For example, the server may cause the second A/V recording and communication device to collect video data using its camera, and transmit the video data to the server. The server may further cause the second A/V recording and communication device to collect audio data using a microphone or a sensor. This microphone or sensor may be different from the microphone that collected the audio data used to determine that the audio data contains data indicative of an occurrence of tampering.

The method 600 may further include, at block 608, in response to the determination of an occurrence of tampering, the server causing the transmission of a notification of the tampering to a client device (e.g., the client device 300). For example, the server may cause the notification to be transmitted to a client device associated with the first A/V recording and communication device. The notification may be, for example, a message or signal transmitted over a network. Additionally, or alternatively, a notification may be transmitted to another computing device (e.g., the second A/V recording and communication device).

As another example of transmitting a notification, in response to determining that the audio data contains data indicative of tampering, the server may cause video images (e.g., images obtained from video data received by the server) to be transmitted to a client device associated with the first A/V recording and communication device (e.g., the user client device 300). For example, the server may cause the video images to be transmitted to the user client device by opening a data channel between the server and the user client device. The video images may then be displayed on or by the user client device.

The method 600 may further include, at block 610, in response to the determination of an occurrence of tampering, the server causing video images captured by an A/V recording and communication device to be stored (e.g., at the cloud storage 126). For example, video data collected by an A/V recording and communication device may be transmitted from the server to the cloud storage 126 for storage.

The method 600 may further include, at block 612, in response to the determination of an occurrence of tampering, the server transmitting an instruction to the first and/or second A/V recording and communication device to transition from a passive state to an active state. For example, although the first A/V recording and communication device may be actively capturing and transmitting audio and/or video data to the server, other A/V recording and communication devices at the same location may be passive devices, which do not capture and/or transmit audio in passive mode in order to reduce power consumption. Accordingly, an instruction may be sent to such a device to cause it to transition to an active state, in which the second A/V recording and communication device can capture and transmit video and/or audio, in order to increase the chances of capturing additional video evidence of the tampering event, and/or of events subsequent to the tampering event.

In another embodiment, the first A/V recording and communication device may collect the audio data used to detect the tampering. However, a camera of the first A/V recording and communication device may be in a passive mode at the time of tampering detection by the server based on the collected audio data. Responsive to determining that the audio data contains data indicative of a tampering, the server may cause the camera of the first A/V recording and communication device to wake from a passive state to begin recording video data. The video data may be, for example, transmitted by the camera to the server.

The method 600 may further include, at block 614, in response to the determination of an occurrence of tampering, the server transmitting an instruction to the second A/V recording and communication device to upload second video data captured by the second A/V recording and communication device to the server (e.g., for analysis and/or other processing by the server). Whether the second A/V recording and communication device is an active device (which is always capturing video data) or a passive device (which only captures video data when switched from passive mode to active mode), the video data captured by the second A/V recording and communication device may include evidence of the event associated with the tampering. Accordingly, the server may cause the second A/V recording and communication device to transmit video data captured by the second A/V recording and communication device to the server for processing and/or storage. In an embodiment, the server may instruct the second A/V recording and communication device to transmit video data from the same time period for which video data from the first A/V recording and communication device was collected or stored (e.g., based on timestamps or other time records that indicate the time of detection of tampering).

Figure 6B:
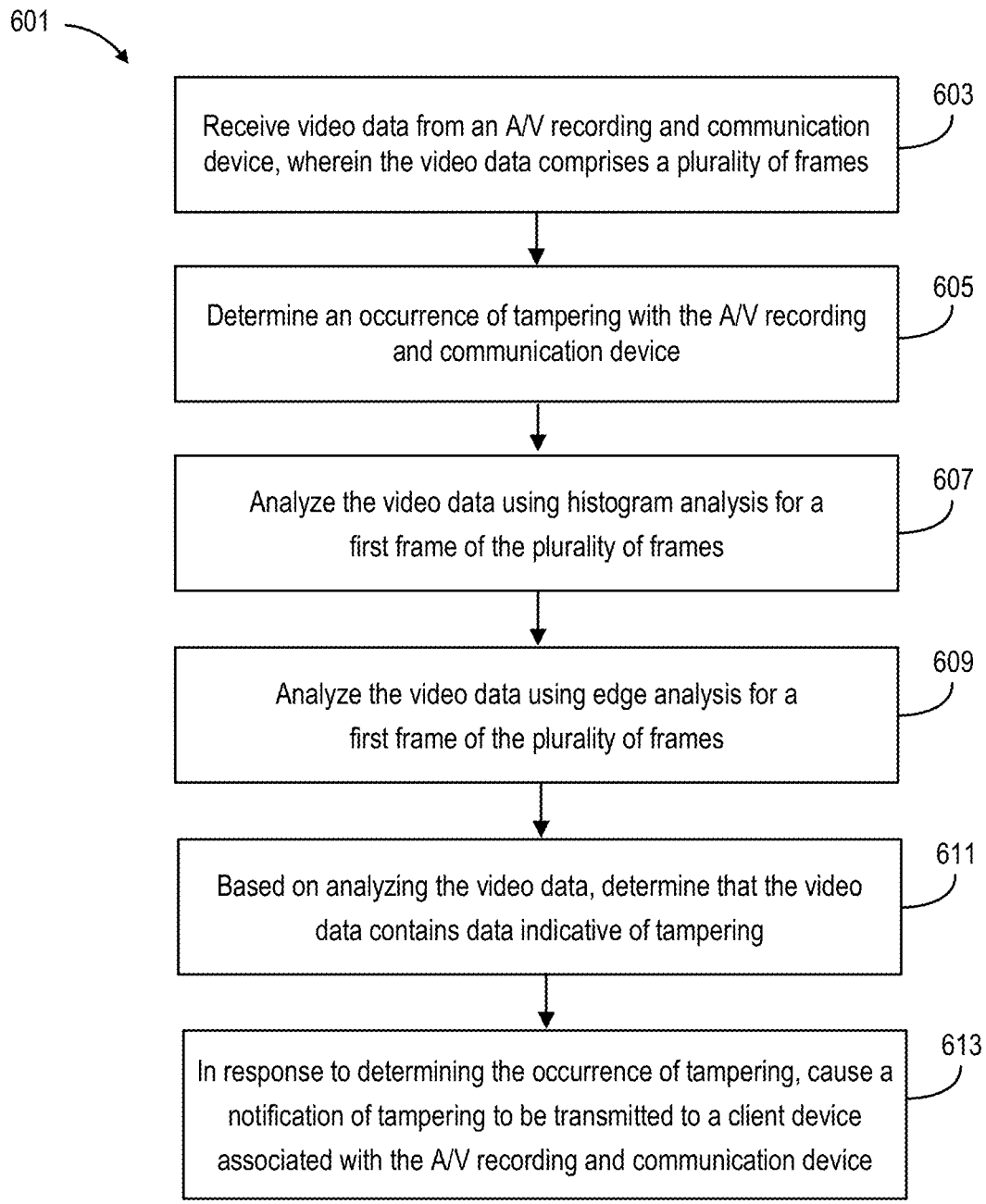

The method 601 of FIG. 6B describes a method for determining an occurrence of tampering based on video data received from a camera of an A/V recording and communication device. The method 601 of FIG. 6B may include, at block 603, receiving video data from a first A/V recording and communication device, wherein the first A/V recording and communication device is associated with a user. The video data includes, for example, a plurality of frames. The video data may be received, for example, by a server (e.g., the backend server 124). The video data may be collected by a camera of the first A/V recording and communication device. For example, the video data may have been captured by one of the A/V recording and communication devices 500, 510, 520 of FIGS. 5A-5C, or by some other A/V recording and communication device 200.

The video data received from the A/V recording and communication device may be received substantially in real-time, in an embodiment. That is, the A/V recording and communication device may stream the video data to the server, such that the server performing the method 601 receives the video data with little time lag between capture of the video data at the A/V recording and communication device and receipt of the video data at the server.

The method 601 may further include, at block 605, determining an occurrence of tampering with the first A/V recording and communication device. The determination of the occurrence of tampering can include, for example, analyzing the video data and determining that the video data contains data indicative of tampering. In an embodiment, this determination may be made by the server and/or the first A/V recording and communication device. If the first A/V recording and communication device makes this determination, the first A/V recording and communication device transmits a communication to the server including an indication that an occurrence of tampering has been determined. Upon receiving this communication, the server itself may make a determination that the video data collected by the camera contains data indicative of tampering. In some embodiments, in addition to the analyzing of the video data, the determination of the occurrence of tampering can be, for example, further based on analysis of audio, sensor, or other data that has been collected or obtained (e.g., by the server).

The method 601 may further include, at block 607, analyzing the video data using histogram analysis for a first frame of the plurality of frames in the video data. The method 601 may further include, at block 609, analyzing the video data using edge analysis for a first frame of the plurality of frames. The edge analysis can be used in addition to, or alternatively to, the histogram analysis. For example, the edge analysis and the histogram analysis can both be performed on one or more of the same frames. Alternatively, edge analysis and histogram analysis can be performed on different frames of the video data. Various embodiments regarding determining that video data contains data indicative of tampering using histogram and/or edge analysis are described with reference to FIGS. 8B-8D below.

The method 601 may further include, at block 611, determining, based on analyzing the video data, that the video data contains data indicative of tampering. The analyzing can include, for example, the histogram analysis of block 607 and/or the edge analysis of block 609. In one embodiment, analyzing the video data includes processing and/or analysis of the video data in a manner that is in addition to, or alternative to, the histogram or edge analysis. In some embodiments, the determination that the video data contains data indicative of tampering is made by a first computing device, and the determination of the occurrence of tampering is made by a second computing device.

In another embodiment, if the background on the camera changes (meaning that the camera is moving), and the A/V recording and communication device (and/or a security system with which the A/V recording and communication device is associated) is in an armed mode, then an alarm (e.g., a siren) is automatically activated. The siren may be emitted from the A/V recording and communication device and/or the associated security system.

Various actions as described below may be taken responsive to determining an occurrence of tampering (e.g., in response to a determination by the server that the video data contains data indicative of tampering based on histogram and/or edge analysis). In an embodiment, the first A/V recording and communication device and/or the server may perform various actions in response to this determination. In other embodiments, additionally, or alternatively, other computing devices or systems may perform one or more actions in response to this determination. Example actions are discussed with respect to the following portions of the method 601. Various embodiments of the method 601 may omit one or more of the following portions.

The method 601 may further include, at block 613, in response to the determination of an occurrence of tampering, the server causing the transmission of a notification of the tampering to a client device (e.g., the client device 300). For example, the server may cause the notification to be transmitted to a client device associated with the first A/V recording and communication device. The notification may be, for example, a message or signal transmitted over a network. Additionally, or alternatively, a notification may be transmitted to another computing device (e.g., the second A/V recording and communication device).

As another example of transmitting a notification, in response to determining that the audio data contains data indicative of tampering, the server may cause video images (e.g., images obtained from video data received by the server) to be transmitted to a client device associated with the first A/V recording and communication device (e.g., the user client device 300). For example, the server may cause the video images to be transmitted to the user client device by opening a data channel between the server and the user client device. The video images may then be displayed on or by the user client device.

Figure 6C:
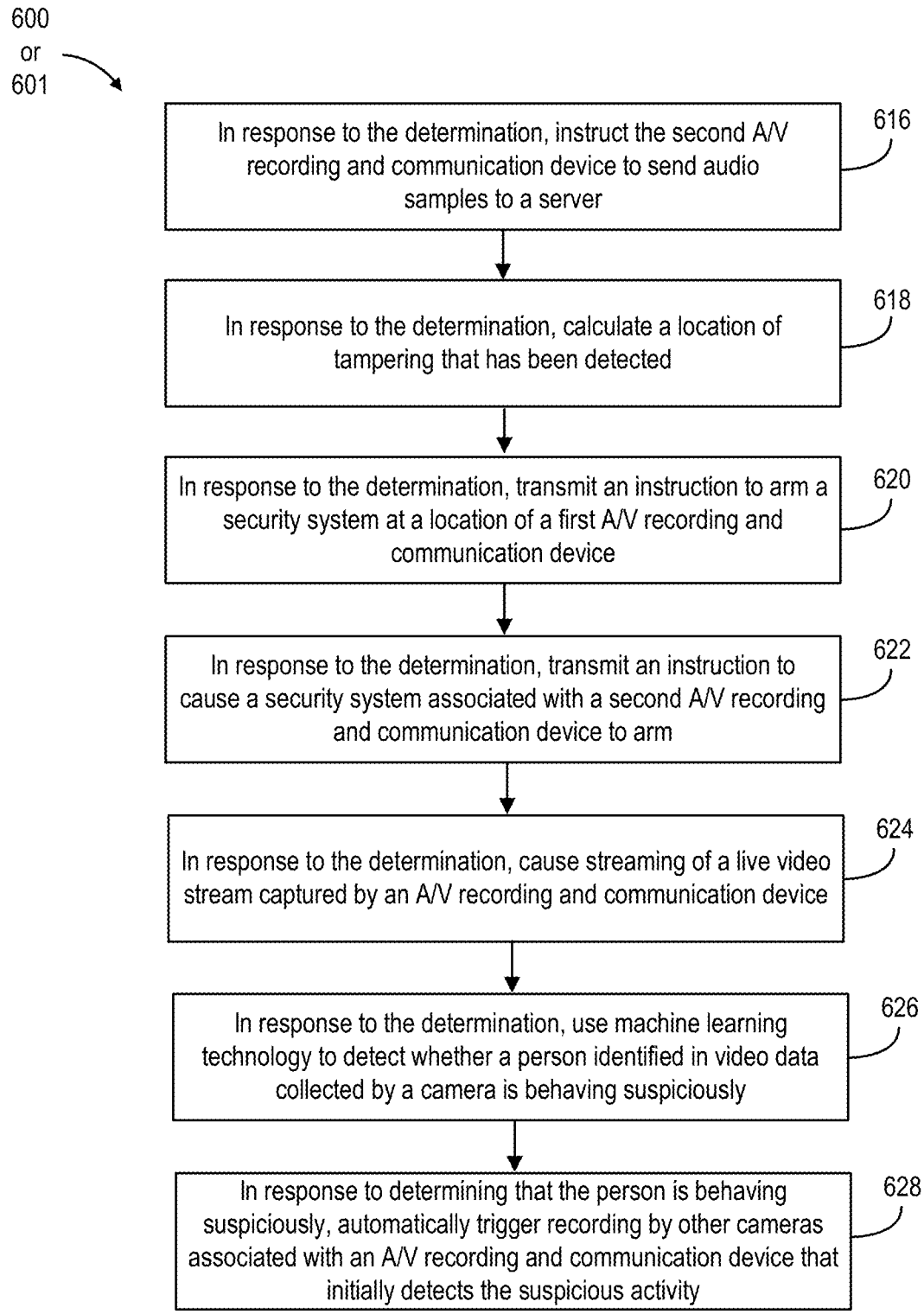
Figure 6D:
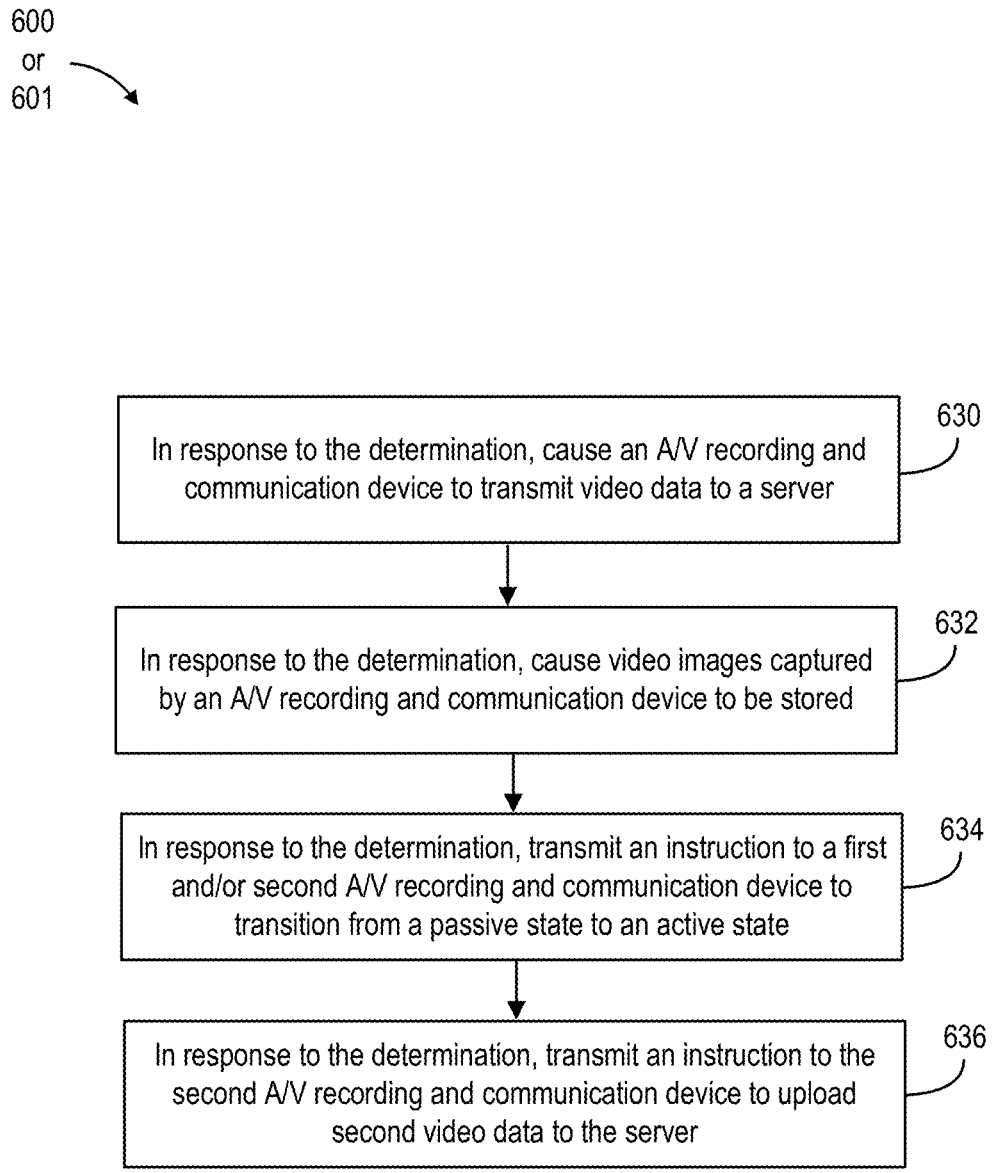

Blocks 616 to 636 of FIGS. 6C and 6D illustrate further additional actions that can be performed in response to the determination of an occurrence of tampering according to the methods 600 and/or 601 of FIGS. 6A and 6B. Each of these additional actions is optional, and any one or more such actions can be used together in various combinations (including with various of the actions already discussed above) for different embodiments.

The methods 600 and/or 601 may further include, at block 616, the server instructing the second A/V recording and communication device to send audio samples to the server. These audio samples may be, for example, samples of audio data collected by the first and/or second A/V recording and communication device at a time prior to receiving the audio and/or video data used to detect the tampering. In one embodiment, these prior audio samples can be used to train a computer model for detecting tampering in various embodiments.

The methods 600 and/or 601 may further include, at block 618, the server calculating a location of tampering that has been detected. For example, the location may be determined by analyzing audio and/or video samples stored and/or collected by the second A/V recording and communication device, and/or other computing devices.

Additionally, and/or alternatively, in an embodiment, cameras, microphones, and/or sensors that have been placed on telephone poles or other physical structures (e.g., to enhance police response time and increase public awareness during/after a tampering detection) may be used to assist in determining a location of the tampering (e.g., tampering with a security camera and/or a security lighting system). For example, functionality may be included in the methods 600 and/or 601 and implemented in the first and/or second A/V recording and communication devices to support this location determination.

As described above, another aspect of the present embodiments includes the realization that, when tampering occurs, the perpetrator tends to quickly leave the area where the tampering occurred. It can thus be difficult to track and apprehend such perpetrators. The present embodiments solve this problem by leveraging the functionality of A/V recording and communication devices, as well as the distributed nature of such devices, to detect tampering based on analysis of audio data collected by a microphone and/or video data collected by a camera of the A/V recording and communication device, and in response to track the perpetrator(s) by capturing video image data and providing the video image data to law enforcement personnel in real time. Certain of the present embodiments may further leverage the capabilities of A/V recording and communication devices to identify perpetrators using techniques such as biometrics, facial recognition, computer vision, etc. By assisting law enforcement in tracking criminal perpetrators, the present embodiments help to keep neighborhoods and communities safe.

In an embodiment, facial recognition tracking may be used when a camera in view of tampering and/or another crime event is able to record video data to capture images of a perpetrator and/or other aspects of the event. In an embodiment, a tag may be applied (e.g., stored as a tag to a record in a database) to the perpetrator's unique facial structure (e.g., this tagging may be done automatically and/or manually), and then nearby cameras may be alerted (e.g., by an electronic notification) that a "high priority suspect" has been identified in their proximity (e.g., a first A/V recording and communication device may cause sending of a notification to a second A/V recording and communication device).

In an embodiment, facial recognition of perpetrators may be done by processing of collected video data. Surrounding cameras (e.g., cameras incorporated in A/V recording and communication devices that are geographically proximate to a crime scene) may alert a computing system of a police department and/or another security system when a perpetrator is detected or identified. In an embodiment, such video and/or other collected data may be used to provide a cascading, domino effect, whereby police and/or others are electronically provided location data and guidance. This cascading, domino effect may be more effective in many cases than merely setting up a circular radius around a home.

In an embodiment, as a perpetrator or suspect moves away from the scene of a crime, a network of A/V recording and communication devices (e.g., where each device includes a camera to capture and send video data to the server) may be used to assist police and/or others in determining where the perpetrator is headed. This process may potentially lead authorities to make an arrest of the perpetrator or others associated with the crime. For example, one or more of these cameras may lead the police to a "safe house" or other location at which they can arrest one or more co-conspirators or other related criminals. In some cases, for example, the police may recover stolen property and/or contraband.

In an embodiment, police and/or neighbors may "opt in" to such a tracking/detection system in advance of an occurrence of the crime in order to allow the use of their cameras for this tracking. In one example, the tracking only records video data for outdoor activities (and, for example, does not record any activities inside of a person's home or other structure).

In an embodiment, in response to determining an occurrence of tampering, an alert can be generated and transmitted to computing devices of others in a neighborhood (e.g., a geographic region within a predetermined physical radius, size, or other dimension from a location of a tampering detection and/or from a location of a user's A/V recording and communication device). In one example, these computing devices of others can include A/V recording and communication devices of other homeowners and/or businesses in the neighborhood.

In an embodiment, the neighborhood above can be defined or determined by locating one or more A/V recording and communication devices that are present within a geographic area (e.g., a geographic area of an A/V recording and communication device that detects tampering). The A/V recording and communication device(s) can be, for example, one or more A/V recording and communication devices 200.

The server may determine the locations of the one or more A/V recording and communication devices in various ways. For example, in some embodiments, the server may compare an indicator of the geographic area in a tampering alert (e.g., ZIP code, latitude/longitude coordinates, cross-streets, bounding streets or geographic features, etc.) to address information associated with A/V recording and communication devices registered to the server and/or to a system of which the server is a part (e.g., the backend network 120, the API 122, the server 124, and the database 126 of FIG. 1). In other embodiments, the server may compare the indicator of the geographic area to the location indicated by an IP (Internet protocol) address associated with the A/V recording and communication device.

In an embodiment, the currently-configured neighborhood is displayed on a display screen of a client device of the user. The user can have A/V recording and communication devices that are part of the neighborhood, and that are in multiple locations. Further, the user can be a member of more than one defined neighborhood. For example, if a user has multiple A/V recording and communication devices in different locations, the user will be automatically placed (e.g., by the server) in a defined neighborhood for each location. The user can find her neighborhoods, for example, by using a drop-down menu on a neighborhood data feed provided by the server.

In an embodiment, the user can add or remove certain houses from the neighborhood. For example, the user is provided a control within her neighborhood settings called "radius" that grows or shrinks the area around the user's A/V recording and communication device that is considered part of the user's neighborhood. For example, this can be configured by tapping an icon at the top of a screen on the user's client device, then tapping "neighborhoods" and/or "customize radius".

In an embodiment, the user can change the number of alerts received and/or when they are received. For example, within the neighborhood settings there may be a control called "get neighborhood alerts" that allows the user to control the number and/or frequency of alerts received.

In an embodiment, the above neighborhoods provide a social space that allows neighbors to share videos, images, and information about local crime and crime prevention in order to make their neighborhoods safer. For example, this social space may provide one or more of the following features: The user can share videos taken by A/V recording and communication device(s) with the user's neighbors in the defined neighborhood; the user can share images with neighbors; the user can share text-based posts with neighbors; the user can comment on her own or other people's posts; the user can view local news items related to crime and safety; the user can rate particularly notable pieces of content as "helpful"; or the user can flag unhelpful or inappropriate pieces of content and have them removed from the content feed.

In an embodiment, the alert additionally or alternatively can be transmitted to computing devices having a common network characteristic (e.g., a common domain, or presence on a common local or other network) with the A/V recording and communication device that initially collects audio data used to detect the tampering.

In an embodiment, in response to detecting tampering, data regarding one or more images and/or video data (e.g., data collected from the A/V recording and communication device 200) can be transmitted to other computing devices. For example, this data can be transmitted with the alert to the neighborhood above. In one example, these other computing devices can include computing devices in the neighborhood.

In yet another example, the images and/or video data can be transmitted to a computing device of police, EMS, and/or other government or private organizations. In one example, this data can include a carousel or other collection or set of still photos, clips using a GIF or similar format, and/or other image or video data collected from cameras surrounding a location of an initial tampering detection. For example, this data can be used in performing crowd-sourced identifications (e.g., an identification based on facial recognition algorithms and/or machine learning algorithms that use data collected from a crowd of A/V recording and communication devices and/or other computing devices, such as mobile devices of persons within and/or outside of a neighborhood).

In an embodiment, in response to detecting tampering, a networked group of A/V recording and communication devices (e.g., in a neighborhood or geographically proximate region) that are in communication with the server may be used to triangulate the location of the tampering (e.g., a camera tampering by a criminal). In addition, in an embodiment, facial recognition and/or computer vision (e.g., performed by the server based on video data received from one or more A/V recording and communication devices in the neighborhood) may be used to track the perpetrator associated with the tampering (e.g., to track through the neighborhood while helping guide police or other public officials to the location of the perpetrator). In an embodiment, microphone(s) of one or more A/V recording and communication devices may be used to detect specific patterns and/or other characteristics of sounds associated with tampering. The locations of each specific sound may be used in the above location triangulation. In an embodiment, location triangulation and facial recognition tagging may be used in combination to apprehend a perpetrator.

The second A/V recording and communication device above may be associated with the same user, user account, and/or location as the first A/V recording and communication device. Additionally, or alternatively, the second A/V recording and communication device may be associated with a different user, user account, or location, but may be geographically proximate to the first A/V recording and communication device. For example, the second A/V recording and communication device may be located at a neighboring address to the first A/V recording and communication device, or at another location where it is possible or likely that evidence of the tampering event can be captured by additional video and/or audio data collected by the second A/V recording and communication device.

The server may take yet other additional or alternative actions in response to the determination of an occurrence of tampering, in further various embodiments as described below. For example, the methods 600 and/or 601 may further include, at block 620, the server transmitting an instruction to a communication hub (e.g., the communication hub 116 of FIG. 1) to arm a security system at the location of the first A/V recording and communication device (e.g., to transition the security system from an unarmed state to an armed state, if the security system is not already in an armed state).

The methods 600 and/or 601 may further include, at block 622, additionally, or alternatively, the server transmitting an instruction to cause a security system associated with the second A/V recording and communication device to arm. In an embodiment, the server may also cause a notification to be transmitted to a computing device configured to monitor for emergency events. This computing device may, for example, monitor for emergency events associated with a building or other structure monitored by one or more A/V recording and communication devices (e.g., the second A/V recording and communication device).

The methods 600 and/or 601 may further include, at block 624, the server causing streaming of a live video stream captured by an A/V recording and communication device (e.g., A/V recording and communication device 200). This streaming may be implemented using, for example, the client device 300 that is communicatively coupled with the A/V recording and communication device 200, or other devices that capture video data. The client device may transmit an arm signal to a security system deployed at a same location at which the A/V recording and communication device 200 is installed. The client device may transmit a request to view a live video stream from the A/V recording and communication device 200. The request may be transmitted, for example, to the communication hub 116 or the backend server 124, or it may be transmitted directly to the A/V recording and communication device. The client device 300 may then receive the live video stream from the A/V recording and communication device 200.

In various additional embodiments, additionally or alternatively to the above embodiments, one or more other actions may be performed after tampering is detected (e.g., based on a determination that audio and/or video data contains data indicative of tampering), as described below. For example, the methods 600 and/or 601 may further include, at block 626, using machine learning technology (e.g., a computer model such as a trained neural network) to detect whether a person identified in video data collected by a camera (e.g., a camera of A/V recording and communication device 200) is behaving suspiciously. This determination may be, for example, used to alert the homeowner or user. This machine learning technology may be used in addition to, or alternatively to, the histogram and/or edge analysis.

Also, nearby homes can be automatically alerted that a neighbor may be, or may soon be, a victim of suspicious activity. This determination may increase the chances of catching a criminal by mobilizing neighbors who are home, and/or arming the security systems of neighbors who are not home. In another embodiment, a computing device of a police department, emergency medical service (EMS), and/or other government or private organization can be alerted in addition to, or alternatively to, other alerts provided by the server.

The methods 600 and/or 601 may further include, at block 628, based on a determination of suspicious activity (e.g., based on video and/or audio data collected by the second A/V recording and communication device), automatically triggering recording by all other cameras in the same home (or other same location) of a first A/V recording and communication device that is used to detect the activity. If a high confidence exists (e.g., the confidence is greater than a threshold) that a monitored or detected activity is suspicious, an alert may be sent to one or more other A/V recording and communication devices in a defined neighborhood of the detecting device.

In another embodiment, a user may configure the actions that are taken when suspicious activity is detected (e.g., by an A/V recording and communication device of a neighbor in the neighborhood of the user). The user may be prompted to arm the user's security system (e.g., by a notification transmitted to the client device 300), and/or automatically wake up one or more cameras for a predetermined period of time, etc.

In an embodiment, a second A/V recording and communication device may be associated with a different user, user account, or location, but may be geographically proximate to a first A/V recording and communication device that is used to initially detect tampering. For example, the second A/V recording and communication device may be located at a neighboring address to the first A/V recording and communication device, or at another location where it is possible or likely that evidence of the event that causes a user to place a call to emergency services may exist. For example, a bicycle may have been stolen from a user's garage, and video from A/V recording and communication devices at neighboring addresses may provide image data, such as a clear image of the thief's face.

The methods 600 and/or 601 may further include, at block 630, in response to the determination of an occurrence of tampering, causing the A/V recording and communication device to transmit video data collected by a camera to the server. In an embodiment, the first A/V recording and communication device may include the camera, and may transmit the video data to the server. In an embodiment, the video data includes video data that was analyzed to determine the tampering.

In an embodiment, a computing device other than the first A/V recording and communication device (e.g., the second A/V recording and communication device above) may include the camera that collects the video data. For example, the server may cause the second A/V recording and communication device to collect video data using its camera, and transmit the video data to the server. The server may further cause the second A/V recording and communication device to collect audio data using a microphone or a sensor.

The methods 600 and/or 601 may further include, at block 632, in response to the determination of an occurrence of tampering, the server causing video images captured by an A/V recording and communication device to be stored (e.g., at the cloud storage 126). For example, video data collected by the first and/or second A/V recording and communication device may be transmitted from the server to the cloud storage 126 for storage.

The methods 600 and/or 601 may further include, at block 634, in response to the determination of an occurrence of tampering, the server transmitting an instruction to the first and/or second A/V recording and communication device to transition from a passive state to an active state. For example, although the first A/V recording and communication device may be actively capturing and transmitting audio and/or video data to the server, other A/V recording and communication devices at the same location may be passive devices, which do not capture and/or transmit audio in passive mode in order to reduce power consumption.

Accordingly, an instruction may be sent to such a device to cause it to transition to an active state, in which the second A/V recording and communication device can capture and transmit video, in order to increase the chances of capturing additional video evidence of the tampering event, and/or of events subsequent to the tampering event.

In another embodiment, the first A/V recording and communication device may collect audio data that is used along with collected video data to detect the tampering. However, a camera of the first A/V recording and communication device may be in a passive mode at the time of tampering detection by the server based on the collected video data. Responsive to determining that the video data contains data indicative of tampering, the server may cause the camera of the second A/V recording and communication device to wake from a passive state to begin recording video data. The video data may be, for example, transmitted by the camera to the server.

The methods 600 and/or 601 may further include, at block 636, in response to the determination of an occurrence of tampering, the server transmitting an instruction to the second A/V recording and communication device to upload second video data captured by the second A/V recording and communication device to the server (e.g., for analysis and/or other processing by the server). Whether the second A/V recording and communication device is an active device (which is always capturing video data) or a passive device (which only captures video data when switched from passive mode to active mode), the video data captured by the second A/V recording and communication device may include evidence of the event associated with the tampering. Accordingly, the server may cause the second A/V recording and communication device to transmit video data captured by the second A/V recording and communication device to the server for processing and/or storage. In an embodiment, the server may instruct the second A/V recording and communication device to transmit video data from the same time period for which video data from the first A/V recording and communication device was collected or stored (e.g., based on timestamps or other time records that indicate the time of detection of tampering).

In some embodiments, the methods 600 and/or 601 may further include receiving information from one or more hub devices located in the geographic area. The received information may include, for example, state information from one or more sensor devices that are communicatively coupled to a hub device. For example, a window sensor coupled to the hub device may indicate that the corresponding window is open and/or has been tampered with. This information may be leveraged in combination with the received information about another tampering event to provide helpful prompts to the user. For example, received information about the physical state of the window and/or detected tampering may cause the methods 600 and/or 601 to generate a prompt to a computing device (e.g., the server above) and/or send a prompt to the user to perform an action. Such a prompt may be generated as a push notification sent to the user's client device, in some embodiments. In various embodiments, the state information from the one or more sensor devices may be received at any time, such as prior to (or after) the events described above with reference to blocks 602 and/or 604.

In yet other embodiments of the methods 600 and/or 601, analysis of collected video data can determine that the data is indicative of movement of an A/V recording and communication device. In other embodiments, analysis of the video data includes determining that the lens of a camera (e.g., of an A/V recording and communication device) is blocked or obscured. Either or both of these analyses may be used to determine a tampering event.

In some embodiments, analysis of collected audio data can include detecting a target frequency or frequency range of the audio data, determining a duration associated with a target frequency or frequency range, and determining that the duration exceeds a predetermined threshold. In one embodiment, determining an occurrence of tampering includes waveform analysis of collected audio data and/or deriving frequency components of the audio data using a fast Fourier transform.

In some embodiments, user input is received by the server regarding tampering associated with collected audio data. Training of the computer model as described herein may be, for example, based at least in part on this user input. In one example, user input is provided to distinguish normal user operation and/or maintenance from unauthorized tampering events.

In yet other embodiments of the methods 600 and/or 601, additional actions can be taken that include, for example, playing a message using a speaker of an A/V recording and communication device. Another action can be, for example, changing an operational state of a light or lamp of the A/V recording and communication device.

In one embodiment, in response to detecting tampering, user control of an A/V recording and communication device(s) is disabled until authentication data associated with the client device is authenticated by the disabled A/V recording and communication device(s). In one example, the authentication data is an audio or text password (e.g., provided by a homeowner or user on her client device or otherwise). In another example, an alarm that has been activated (e.g., in response to detecting tampering) is disabled in response to authentication of the password.

In some embodiments, the methods 600 and/or 601 may further include receiving information (e.g., audio and/or video data, and/or results from analysis of such data) from one or more hub devices (e.g., a hub device as described with reference to FIGS. 12 and 13 below). The received information may include, for example, state information from one or more sensor devices that are communicatively coupled to a hub device. For example, a window sensor coupled to the hub device may indicate that the corresponding window is open. This information may be leveraged in combination with the received information about a tampering event and/or other detected event to initiate one or more of the actions in the methods 600 and/or 601 and/or to provide prompts to a user. For example, received information about the open window and/or tampering may cause the methods 600 and/or 601 to cause a security device(s) or system(s) to arm, and/or to cause sending of a notice to the user of the tampering, and/or a prompt to the user to close the open window or to take other action. Such a notice or prompt may be generated as a push notification sent to the user's client device, in some embodiments. In various embodiments, the state information from the one or more sensor devices may be received at any time, such as prior to (or after) the events described above with reference to blocks 602, 603, 604, and/or 605.

Figure 7:
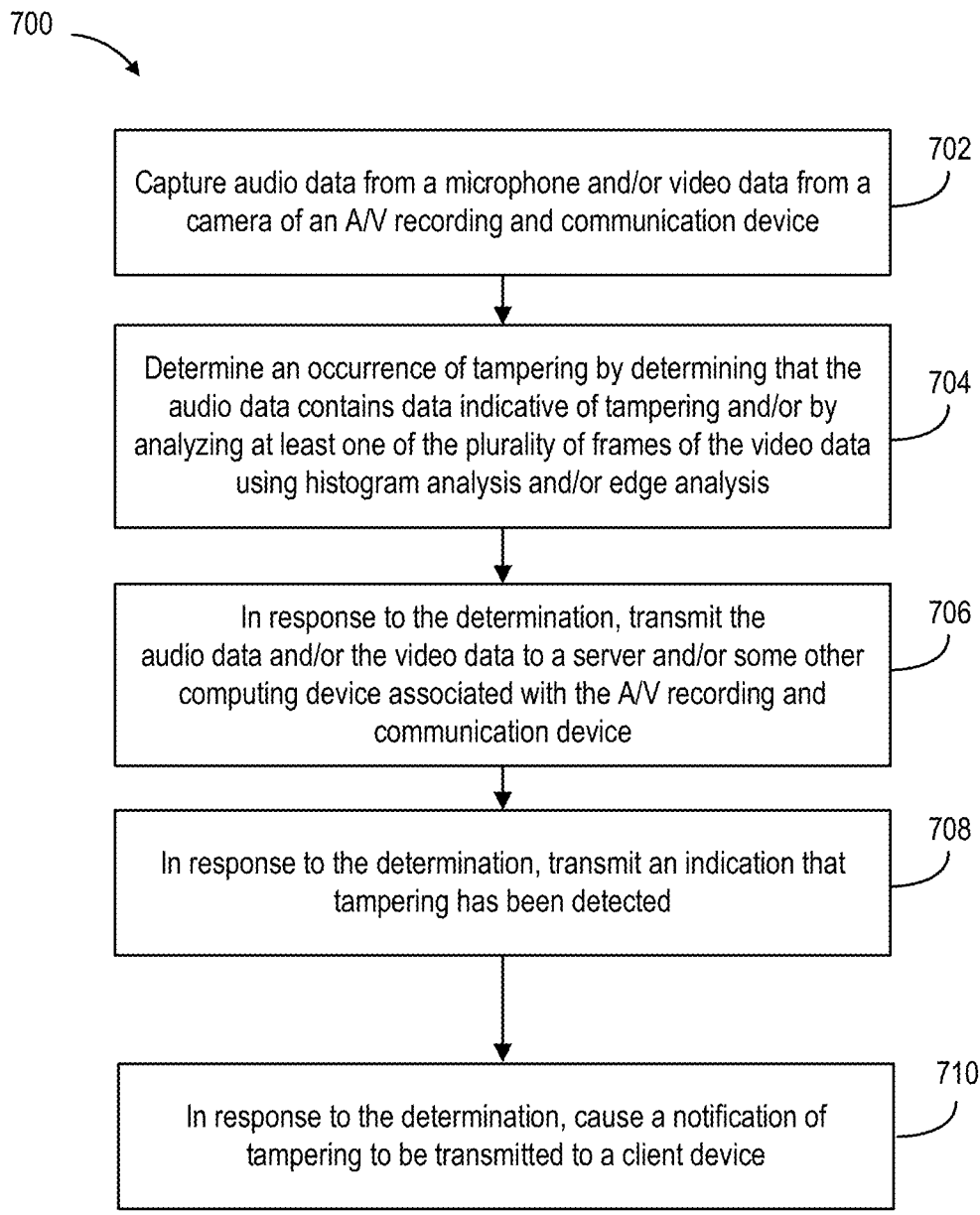
FIG. 7 is a flow chart illustrating an example method for determining an occurrence of tampering based on audio data captured by a microphone of an A/V recording and communication device and/or video data from a camera of an A/V recording and communication device, and various actions taken in response to the determination, according to various aspects of the present disclosure.

FIG. 7 illustrates an example method 700 for determining an occurrence of tampering based on audio data captured by a microphone and/or video data captured by a camera of an A/V recording and communication device (e.g., the A/V recording and communication device 200), and various actions taken in response to the determination, according to various aspects of the present disclosure.

The method 700 may include, at block 702, capturing audio data from a microphone and/or video data from a camera of an A/V recording and communication device. When video is captured, the video data includes a plurality of frames. For example, the audio and/or video data may be collected (e.g., by one or more microphones and/or cameras) as was described above for FIGS. 6A-6D.

The method 700 may further include, at block 704, determining an occurrence of tampering by determining that the audio data contains data indicative of tampering and/or by analyzing at least one of the plurality of frames of the video data using histogram analysis and/or edge analysis. This determination may be performed by the A/V recording and communication device itself. For example, this determination may be performed as was described above with reference to FIGS. 6A-6D. Also, various embodiments of a process for making this determination are described with reference to FIGS. 8A-8D below.

The method 700 may further include, at block 706, in response to the determination of an occurrence of tampering, transmitting audio data captured by the microphone and/or video captured by the camera to a server and/or some other computing device associated with the A/V recording and communication device. For example, the audio and/or video data may be transmitted as was described above with reference to FIGS. 6A-6D.

The method 700 may further include, at block 708, in response to the determination of an occurrence of tampering, transmitting an indication that tampering has been detected. For example, the indication can be transmitted to the server.

The method 700 may further include, at block 710, in response to the determination of an occurrence of tampering, causing a notification of tampering to be transmitted to a client device (e.g., the client device 300). The notification can be, for example, a push notification, a text message, or an email.

In an embodiment, all portions of the method 700 are performed by at least one processor of the first A/V recording and communication device. In this embodiment, the audio and/or video data is received by the processor from the microphone without necessarily transmitting the collected audio and/or video data itself to a server (e.g., analysis of the audio and/or video data can be performed solely by the A/V recording and communication device). In this embodiment, the first A/V recording and communication device may transmit a communication to the server if there is a determination by the at least one processor that tampering is detected.

In other various embodiments, one or more portions of the method 700 (e.g., block 704 and/or block 710) may be performed by one or more processors of a home automation hub, a premises security hub, or the like (e.g., the communication hub 116). Further, embodiments of the method 700 may further include leveraging information known at the hub device, such as state information from one or more sensor devices that are communicatively coupled to the hub device. This additional information may be combined with information about the tampering event to provide helpful prompts to the user, similar to the processes described above with reference to the methods 600 and/or 601 of FIGS. 6A-6D.

FIG. 8A illustrates an example method 800 of processing collected audio data (e.g., by a microphone of an A/V recording and communication device and/or other microphone(s)). The processing determines whether the collected audio data contains data indicative of tampering (e.g., by processing using a computer model), according to various aspects of the present disclosure.

The method 800 may be performed, for example, by the server described with respect to FIGS. 6A-6D above, or by the A/V recording and communication device described with respect to FIG. 7 above, or by the server and the A/V recording and communication device in combination. In various embodiments, one or more portions of the method 800 may be performed by one or more processors of a home automation hub, a premises security hub, or the like (e.g., the communication hub 116).

The method 800 may include, at block 802, calculating a frequency-domain representation of audio data collected from a microphone (e.g., the microphone 214) of an A/V recording and communication device. For example, the frequency-domain representation may be determined using a Fourier transform of the audio data.

In one example, the collected audio data is received as part of a video stream or file by the server. The server then extracts an audio track from the video stream or file. The audio track may be, for example, split into windows (or frames) having a length of 1,024 samples, and using a 512-sample overlap.

The method 800 may further include, at block 804, extracting audio data features from the frequency-domain representation. For example, extracting the audio data features may be done by calculating mel-frequency cepstral coefficients (MFCCs) of the audio data after taking the Fourier transform.

In one example, extracting the audio data features includes calculating MFCCs, calculating a delta, and calculating a double delta, all based on the audio data. In one example, at least a predetermined number of MFCCs are calculated for each window of the audio data.

The method 800 may further include, at block 806, determining a context corresponding to the audio data. For example, mel-frequency cepstral coefficients may be calculated from a first window of the audio data. The context may be determined based on a plurality of windows, other than the first window, of the audio data. In one example, the context is determined using five different time windows.

The method 800 may further include, at block 808, adjusting the audio data features based on the context. For example, the calculated mel-frequency cepstral coefficients may be adjusted based on the context determined using the plurality of windows. The context, for example, permits adjustment of the audio data features to account for ambient or other noises that are expected, and/or are otherwise not associated with tampering.

The method 800 may further include, at block 810, inputting the adjusted audio data features into a computer model. For example, the computer model may be one or more artificial neural networks. For example, the neural networks may be trained based on audio and/or video data collected by the first A/V recording and communication device prior to detection of the tampering (e.g., prior to collecting the audio data used to make a determination that the audio data contains data indicative of tampering).

The method 800 may further include, at block 812, determining an output from the computer model based on the adjusted audio data features. For example, the output from the computer model may be based on the mel-frequency cepstral coefficients calculated above, as adjusted using the context determined from the one or more windows of the collected audio data (e.g., the windows described above).

In one example, the audio data features are passed through an artificial neural network. Segmentation is performed on the output from the neural network to provide segments. The segments are then analyzed.

The method 800 may further include, at block 814, determining that the audio data contains data indicative of tampering by comparing the determined output to a threshold. For example, the threshold may be the occurrence of a predetermined number of outputs from the computer model that are positive, or that exceed a predetermined value. In another example, if any of the analyzed segments above has a length longer than a predetermined value, the server determines that the audio data contains data indicative of tampering.

In various embodiments, at block 802, the frequency-domain representation may be determined as a discrete cosine transform (DCT), discrete sine transform (DST), modified discrete cosine transform (MDCT), discrete Fourier transform (DFT) or a combination of them. Transforms may be computed using efficient fast Fourier transform (FFT) algorithms on a central processing unit (CPU) or by a specialized digital signal processor (DSP). In one example, at block 804, audio data features may be determined as a vector subsampling a number of maximal values from the frequency-domain representation. In another example, audio data features may be determined as principal components generated from the frequency-domain representation by doing principal component analysis (PCA). As an example of a computer model at blocks 810-812, a recurrent neural network (RNN) composed of long short-term memory (LSTM) units may be used. In an embodiment, the threshold used at block 814 can be calculated using a recall-precision curve plotted based on the output of a computer model used at blocks 810-812, on a human-labeled test set.

In another embodiment, the audio data (e.g., the adjusted audio data features determined at block 808) can be matched against a learned database of in-the-field devices (e.g., a database or computer model that has been trained or otherwise built using data previously collected from one or more A/V recording and communication devices).

FIG. 8B illustrates an example method 850 of processing video data collected by an A/V recording and communication device using histogram analysis, according to various aspects of the present disclosure. The processing determines whether the collected video data contains data indicative of tampering, according to various aspects of the present disclosure.

The method 850 may be performed, for example, by the server described with respect to FIGS. 6A-6D above, or by the A/V recording and communication device described with respect to FIG. 7 above, or by the server and the A/V recording and communication device in combination. In various embodiments, one or more portions of the method 850 may be performed by one or more processors of a home automation hub, a premises security hub, or the like (e.g., the communication hub 116).

The method 850 may include, at block 803, determining a background frame from the video data (e.g., selected from video data collected by a camera of an A/V recording and communication device and streamed to a server). In one example, the video data comprises a plurality of frames.

In one example, a background image is initialized based on a single frame from the video data. In some cases, this single frame is picked after a given number of beginning frames are skipped. For example, 30 frames can be skipped. Skipping frames may be done in some cases to receive a focused image, which may not be present at the beginning of a video data stream (e.g., when a camera is first activated from a passive state).

In one example, the video data is grayscale video data. In other embodiments, color video data can be used. In one example, images of the video data are down-sampled to a size of W×H=80×60 pixels resolution. Other sizes can be used in various embodiments.

In an embodiment, for each current frame of the video data to be analyzed, background image intensity values at positions (x, y) of the background frame are set. More specifically, for each frame, the background image is updated as follows:

$$B_{n+1}(x, y) = \begin{cases} \alpha B_n(x, y) + (1 - \alpha)I_n(x, y), \\ \quad \text{if } (x, y) \text{ is not moving} \\ B_n(x, y), \text{ if } (x, y) \text{ is moving} \end{cases}$$

In an embodiment, it is determined whether each pixel is moving as described below.

$B_n(x, y)$ is the previous estimate of the background intensity value at pixel (x, y), and is, for example, a positive real number between 0 and 1. In an embodiment, α is a predetermined constant (e.g., a value that is determined using data validation sets, for example as described herein). In one example, α=0.95.

In an embodiment, a pixel is determined to be moving if the corresponding pixel intensity at a current and previous frame satisfy the following relation:

$$|I_n(x,y) - I_{n-1}(x,y)| > T_n(x,y)$$

$T_n(x, y)$ is an adaptive threshold value for pixels positioned at (x, y). After each background update, all of the threshold values corresponding to each pixel position are updated as follows:

$$T_{n+1}(x, y) = \begin{cases} \alpha T_n(x, y) + (1 - \alpha)(c|I_n(x, y) - B_n(x, y)|), \\ \quad \text{if } (x, y) \text{ is not moving} \\ T_n(x, y), \text{ if } (x, y) \text{ is moving} \end{cases}$$

where c is, for example, a real number greater than one. In one example, the initial adaptive threshold is set, for example, to a value of 128, and c=2. In an embodiment, intensity values for the background frame are updated as described above after analyzing each current frame.

In alternative embodiments, a continuous background initialization approach is used so that a configuration of a scene at the time of background frame initialization does not generate a false positive. This approach is done by averaging intensity values over time. In one example, a predetermined number of frames can be used to calculate a window average value for each pixel. In one example, the predetermined number of frames is 30.

In another embodiment, pixel values in the frames of the video data can be tracked. If pixel values are equal, then the track length is updated by increasing the counter for the respective pixel location. In one example, pixel values are considered to be equal if the absolute difference is less than the noise level, which depends on a camera, and can be equal to 1 for example.

The method 850 may further include, at block 805, determining a plurality of bins of the histogram for a first frame (also sometimes referred to herein as the "current frame") of the plurality of frames from the video data. Each bin has a respective bin value (e.g., a count of intensity values that are within a given bin). In one example, a histogram having 32 bins is created for the first frame. A different number of bins can be used in other embodiments.

The method 850 may further include, at block 807, selecting at least one bin based on at least one bin value (e.g., selecting a bin having a maximum bin count). For example, a bin is selected from the 32 bins created for the histogram (for the first frame) above that has a maximum count value. In one example, the bin with the maximum count value and its two adjacent neighbors are selected. In this example, the bin determined to have the maximum count value is shown in the formula below as $H_{max(H(I_n))}(I_n)$. In an embodiment, a comparison is made of this bin along with its two adjacent neighboring bins (for the first frame and the background frame) using the following condition:

$$(H_{max(H(I_n))-1}(I_n) + H_{max(H(I_n))}(I_n) + H_{max(H(I_n))+1}(I_n)) > \\ Th_3(H_{max(H(I_n))-1}(B_n) + H_{max(H(I_n))}(B_n) + H_{max(H(I_n))+1}(B_n))$$

If the above condition is false, then it is determined that there is no tampering for the current frame. Tampering determination processing for the current frame can be, for example, ended.

If, however, the above condition is true, then processing continues at block 809, which is described below. In one example, $Th_3$ is a predetermined threshold having a value of 2. Other values can be selected in other embodiments.

In various embodiments, the $Th_3$ threshold can be considered a hyperparameter and be calculated using validation sets. In an embodiment, this threshold sets a sensitivity of the analysis and can be, for example, greater than 1. In one example, the threshold is initially set at 1 and increased by 0.1 on each step to make a final selection of the threshold value. For example, this hyperparameter determination can include choosing a set of hyperparameters for a learning algorithm, in order to improve a measure of the method's performance on an independent data set. In one example, a grid search can be used to improve an accuracy of the analysis.

The method 850 may further include, at block 809, comparing pixel intensity values of the current frame to pixel intensity values of the background frame to provide intensity difference values. For example, pixel intensity values ($I_n$) of the first frame can be compared to pixel intensity values ($B_n$) of the background frame to provide these difference values. Blocks 811, 813, and 815 below describe a specific embodiment that can be used to compare pixel intensity difference values using a histogram.

The method 850 may further include, at block 811, selecting a first number of intensity difference values (e.g., from a histogram) to provide a first set. In one example, a histogram of intensity difference values is calculated (e.g., using a histogram having 32 bins). A first number (e.g., 32) of difference values $H_i(I_n - B_n)$ is selected to provide the first set (e.g., each difference value here is a count for a bin of the histogram). In one example, the first set is selected for all 32 bins in the histogram of intensity difference values for the current frame.

The method 850 may further include, at block 813, selecting a second number of the difference values (e.g., of the same histogram) to provide a second set. For example, a second number of intensity difference values $H_i(|I_n - B_n|)$ is selected to provide the second set. In one example, the second set is a number of histogram bins selected that is less than the total number of histogram bins. In one example, the second set is selected for a predetermined number of bins k. In one example, k=3. In various embodiments, k is a number of histogram bins that is less than the total number of bins in the histogram.

The method 850 may further include, at block 815, comparing a first sum of intensity difference values for the first set to a second sum of intensity difference values for the second set. Examples of the first set and the second set were described above.

In an embodiment, this comparison is performed by evaluating the following inequality formula:

$$\sum_{i=1}^{32} H_i(|I_n - B_n|) > Th_4 \sum_{i=1}^{k} H_i(|I_n - B_n|)$$

The above inequality formula is evaluated, for example, to analyze the histograms of image difference between the current image frame and the background frame. If the inequality is false, then it is determined that there is no tampering at the current frame. In one example, the inequality formula is used to determine if a majority of image difference values for the current frame is small. In some embodiments, if the inequality is true, then a determination of tampering can be made for the current frame. In other embodiments, tampering for the current frame is not determined until edge analysis, as described below, is performed for this current frame.

In some embodiments, based on the above analysis of the current frame, a first tampering result for the current frame is stored in a queue. In one example, a tampering result is stored in the queue from analysis of each of a number of frames in succession. A determination of an occurrence of tampering (e.g., by the server at block 604 and/or 605) can include, for example, determining a total number of tampering results stored in the queue and making a comparison to a predetermined value. In an embodiment, the total number of tampering results is compared to the predetermined value to make a decision regarding tampering (e.g., exceeding a predetermined percentage of a total number of results for which tampering of the current frame was determined as described above is considered to be determining an occurrence of tampering with an A/V recording and communication device). In one example, if 50 out of the previous 100 frames are considered tampered from the above histogram analysis, then the server determines that tampering with the A/V recording and communication device has occurred. Other numbers or percentages of frames can be used in other embodiments for making this comparison of frame tampering results stored in the queue.

In an embodiment, the image difference comparison for the inequality formula above uses a predetermined threshold $Th_4$. In one example, $Th_4=2$. This value can vary in other examples.

In various embodiments, the $Th_4$ threshold can be considered a hyperparameter and can be calculated using validation sets. In an embodiment, this threshold sets a sensitivity of the analysis and can be, for example, greater than 1. In one example, the threshold is initially set at 1 and increased by 0.1 on each step to make a final selection of the threshold value. For example, this hyperparameter determination can include choosing a set of hyperparameters for a learning algorithm, to improve a measure of the method's performance on an independent data set. For example, a grid search can be used to improve an accuracy of the analysis.

Figure 8D:
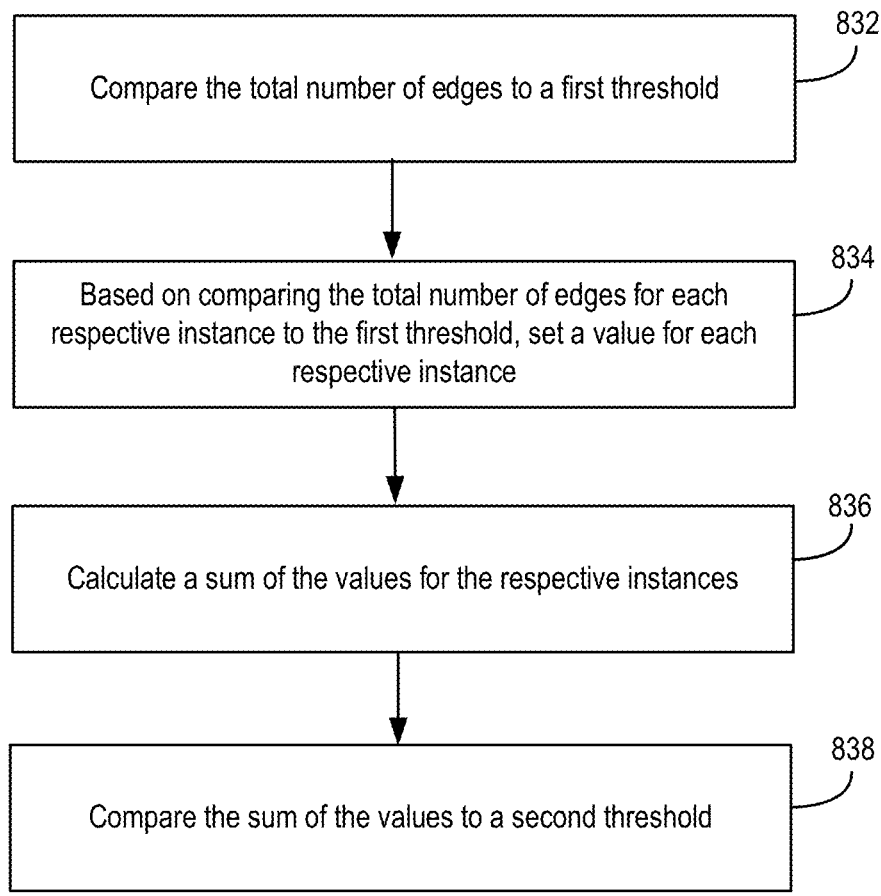

FIGS. 8C and 8D illustrate an example method 851 of processing video data collected by an A/V recording and communication device using edge analysis, according to various aspects of the present disclosure.

The method 851 may be performed, for example, by the server described with respect to FIGS. 6A-6D above, or by the A/V recording and communication device described with respect to FIG. 7 above, or by the server and the A/V recording and communication device in combination. In various embodiments, one or more portions of the method 851 may be performed by one or more processors of a home automation hub, a premises security hub, or the like (e.g., the communication hub 116).

The method 851 may include, at block 820, determining a background frame from video data, wherein the video data comprises a plurality of frames. In an embodiment, the edge analysis is based on a comparison of a first frame of the plurality of frames to the background frame. The first frame is sometimes referred to below as a "current frame." As was mentioned above, in various embodiments, a tampering result is determined for each current frame of a succession of frames from the video data. The tampering result for each frame is stored in the queue mentioned above. In an embodiment, a tampering result for the first frame is determined after both the histogram analysis above and the edge analysis are performed. In various embodiments, the background frame used for edge analysis can be the same background frame as was used for the histogram analysis above. In some embodiments, the edge analysis is performed to avoid or reduce false positive tampering results from the histogram analysis above (e.g., if there are significant light changes in a scene represented by image data for a frame).

The method 851 may further include, at block 822, building a first edges mask based on a first frame of the plurality of frames. In some embodiments, building the first edges mask includes downscaling the first frame. For example, the resolution of the current frame used for histogram analysis above can be further downscaled. In one example, this downscaling provides a frame that is ten times smaller than the frame size (or resolution) used for the histogram analysis.

The method 851 may further include, at block 824, building a second edges mask based on the background frame. In some embodiments, the second edges mask may be built in a similar manner and/or with a similar resolution as for the first edges mask of block 822 above.

The method 851 may further include, at block 826, comparing the first edges mask and the second edges mask. In various embodiments, a number of edges determined from the first edges mask is compared to a number of edges determined from the second edges mask. Some specific embodiments of such comparison are described below with reference to blocks 828, 830, 832, 834, 836, and 838.

The method 851 may further include, at block 828, traversing the first frame using a window size (e.g., this traversing is done to build an edges mask for the current frame and/or to build an edges mask for the background frame). For example, the current frame is traversed with a window, and the stride is equal to, for example, half of the window size. Other portions of the window size may be used in other examples.

The method 851 may further include, at block 830, for each instance of a window during traversing of the first frame, calculating a total number of edges for the respective window instance. For example, for each window, a total number of edges is calculated that are present in the image.

The method 851 may further include, at block 832, comparing the total number of edges calculated at block 830 to a first threshold. The first threshold can be, for example, selected by decreasing 20% the minimum number of edges detected on a train period for a particular device. In some cases, the first threshold is a predetermined value determined by validation data sets, for example as was described for the hyperparameters above.

The method 851 may further include, at block 834, based on comparing the total number of edges for each respective instance to the first threshold, setting a value for each respective instance. For example, if the total number of edges for a given window instance is more than the first threshold, than a value for the whole window instance is set to 1. Otherwise the value of the window instance is set to 0.

The method 851 may further include, at block 836, calculating a sum of the values (e.g., a sum of the values of either a 1 or a 0 for each window instance) determined above for the respective window instances. In an embodiment, a sum is calculated over the edges mask for the current frame and the sum is calculated over the edges mask for the background frame. In one example, the sum is determined by adding the values of 1's and 0's determined above.

The method 851 may further include, at block 838, comparing the sum of the values to a second threshold (e.g., a predetermined value). In an embodiment, if the sum calculated for the current frame edges mask is less than the second threshold, then the frame is considered tampered. If the sum calculated for the background frame edges mask is less than the second threshold, then the frame is considered tampered. In some embodiments, if either or both of these conditions are satisfied, then the current frame is considered tampered.

In one example, the second threshold used above is the same for both the current frame edges mask and the background frame edges mask. For example, the second threshold can be a value of 10. This value can vary in other examples. In some embodiments, the second threshold can be, for example, selected by decreasing 20% the minimum sum of the values calculated at block 836 detected on a train period for a particular device. In some cases, the second threshold is a predetermined value determined by validation data sets, for example as was described above for hyperparameters.

In some embodiments, in addition, or alternatively to the above, the sum calculated from the window instances above for the current frame edges mask is compared to the sum calculated from the window instances above for the background frame edges mask. If the calculated sum for the current frame edges mask is less than the calculated sum for the background frame edges mask (e.g., if the current frame sum is less than the background frame sum by a predetermined percentage or by an absolute number or value), then the current frame is considered tampered. Otherwise, the current frame is considered not tampered.

In various embodiments, after completing the histogram analysis and/or the edge analysis above, a tampering result for each current frame is stored in a queue, as mentioned above. For example, a positive tampering result from any one of the above analyses results in the storing of a positive tampering result in the queue for that frame.

As was mentioned above in one example, if 50 of the previous 100 frames analyzed have a positive tampering result, then the video data is considered to be tampered. In various embodiments, this results in a determination of an occurrence of tampering with the A/V recording and communication device that collected the video data. In yet other embodiments, a different threshold function may be used. For example, a pattern or other characteristics of the tampering results stored in the queue can be analyzed or used as a basis for making a determination of an occurrence of tampering with the A/V recording and communication device.

In an embodiment, the method 850 and/or the method 851 may further include inputting video features extracted from video data into a computer model. For example, the video data used for training the computer model may be collected prior to analyzing the video data used above to determine tampering. In one example, the computer model may be one or more artificial neural networks. For example, the neural networks may be trained based on video data collected by the first A/V recording and communication device prior to detection of the tampering (e.g., prior to collecting the video data used to make a determination that the video data contains data indicative of tampering).

In an embodiment, the method 850 and/or the method 851 may further include determining an output from the computer model based on the extracted video data features. For example, the output from the computer model may be based on an output that is adjusted using a context determined from the collected video data.

In one example, the video data features are passed through an artificial neural network. Segmentation is performed on the output from the neural network to provide segments. The segments are then analyzed.

In an embodiment, the method 850 and/or the method 851 may further include determining that the video data contains data indicative of tampering by comparing the determined output to a threshold. For example, the threshold may be the occurrence of a predetermined number of outputs from the computer model that are positive, or that exceed a predetermined value. In another example, if any of the analyzed segments above has a length longer than a predetermined value, the server determines that the video data contains data indicative of tampering.

Figure 9:
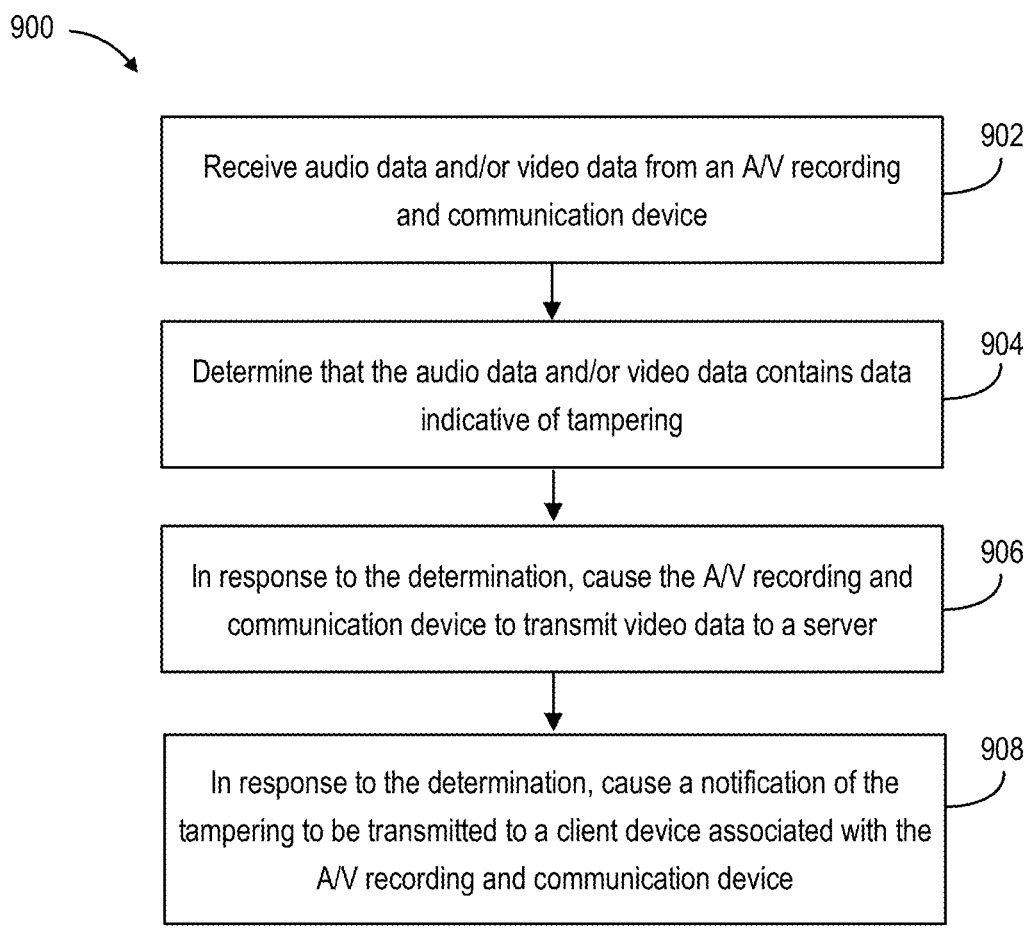
FIG. 9 is a flow chart illustrating an example method for determining that audio and/or video data received from an A/V recording and communication device contains data indicative of tampering, and various actions taken in response to the determination, according to various aspects of the present disclosure.

FIG. 9 illustrates an example method 900 for determining that audio and/or video data received from an A/V recording and communication device (e.g., the A/V recording and communication device 200) contains data indicative of tampering, and various actions taken in response to the determination, according to various aspects of the present disclosure. The method 900 may include, at block 902, receiving audio and/or video data from the A/V recording and communication device.

The audio and/or video data may be received, for example, by a network-connected device. In various embodiments, the network-connected device may be a communication hub, such as a premises security hub, and/or a server (e.g., the backend server 124). The audio and/or video data may be collected by a microphone and/or camera of the A/V recording and communication device. For example, the audio and/or video data may have been captured by one or more of the A/V recording and communication devices 500, 510, 520 of FIGS. 5A-5C, or by some other A/V recording and communication device 200.

The method 900 may further include, at block 904, determining that the audio and/or video data contains data indicative of tampering. In response to determining that the audio and/or video data contains data indicative of tampering, various actions may be taken as discussed with respect to the following portions of the method 900. Various embodiments of the method 900 may omit one or more of the following portions.

The method 900 may further include, at block 906, in response to the determination of tampering, causing the A/V recording and communication device to transmit video data to a server. For example, this transmitted video data may be video data collected prior to the determination of tampering and/or subsequent to this determination.

The method 900 may further include, at block 908, in response to the determination of tampering, causing a notification of the tampering to be transmitted to a client device associated with the A/V recording and communication device.

In various embodiments, the determination at block 904 that the video data contains data indicative of tampering can include detection of tampering using one or more of the approaches described with reference to FIGS. 8B-8D.

In other embodiments, different approaches can be used in addition to, or alternatively to, histogram and edge analysis. In an example, other forms of video frame intensity analysis and/or frame structure analysis may be used.

In another example, shaking of a camera by a perpetrator can be detected based on data from an accelerometer and/or other sensor of an A/V recording and communication device. The detection of shaking may be coupled with a determination of a time duration of such shaking in making a decision regarding tampering with an A/V recording and communication device.

Other examples of conditions that may be considered and/or for which data may be collected in a server making a determination of an occurrence of tampering include the following: a position of a camera itself is changed, a person approaches within a predetermined distance of a camera and looks in the camera at nighttime, a person puts a finger on a camera, a person approaches and places an object on a camera, a camera is blinded with a bright light source such as a torch or laser, a person approaches a camera and places a big object near the camera where the time duration of this activity exceeds a predetermined value, the video data from a camera is almost entirely gray/white/black/noisy video (e.g., to an extent that is above a predetermined threshold), the video data is blurry, a portion of the video frame is not informative (e.g., a predetermined percentage of portion of the frame is covered or blinded), and/or a signal from a camera is completely lost.

Figure 10:
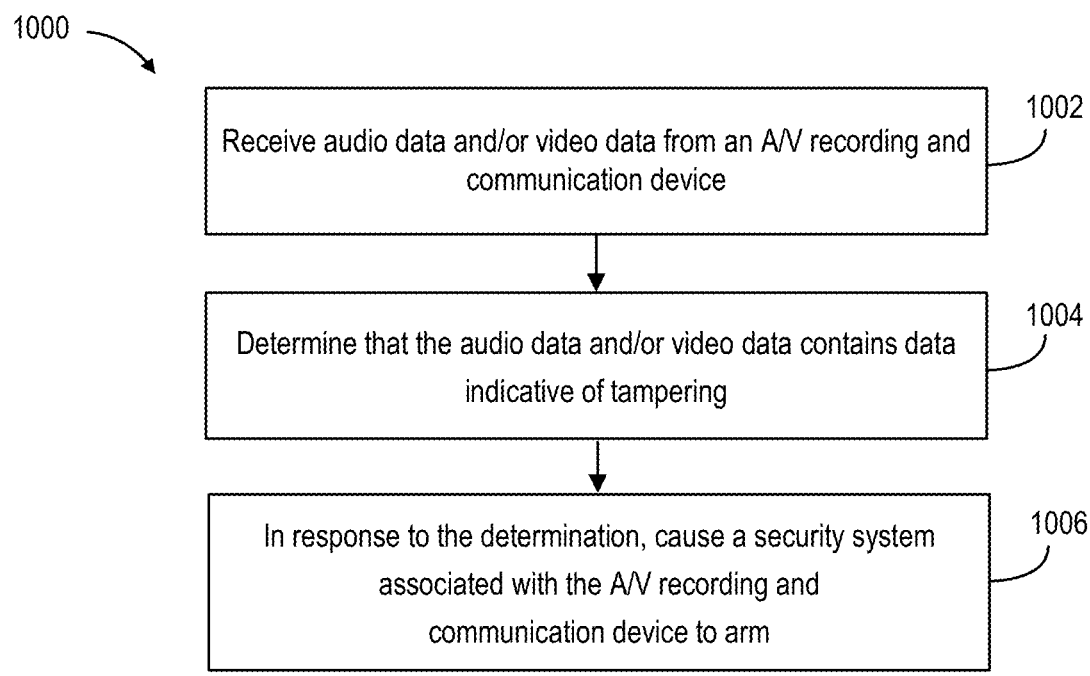
FIG. 10 is a flow chart illustrating an example method for determining that audio and/or video data received from an A/V recording and communication device contains data indicative of tampering, and an arming of a security system performed in response to the determination, according to various aspects of the present disclosure.

FIG. 10 illustrates an example method 1000 for determining that audio and/or video data received from an A/V recording and communication device (e.g., the A/V recording and communication device 200) contains data indicative of tampering, and arming a security system in response to the determination, according to various aspects of the present disclosure. The method 1000 may include, at block 1002, receiving audio and/or video data from the A/V recording and communication device.

The audio and/or video data may be received, for example, by a network-connected device. In various embodiments, the network-connected device may be a communication hub, such as a premises security hub, and/or a server (e.g., the backend server 124). The audio and/or video data may be collected by a microphone and/or camera of the A/V recording and communication device. For example, the audio and/or video data may have been captured by one or more of the A/V recording and communication devices 500, 510, 520 of FIGS. 5A-5C, or by some other A/V recording and communication device 200.

The method 1000 may further include, at block 1004, determining that the audio and/or video data contains data indicative of tampering. The method 1000 may further include, at block 1006, in response to the determination of tampering, causing a security system associated with the A/V recording and communication device to arm. For example, the method 1000 may include transmitting an instruction to a communication hub (e.g., the communication hub 116 of FIG. 1) to arm a security system(s) at the location of the A/V recording and communication device and/or at another location (e.g., to transition the security system(s) from an unarmed state to an armed state, if the security system(s) is not already in an armed state).

Figure 11:
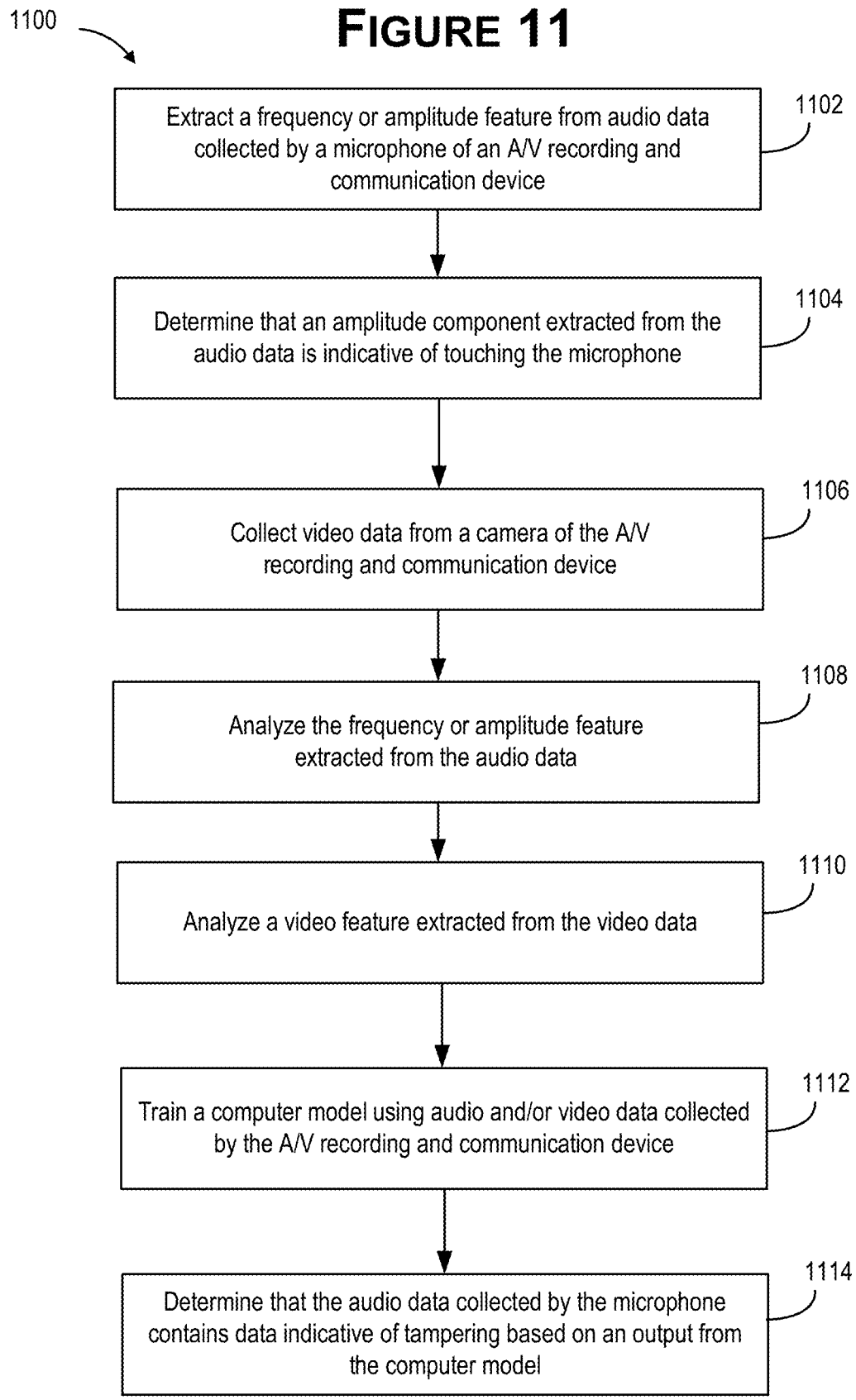
FIG. 11 is a flow chart illustrating an example method for determining an occurrence of tampering based on audio data collected by an A/V recording and communication device, where the determination is based on an output from a computer model trained using audio and/or video data collected by the A/V recording and communication device, according to various aspects of the present disclosure.

FIG. 11 illustrates an example method 1100 for determining an occurrence of tampering based on audio data collected by an A/V recording and communication device (e.g., the A/V recording and communication device 200), where the determination is based on an output from a computer model trained using audio and/or video data collected by the A/V recording and communication device. Various actions of the method 1100 are described below and generally relate to data analysis of audio and/or video data (e.g., data collected by a microphone and/or camera of one or more A/V recording and communication devices 200).

In various embodiments, these actions can be performed in differing combinations (e.g., in combination with approaches described above for histogram and/or edge analysis). In some embodiments, the determination of tampering is based on an output from a computer model that has been trained using audio and/or video data collected by A/V recording and communication device(s), according to various aspects of the present disclosure.

The method 1100 may include, at block 1102, extracting a frequency or amplitude feature from audio data collected by a microphone of an A/V recording and communication device.

The method 1100 may further include, at block 1104, determining that an amplitude component extracted from the audio data is indicative of touching the microphone. This action is optional, but may be performed along with other actions in the method 1100. In some embodiments, a determination that the microphone has been touched can be, for example, considered to be equivalent to a determination of tampering, with various responsive actions taken as described herein. In some embodiments, the extracted amplitude component is compared to prior known audio data associated with touching of a microphone.

The method 1100 may further include, at block 1106, collecting video data from the camera of the A/V recording and communication device. Collecting the video data is an optional addition to the collection of the audio data at block 1102. In some embodiments, the collecting of the video data is triggered in response to a determination of tampering and/or another form of detection that has occurred (e.g., detection of a gunshot by a server). The video data collected at block 1106 may be different from the video data used for histogram and/or edge analysis above.

The method 1100 may further include, at block 1108, analyzing the frequency or amplitude feature extracted from the audio data at block 1102. This analysis can include, for example, various fast classification schemes.

The method 1100 may further include, at block 1110, analyzing a video feature extracted from the video data collected at block 1106. In various embodiments, this analysis can be performed in conjunction with, or instead of, the analysis at block 1108.

The method 1100 may further include, at block 1112, training a computer model using audio and/or video data collected by the A/V recording and communication device. For example, the audio data can be collected by the microphone used at block 1102. In other examples, at least a portion of the audio data can be audio data collected by other computing devices and/or sensors. In one embodiment, the computer model is trained using supervised and/or unsupervised learning.

The method 1100 may further include, at block 1114, determining that the audio data collected by the microphone contains data indicative of tampering based on an output from the computer model. In some embodiments, this determination can be based at least in part on analysis of audio data as described with reference to FIG. 8 above. In one embodiment, the audio data is analyzed using the computer model, including geometric matching to determine a match to the audio data. In response to determining the match, additional analysis of the audio data is performed using the computer model.

In other embodiments, the method 1100 may further include, for example, analyzing, by at least one classifier, a frequency or amplitude feature and/or video feature extracted from data obtained by the server from an A/V recording and communication device. In one embodiment, the classifier is a Gaussian mixture model (GMM) classifier.

Figure 12:
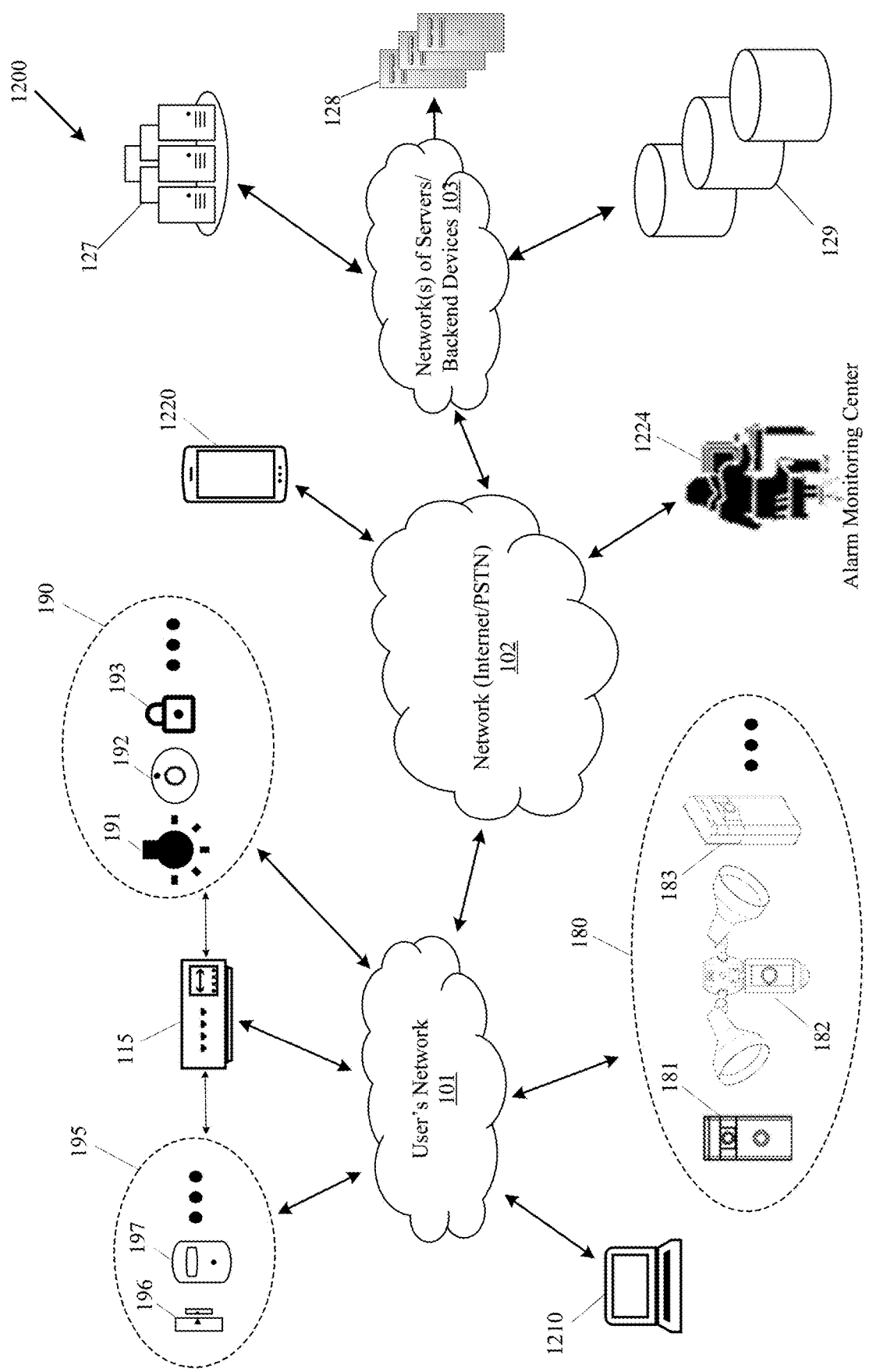
FIG. 12 is a functional block diagram illustrating a system including a hub device with which certain embodiments may be implemented, according to various aspects of the present disclosure.

FIG. 12 is a functional block diagram illustrating a system 1200 including a hub device 115 with which certain of the embodiments described above may be implemented, according to various aspects of the present disclosure. The system 1200 can be used for communication between several user devices. The system 1200 is connected to a user's network (e.g., a home network) 101, and remote servers and other remote devices connected to other networks 102, 103. Specifically, the user's network 101, in some of the present embodiments, may include the hub device 115, security/alarm devices 195 and smart home devices 190 associated with the hub device 115, client device(s) 1210, and audio/video (A/V) recording and communication devices 180. An alarm monitoring center 1224 and a client device 1220, among other entities and devices, may be connected to the network 102 (e.g., a public network). Additionally, the backend network 103 may include several backend devices, such as one or more remote storage devices 129, one or more servers 128, and one or more backend application programming interfaces (APIs) 127.

The user's network 101 may be, for example, a wired and/or wireless network (e.g., Ethernet network, Wi-Fi network, ZigBee network, Z-Wave network, etc.). Alternatively, or in addition, the user's network 101 may comprise various networks such as a cellular/mobile network, a local network, a public network, a low-bandwidth network, and/or any other appropriate network. If the user's network 101 is wireless, or includes a wireless component, the network 101 may be a Wi-Fi network compatible with the IEEE 802.11 standard and/or other wireless communication standard(s).

As shown in FIG. 12, the user's network 101 is connected to another network 102, which may comprise, for example, the Internet and/or a public switched telephone network (PSTN). As described below, the security devices 195, the smart home devices 190, and the A/V recording and communication devices 180 may communicate with the client devices 1210, 1220 via the network 101 and the network 102 (Internet/PSTN). In various embodiments, any or all of the hub device 115, the security devices 195, the smart home devices 190, and the A/V recording and communication devices 180 may communicate with the client devices 1210, 1220 directly (e.g., using one or more wireless technologies and/or protocols, such as Bluetooth, Bluetooth LE, ZigBee, Z-Wave, etc.). The network 102 may be any wireless network or any wired network, or a combination thereof, configured to operatively couple the above-mentioned modules, devices, and systems as shown in FIG. 12. For example, the network 102 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

With further reference to FIG. 12, the hub device 115, in some of the present embodiments, may comprise any device that facilitates communication with and control of the alarm devices 195 and the smart devices 190. In some aspects of the present embodiments, the hub device 115 may also facilitate communication with and control of the A/V recording and communication devices 180. The hub device 115 may be powered by a connection to an external power (e.g., AC mains). Additionally, the hub device 115 may include an internal backup battery to which the hub device 115 switches when the external power is disconnected.

The security devices 195 and the smart devices 190, in some of the present embodiments, may communicate with the hub device 115 directly (e.g., using one or more wireless technologies and/or protocols, such as Bluetooth, Bluetooth LE, ZigBee, Z-Wave, etc.) and/or indirectly (e.g., via the user's network 101). In some of the present embodiments, the A/V recording and communication devices 180 may communicate with the hub device 115 through one or more networks (e.g., the user's network 101 and the network 102). Although not shown in FIG. 12, in some embodiments, the hub device 115 may communicate directly with the A/V recording and communication devices 180 (e.g., via wired and/or wireless channels). The hub device 115 may include any or all of the components and/or functionality of a hub device 1301 described in detail below with reference to FIG. 13.

With continued reference to FIG. 12, the alarm devices 195 may include, but are not limited to, monitoring sensors, such as contact sensors 196 (e.g., door sensors, window sensors, etc.), motion sensors 197, noise detectors (not shown), glass-break sensors (not shown), and/or other similar intrusion detection sensors. These sensors (or detectors) may be used for monitoring and/or detecting unauthorized entry into a property. As will be described in more detail below, when any of the sensors 195 are tripped (or triggered), the sensor may immediately transmit an intrusion event signal to the hub device 115 via a communication path (e.g., a wireless and/or wired channel).

The smart devices 190 may include, but are not limited to, indoor/outdoor lighting systems (e.g., smart light emitting diodes (LEDs) 191), temperature control systems (e.g., thermostats 192), locking control systems for doors and/or windows (e.g., smart locks 193), shade/blind control systems (not shown), or any other automation (or smart home) devices that can communicate with, and be controlled by, the hub device 115.

In some of the present embodiments, the hub device 115 may be a component of a home automation system installed at a property of a user who is associated with the client devices 1210, 1220. Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. The smart home devices 190 and the alarm devices 195, when remotely monitored and controlled via the network (Internet/PSTN) 102, may be considered to be components of the Internet of Things. The home automation system may use one or more communication technologies and/or protocols, including either or both of wired and wireless protocols, including but not limited to Wi-Fi, X10, Ethernet, RS-485, 6LoWPAN, BTLE, ZigBee, and Z-Wave.

The smart home devices 190 and the alarm devices 195 may be controlled via a user interface in some of the present embodiments. The user interface may include any or all of a wall-mounted terminal, software installed on the client devices 1210, 1220 (e.g., a mobile application), a tablet computer or a web interface, and may communicate with Internet cloud services. In addition to communicating with, and/or controlling, the smart home devices 190 and the alarm devices 195, in various embodiments, the client devices 1210, 1220 may also be configured to be in network communication with, and/or controlling, the A/V recording and communication devices 180 (e.g., via the networks 101 and 102). The client devices 1210, 1220 may comprise, for example, a mobile phone such as a smartphone, or a computing device such as a tablet computer, a laptop computer, a desktop computer, etc. The client devices 1210, 1220 may include any or all of the components and/or functionality of the client device 300 described above with reference to FIG. 3.

With further reference to FIG. 12, the system 1200 may also include one or more A/V recording and communication devices 180 (e.g., installed at the same property where the alarm devices 195 and smart home devices 190 are installed). The A/V recording and communication devices 180 may include, but are not limited to, video doorbells 181, lighting systems with A/V recording and communication capabilities (e.g., floodlight cameras 182, spotlight cameras (not shown), etc.), security cameras 183, or any other similar devices. The structure and functionality of exemplary A/V recording and communication devices 180 can be, for example, similar to that as illustrated and described above with reference to FIGS. 5A-5C. As described above, in some embodiments, the user may control the A/V recording and communication devices 180 using either or both of the client devices 1210, 1220. Additionally, in some embodiments, the user may control the A/V recording and communication devices 180 through the hub device 115 (e.g., using either or both of the client devices 1210, 1220). In some embodiments, however, the client devices 1210, 1220 may not be associated with an A/V recording and communication device.

As described above, a user may control the smart home devices 190, the alarm devices 195, and/or the A/V recording and communication devices 180, using one or more applications executing on a client device of the user (e.g., the client device 1220). For example, the user may turn on/off the lights 191, may turn up/down the temperature using the thermostat 192, may lock/unlock the doors and windows through the locks 192, etc. The user may also arm/disarm one or more of the security/alarm devices 195 (and one or more of the A/V recording and communication devices 180) using the client devices 1210, 1220.

With further reference to FIG. 12, the system 1200 may also include one or more remote storage devices 129 (may be referred to interchangeably as "cloud storage device(s)"), one or more servers 128, and one or more backend application programming interfaces (APIs) 127 that are connected to network 103. The network 103 may be similar in structure and/or function to the above-described user's network 101. The hub 115 (and in some embodiments the hub's associated security devices 195 and smart devices 190) and/or the A/V recording and communication devices 180 may communicate with, and be managed by, the remote servers 128 and APIs 127 through the networks 101, 102, and 103. Examples of such communications are described below.

While FIG. 12 illustrates the storage devices 129, the servers 128, and the backend APIs 127 as components of the network 103 and separate from the network 102, in some aspects of the present embodiments, one or more of the storage devices 129, the servers 128, and the backend APIs 127 may be components of the network 102. Additionally, in some embodiments, the storage devices 129 may be separate from the backend servers 128 or may be an integral component of the backend servers 128. Any of the backend APIs 127 may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

Each of the backend APIs 127 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming graphical user interface (GUI) components. For example, an API may facilitate integration of new features into existing applications (a so-called "plug-in API"). An API may also assist otherwise distinct applications with sharing data, which can help to integrate and enhance the functionalities of the applications.

Each of the backend APIs 127 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both run on the same machine. Clients and servers may have a user interface, and sometimes other hardware associated with them.

With continued reference to FIG. 12, the system 1200 may also include the security/alarm monitoring center 1224. In some embodiments, each time the hub 115 receives an intrusion alert signal from one or more of the security/alarm devices 195 (e.g., when one or more of the sensors 196 and/or 197 are triggered), the hub 115 may send a security breach signal to the security/alarm monitoring center 1224. In addition to the hub 115, the A/V recording and communication devices 180 of some embodiments may also send a security breach signal to the security/alarm monitoring center 1224 when these devices determine that an emergency situation has occurred. For example, when one of the A/V recording and communication devices 180 (e.g., the floodlight camera 182) detects a suspicious person and/or activity in an area about the location of the A/V recording and communication device, the device may send a security breach signal to the alarm monitoring center 1224.

The security/alarm monitoring center 1224 (e.g., an operator of the center) may, in turn, dispatch civil authorities to investigate the monitored premises and/or may send other types of notifications, including, but not limited to, text messages, such as SMS (Short Message Service) messages, MIMS (Multimedia Messaging Service) messages, email messages, voice messages (either live or recorded), etc. to one or more client devices of a user, such as the client devices 1210, 1220. Typically, when the security/alarm monitoring center 1224 does not receive an acknowledgment from the user, or receive an acknowledgment in which the user informs the center of an emergency situation (e.g., the user is away from home), the monitoring center may contact an emergency call center (not shown in the communication system 1200). The emergency call center may comprise a local 911 call center that serves a region in which the hub 115 is located. The emergency call center may also be reached by the client devices 1210, 1220, and/or the backend devices 127, 128 directly (e.g., using a PSTN) or indirectly (e.g., through the networks 101, 102, and 103).

In some alternative embodiments, the security monitoring center 1224 may not be a separate entity different from the backend servers 128 (and/or the backend APIs 127). For example, in some of the present embodiments, the backend servers 128 may monitor the home security devices 195 and/or the hub 115 (and other security systems not shown in the figures) in addition to managing the hub 115 and/or the A/V recording and communication devices 180.

Figure 13:
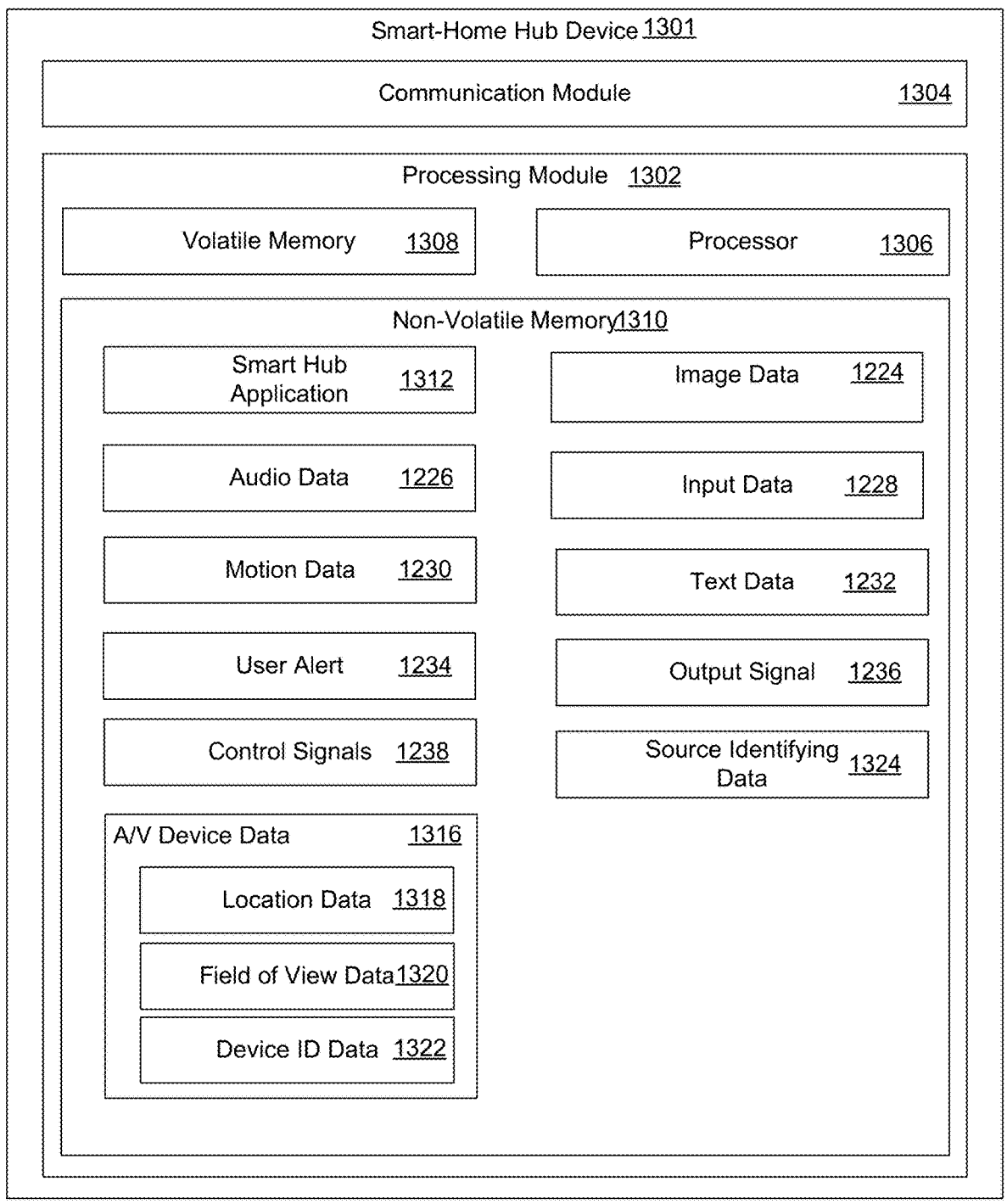
FIG. 13 is a functional block diagram illustrating an example embodiment of a hub device with which certain embodiments may be implemented, according to various aspects of the present disclosure.

FIG. 13 is a functional block diagram illustrating an embodiment of a smart-home hub device 1301 (alternatively referred to herein as the "hub device 1301") according to various aspects of the present disclosure. The hub device 1301 may be, for example, one or more of a Wi-Fi hub, a smart-home hub, a hub of a home security/alarm system, a gateway device, a hub for a legacy security/alarm system (e.g., a hub for connecting a pre-existing security/alarm system to a network (e.g., an Internet/PSTN network) for enabling remote control of the hub device 1301), and/or another similar device. The hub device 1301 may comprise a processing module 1302 that is operatively connected to a communication module 1304. In some embodiments, the hub device 1301 may comprise one or more of a camera (not shown), a microphone (not shown), and a speaker (not shown). The processing module 1302 may comprise a processor 1306, volatile memory 1308, and non-volatile memory 1310, which includes a smart-home hub application 1312.

In various embodiments, the smart-home hub application 1312 may configure the processor 1306 to receive sensor data from sensors and/or automation devices. For example, the sensor data may include a current state (e.g., opened/closed for door and window sensors, motion detected for motion sensors, living room lights on/off for a lighting automation system, etc.) of each of the sensors and/or the automation devices. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors and/or the automation devices as well as any updates to the current state based on sensor triggers.

With further reference to FIG. 13, the smart-home hub application 1312 may configure the processor 1306 to receive the audio data 1226, the text data 1232, the image data 1224, the motion data 1230, the input data 1228, and/or the user alert 1234 from the A/V recording and communication device 180 (in some embodiments, via the backend server 128) using the communication module 1304. For example, the hub device 1301 may receive and/or retrieve (e.g., after receiving a signal from the A/V recording and communication device 180 that the A/V recording and communication device 180 has been activated) the image data 1224, the input data 1228, and/or the motion data 1230 from the A/V recording and communication device 180 and/or a backend server in response to motion being detected by the A/V recording and communication device 180. In addition, the smart-home hub application 1312 may configure the processor 1306 to receive control signals 1238 from the client device 1210, 1220.

As described herein, at least some of the processes of the A/V recording and communication device 180, the backend server 128, and/or the client device 1210, 1220 may be executed by the hub device 1301. For example, without limitation, the processor 1306 of the hub device 1301 may utilize computer vision processing and/or image processing to determine that the image data 1224 depicts one or more objects.

In some embodiments, the A/V device data 1316 may include location data 1318, field of view data 1320, and/or device identification data 1322. The location data 1318 may include information about locations of A/V recording and communication devices 180. For instance, the location data 1318 may include coordinates (e.g., GPS coordinates, Cartesian coordinates, or the like), addresses, or other location information of the associated A/V recording and communication devices 180.

The field of view data 1320 may include information about a size and/or extent of a field of view associated with each of the A/V recording and communication devices 180. In some instances, the field of view data 1320 may include multiple fields associated with each A/V recording and communication device 180. For instance, a first field of view may be associated with the camera's 1204 field of view, a second field of view may be associated with the motion sensor's 1208 field of view, and additional field of views may be associated with still further sensor types. The field of view data 1320 may include coordinates associated with the extents of the respective field of view (e.g., relative to the location data 1318). For example, the field of view of the camera 1204 may be defined by a plurality of coordinates that make up the field of view of the camera 1204. In some embodiments, the coordinates of the field of view of the camera 1204 may include a smaller field of view than the actual field of view of the camera 1204. For example, the field of view of the camera 1204 may include the lawn, the sidewalk, and/or the street in front of the property, but the coordinates may only include the portion of the field of view that are part of the property (e.g., the lawn and the sidewalk). As such, only the portion of the field of view of the camera 1204 (or similarly, the field of view of the motion sensor 1208) defined by the coordinates may be utilized in motion detection and/or object tracking at the property.

The device identification data 1322 may include additional information about specific A/V recording and communication devices 180. For example, the device identification data may include a type, a model, or the like associated with the A/V recording and communication devices. In some embodiments, the device identification data 1322 may be used to determine the extents of a field of view associated with a specific A/V recording and communication device 180. For example, a camera of a first A/V recording and communication device 180 may have a field of view that extends a distance of 100 feet, while a camera of second A/V recording and communication device 180 may have a field of view that extends a distance of 120 feet.

The processors 1306 may be configured to generate and transmit, using the communication module 1304 and to a A/V recording and communication device 180 and/or the backend server, a control signal 1238 that causes the A/V recording and communication device 180 to begin the capture and/or transmission of image data 1224. For example, and using the example above, upon detecting that an object has entered a field of view of the second A/V recording and communication device 180, the processor 1306 of the hub device 1301 may transmit, using the communication module 1304, a control signal 1238 to the second A/V recording and communication device 180 to begin the capture and/or transmission of second image data 1224 of the field of view of the second A/V recording and communication device 180.

In some embodiments, after transmitting the control signal 1238, the processor 1306 of the hub device 1301 may continue to receive, using the communication module 1212, the first image data 1224 from the first A/V recording and communication device 180 and/or begin to receive the second image data 1224 from the second A/V recording and communication device 180 and/or the backend server. Additionally, the processor 1306 of the hub device 1301 may continue to analyze the first image data 1224 being received. Based on the analysis, the processor 1306 of the hub device 1301 may determine that the first image data 1224 no longer depicts the object. In response, the processor 1306 of the hub device 1301 may generate and transmit, using the communication module 1212 and to client device 1210, 1220 and/or the backend server, the second image data 1224 for display on the client devices 1210, 1220. The processor may also generate and transmit an additional control signal 1238 that causes the first A/V recording and communication device 180 to stop capturing and/or transmitting the first image data 1224.

In further reference to FIG. 13, the non-volatile memory 1310 may also include source identifying data 1324 that may be used by the processor 1306 of the hub device 1301 to identify the A/V recording and communication device(s) 180 and/or the client devices 1210, 1220. In addition, the source identifying data 1324 (which may include some or all of the data of the A/V device data 1316) may be used by the processor 1306 of the hub device 1301 to determine the client devices 1210, 1220 associated with the A/V recording and communication device(s) 180. Furthermore, the source identifying data 1324 may be used by the processor 1306 of the hub device 1301 to determine that the first A/V recording and communication device 180 is associated with the second A/V recording and communication device 180. For example, the source identifying data 1324 may store locations (which may include the location data 1318) of respective A/V recording and communication devices 180. The processor 1306 of the hub device 1301 may thus use the source identifying data 1324 to identify a first location of the first A/V recording and communication device 180 and a second location of the second A/V recording and communication device 180. The processor 1306 of the hub device 1301 may then determine that the first location corresponds to the second location (e.g., the first location matches the second location) and, based on the determination, determine that the first A/V recording and communication device 180 is associated with the second A/V recording and communication device 180.

As described above, the present embodiments leverage the capabilities of A/V recording and communication devices, thereby advantageously collecting audio and/or video data using one or more A/V recording and communication devices, and detecting tampering based on the collected audio and/or video data. As a result, the tampering detection may permit more rapid notification and/or response by a homeowner or renter, a public safety official, and/or other persons or systems to such suspicious activity. These capabilities permit the devices to reduce crime and increase public safety.

While various aspects and implementations have been disclosed herein, other aspects and implementations will be apparent to those skilled in the art. The present embodiments are susceptible to modifications and alternate constructions from those discussed above. Consequently, the present invention is not limited to the particular embodiments disclosed. Rather, numerous modifications and alternate constructions fall within the spirit and scope of the present disclosure. For example, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined. The steps in the processes described herein need not be performed in the same order as they have been presented, and may be performed in any order(s), unless logic dictates a particular order. Further, steps that have been presented as being performed separately may in alternative embodiments be performed concurrently. Likewise, steps that have been presented as being performed concurrently may in alternative embodiments be performed separately. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The various embodiments of the present detection of tampering based on audio data from a microphone and/or video data from a camera have several features, no single one of which is solely responsible for their desirable attributes. Without limiting the scope of the present embodiments as expressed by the claims that follow, their more prominent features now will be discussed briefly. After considering this discussion and the rest of the "Detailed Description," one will understand how the features of the present embodiments provide the advantages described herein.

One aspect of the present embodiments includes the realization that tampering with an audio/video (A/V) recording and communication device (e.g., tampering with a camera of the A/V recording and communication device by a potential thief or other perpetrator) in the proximity of a home or business location is an event that indicates a potentially dangerous or otherwise threatening situation. The failure to detect the tampering may prevent taking protective or other measures that are appropriate for this type of situation. The present embodiments solve this problem by leveraging the functionality of A/V recording and communication devices, such as A/V recording and communication doorbells, to detect tampering based on analysis of audio data collected by a microphone of the A/V recording and communication device, and in response to transmit one or more communications, and/or perform one or more other actions.

Another aspect of the present embodiments includes the realization that, when tampering occurs, video evidence of the perpetrator(s) can be invaluable in the effort to apprehend the perpetrator(s). Currently, however, there is no known mechanism for generating video image data in response to detected tampering. The present embodiments solve this problem by leveraging the functionality of A/V recording and communication devices to detect tampering based on analysis of audio data collected by a microphone of the A/V recording and communication device, and in response to record video image data. The present embodiments thus advantageously leverage the distributed nature of A/V recording and communication devices, such as A/V recording and communication doorbells, to create a network of devices capable of detecting tampering and, in response, generating video evidence. The video evidence can be used to identify and apprehend criminal suspects, thereby helping to make neighborhoods and communities safer.

Another aspect of the present embodiments includes the realization that, when tampering occurs (which is often followed by theft of property), the perpetrator tends to quickly leave the area where the tampering occurred. It can thus be difficult to track and apprehend such perpetrators. The present embodiments solve this problem by leveraging the functionality of A/V recording and communication devices, as well as the distributed nature of such devices, to detect tampering based on analysis of audio data collected by a microphone of the A/V recording and communication device, and in response to track the perpetrator(s) by capturing video image data and providing the video image data to law enforcement personnel in real time. Certain of the present embodiments may further leverage the capabilities of A/V recording and communication devices to identify perpetrators using techniques such as biometrics, facial recognition, computer vision, etc. By assisting law enforcement in tracking criminal perpetrators, the present embodiments help to keep neighborhoods and communities safe.

Another aspect of the present embodiments includes leveraging information (e.g., audio and/or video data) gathered about tampering and/or other events by a distributed network of A/V recording and communication devices, in accordance with the present embodiments. For example, the information gathered may be used to send alerts to client devices associated with the A/V recording and communication devices. The alerts may be informative (e.g., providing information to the user about the tampering event), and may also prompt the user to take responsive action. For example, the distributed network of A/V recording and communication devices may be further leveraged to gather state information from one or more sensor devices, such as door and window sensors. Where the state of a user's window sensor indicates that the window is open, an alert about a tampering event may further include a prompt to the user to close the open window and/or implement other security measures.

One aspect of the present embodiments includes the realization that tampering with an audio/video (A/V) recording and communication device (e.g., tampering with a camera of the A/V recording and communication device by a potential thief or other perpetrator) in the proximity of a home or business location is an event that indicates a potentially dangerous or otherwise threatening situation. The failure to detect the tampering may prevent taking protective or other measures that are appropriate for this type of situation. The present embodiments solve this problem by leveraging the functionality of A/V recording and communication devices, such as A/V recording and communication doorbells, to detect tampering based on analysis of video data collected by a camera of the A/V recording and communication device, and in response to transmit one or more communications, and/or perform one or more other actions.

Another aspect of the present embodiments includes the realization that, when tampering occurs, video evidence of the perpetrator(s) can be invaluable in the effort to apprehend the perpetrator(s). Currently, however, there is no known mechanism for generating video image data in response to detected tampering. The present embodiments solve this problem by leveraging the functionality of A/V recording and communication devices to detect tampering based on analysis of video data collected by a camera of the A/V recording and communication device, and in response to record video image data. The present embodiments thus advantageously leverage the distributed nature of A/V recording and communication devices, such as A/V recording and communication doorbells, to create a network of devices capable of detecting tampering and, in response, generating video evidence. The video evidence can be used to identify and apprehend criminal suspects, thereby helping to make neighborhoods and communities safer.

Another aspect of the present embodiments includes the realization that, when tampering occurs (which is often followed by theft of property), the perpetrator tends to quickly leave the area where the tampering occurred. It can thus be difficult to track and apprehend such perpetrators. The present embodiments solve this problem by leveraging the functionality of A/V recording and communication devices, as well as the distributed nature of such devices, to detect tampering based on analysis of video data collected by a camera of the A/V recording and communication device, and in response to track the perpetrator(s) by capturing video image data and providing the video image data to law enforcement personnel in real time. Certain of the present embodiments may further leverage the capabilities of A/V recording and communication devices to identify perpetrators using techniques such as biometrics, facial recognition, computer vision, etc. By assisting law enforcement in tracking criminal perpetrators, the present embodiments help to keep neighborhoods and communities safe.

Another aspect of the present embodiments includes leveraging information (e.g., video and/or audio data) gathered about tampering and/or other events by a distributed network of A/V recording and communication devices, in accordance with the present embodiments. For example, the information gathered may be used to send alerts to client devices associated with the A/V recording and communication devices. The alerts may be informative (e.g., providing information to the user about the tampering event), and may also prompt the user to take responsive action. For example, the distributed network of A/V recording and communication devices may be further leveraged to gather state information from one or more sensor devices, such as door and window sensors. Where the state of a user's window sensor indicates that the window is open, an alert about a tampering event may further include a prompt to the user to close the open window and/or implement other security measures.

In a first aspect, a method for detecting tampering based on audio data collected from a microphone of an audio/video (A/V) recording and communication device is provided. The method may include receiving, by a first computing device, the audio data from the A/V recording and communication device; determining, by the first computing device, an occurrence of tampering, wherein determining the occurrence of tampering may include analyzing at least one characteristic of the audio data, wherein the at least one characteristic is at least one of a frequency, a combination of frequencies, a duration, or an amplitude; and wherein determining the occurrence of tampering may further include determining that the audio data contains data indicative of tampering; and the method may further include, in response to determining the occurrence of tampering, causing a notification of tampering to be transmitted to a client device associated with the A/V recording and communication device.

In an embodiment of the first aspect, determining the occurrence of tampering may further include receiving an indication that tampering has been detected by the A/V recording and communication device.

In an embodiment of the first aspect, determining the occurrence of tampering may further include determining that video data collected by a camera of the A/V recording and communication device contains data indicative of tampering.

In an embodiment of the first aspect, the video data is indicative of movement of the A/V recording and communication device.

In an embodiment of the first aspect, determining that the video data contains data indicative of tampering may include analyzing the video data to detect a blocking or an obscuring of a lens of the camera.

In an embodiment of the first aspect, determining the occurrence of tampering may further include analyzing data collected by a sensor of the A/V recording and communication device, and the sensor may be configured to detect motion of the A/V recording and communication device.

In an embodiment of the first aspect, determining the occurrence of tampering may further include detecting a target frequency or frequency range of the audio data; determining a duration associated with the target frequency or frequency range; and determining that the duration exceeds a predetermined threshold.

In an embodiment of the first aspect, the method may further include storing patterns associated with known tampering in a database, and determining the occurrence of tampering may further include matching a pattern of the audio data to at least one of the patterns associated with known tampering.

In an embodiment of the first aspect, the audio data is first audio data, the method may further include calculating a location of tampering, and calculating the location of tampering may include analyzing, by the first computing device, second audio data collected by a second microphone.

In an embodiment of the first aspect, the A/V recording and communication device is a first A/V recording and communication device, and a second A/V recording and communication device may include the second microphone, and the method may further include receiving, by the first computing device, the second audio data from the second A/V recording and communication device.

In an embodiment of the first aspect, determining the occurrence of tampering may further include at least one of waveform analysis of the audio data, or deriving frequency components of the audio data using a fast Fourier transform.

In an embodiment of the first aspect, determining the occurrence of tampering may further include calculating a frequency-domain representation of the audio data; extracting audio data features from the frequency-domain representation; and inputting the audio data features into a computer model.

In an embodiment of the first aspect, the computer model may include a neural network.

In an embodiment of the first aspect, the method may further include training the neural network, the audio data is first audio data, and the training is based on second audio data collected by the microphone of the A/V recording and communication device prior to receiving the first audio data.

In an embodiment of the first aspect, the method may further include receiving user input regarding tampering associated with the first audio data, and the training is further based on the user input.

In an embodiment of the first aspect, extracting audio data features from the frequency-domain representation may include calculating mel-frequency cepstral coefficients of the audio data.

In an embodiment of the first aspect, the method may further include determining an output from the neural network, and determining that the audio data contains data indicative of tampering may further include comparing the determined output to a threshold.

In an embodiment of the first aspect, the method may further include, in response to determining the occurrence of tampering, causing the A/V recording and communication device to transmit video data to the first computing device.

In an embodiment of the first aspect, the A/V recording and communication device is a first A/V recording and communication device, and the method may further include, in response to determining the occurrence of tampering, causing a second A/V recording and communication device that is geographically proximate the first A/V recording and communication device to transmit data collected by the second A/V recording and communication device to the first computing device.

In an embodiment of the first aspect, the data collected by the second A/V recording and communication device may include audio data.

In an embodiment of the first aspect, the data collected by the second A/V recording and communication device may further include video data.

In an embodiment of the first aspect, the method may further include in response to determining the occurrence of tampering, transmitting a request for first data collected by a second computing device; and receiving the first data, and the first data may include audio data collected by a sensor of the second computing device.

In an embodiment of the first aspect, the A/V recording and communication device may further include a camera, and the method may further include, in response to determining the occurrence of tampering, causing the camera to initiate streaming of video data to the first computing device.

In an embodiment of the first aspect, the A/V recording and communication device is a first A/V recording and communication device, and a second A/V recording and communication device that is geographically proximate the first A/V recording and communication device may include a camera, and the method may further include, in response to determining the occurrence of tampering: causing the second A/V recording and communication device to record video data using the camera; and causing the second A/V recording and communication device to transmit the video data to the first computing device.

In an embodiment of the first aspect, determining the occurrence of tampering may further include analyzing audio data collected by a microphone of the second A/V recording and communication device.

In an embodiment of the first aspect, the method may further include, in response to determining the occurrence of tampering, causing a security system associated with the A/V recording and communication device to arm.

In an embodiment of the first aspect, the method may further include, in response to determining the occurrence of tampering, causing a security system associated with the A/V recording and communication device to sound an alarm; and causing the client device to play a sound.

In an embodiment of the first aspect, the method may further include, in response to determining the occurrence of tampering, determining whether the A/V recording and communication device is outside of a wireless communication range of the security system; and in response to determining that the A/V recording and communication device is outside of the wireless communication range, causing the A/V recording and communication device to sound or continue sounding an alarm.

In an embodiment of the first aspect, the A/V recording and communication device is a first A/V recording and communication device, and the method may further include, in response to determining the occurrence of tampering, causing a security system associated with a second A/V recording and communication device that is geographically proximate the first A/V recording and communication device to arm.

In an embodiment of the first aspect, the notification is a first notification, and the method may further include, in response to determining the occurrence of tampering, causing a second notification to be transmitted to a second computing device configured to monitor for emergency events.

In a second aspect, an audio/video (A/V) recording and communication device is provided. The A/V recording and communication device may include a microphone configured to capture audio data; a camera; at least one processor; and memory storing instructions configured to instruct the at least one processor to determine an occurrence of tampering, wherein determining the occurrence of tampering may include determining that the audio data contains data indicative of tampering; and in response to determining the occurrence of tampering, perform at least one of transmitting the audio data to a computing device associated with the A/V recording and communication device; transmitting, to the computing device, an indication that tampering has been detected; or causing a notification of tampering to be transmitted to a client device associated with the A/V recording and communication device.

In an embodiment of the second aspect, the A/V recording and communication device may further include an infrared sensor, and determining the occurrence of tampering may further include analyzing data collected by the infrared sensor.

In an embodiment of the second aspect, the instructions are further configured to instruct the at least one processor to, in response to determining the occurrence of tampering, perform at least one of: causing the camera to initiate streaming of video data to the computing device; playing a message using a speaker of the A/V recording and communication device; or changing an operational state of a light of the A/V recording and communication device.

In an embodiment of the second aspect, the instructions are further configured to instruct the at least one processor to, in response to determining the occurrence of tampering, cause activation of an alarm, and disable user control of the A/V recording and communication device until authentication data associated with the client device is authenticated by the A/V recording and communication device, the computing device, or the client device.

In an embodiment of the second aspect, the authentication data is an audio or text password, and the instructions are further configured to instruct the at least one processor to disable the alarm in response to authentication of the password.

In an embodiment of the second aspect, determining the occurrence of tampering is performed when the A/V recording and communication device is in an armed mode.

In an embodiment of the second aspect, the instructions are further configured to instruct the at least one processor to extract a frequency or amplitude feature from the audio data, collect video data from the camera, extract a video feature from the video data, and analyze, by at least one classifier, the frequency or amplitude feature, and the video feature.

In an embodiment of the second aspect, the at least one classifier may include a Gaussian mixture model (GMM) classifier.

In an embodiment of the second aspect, the instructions are further configured to instruct the at least one processor to extract an amplitude component from the audio data; and determine that the amplitude component is indicative of touching the microphone.

In an embodiment of the second aspect, the instructions are further configured to instruct the at least one processor to extract a frequency component from the audio data; and determining that the audio data contains data indicative of tampering may include determining that the frequency component exceeds a predetermined threshold.

In an embodiment of the second aspect, determining the occurrence of tampering may further include training a computer model using at least one of supervised or unsupervised learning; and analyzing the audio data using the computer model.

In an embodiment of the second aspect, the audio data is first audio data, and the training is based on second audio data collected by the microphone prior to capturing the first audio data.

In an embodiment of the second aspect, analyzing the audio data using the computer model may include geometric matching to determine a match to the audio data; and in response to determining the match, performing additional analysis of the audio data using the computer model.

In an embodiment of the second aspect, determining that the audio data from the microphone contains data indicative of the tampering may include calculating a frequency-domain representation of the audio data; extracting audio data features from the frequency-domain representation; and inputting the audio data features into a computer model.

In an embodiment of the second aspect, the computer model may include a neural network.

In an embodiment of the second aspect, extracting audio data features from the frequency-domain representation may include calculating mel-frequency cepstral coefficients of the audio data.

In a third aspect, a method for detecting tampering based on video data collected from a camera of an audio/video (A/V) recording and communication device is provided. The method may include receiving, by a first computing device, the video data from the A/V recording and communication device, wherein the video data includes a plurality of frames; and determining, by the first computing device, an occurrence of tampering with the A/V recording and communication device. Determining the occurrence of tampering may include analyzing the video data, and analyzing the video data may include at least one of histogram analysis or edge analysis for a first frame of the plurality of frames. Determining the occurrence of tampering may further include, based on analyzing the video data, determining that the video data contains data indicative of tampering. The method may further include, in response to determining the occurrence of tampering, causing a notification of tampering to be transmitted to a client device associated with the A/V recording and communication device.

In an embodiment of the third aspect, the method may further include determining a background frame from the video data, and the histogram analysis may be based on a comparison of the first frame to the background frame.

In an embodiment of the third aspect, the histogram analysis may further include determining a plurality of bins of a histogram for the first frame, each bin having a respective bin value; selecting at least one bin of the plurality of bins based on at least one bin value; and comparing pixel intensity values of the first frame to pixel intensity values of the background frame for corresponding frame positions.

In an embodiment of the third aspect, the histogram analysis may further include comparing pixel intensity values of the first frame to pixel intensity values of the background frame to provide difference values; selecting a first number of the difference values to provide a first set; selecting a second number of the difference values to provide a second set, wherein the second number is less than the first number; calculating a first sum of the difference values in the first set; calculating a second sum of the difference values in the second set; and comparing the first sum to the second sum.

In an embodiment of the third aspect, comparing the first sum to the second sum may include adjusting the second sum by a threshold value.

In an embodiment of the third aspect, the method may further include determining a background frame from the video data, and the edge analysis may be based on a comparison of the first frame to the background frame.

In an embodiment of the third aspect, the edge analysis may further include building a first edges mask based on the first frame; building a second edges mask based on the background frame; and comparing the first edges mask and the second edges mask.

In an embodiment of the third aspect, building the first edges mask may include downscaling the first frame.

In an embodiment of the third aspect, the method may further include traversing the first frame using a window size; for each instance, based on the window size, of a window during traversing the first frame, calculating a total number of edges for the respective instance; comparing the total number of edges for each respective instance to a first threshold; based on comparing the total number of edges for each respective instance to the first threshold, setting a value for each respective instance; and calculating a sum of the values for the respective instances. Determining that the video data contains data indicative of tampering may include comparing the sum of the values for the respective instances to a second threshold.

In an embodiment of the third aspect, the method may further include, based on analysis of the first frame, storing a first tampering result in a queue; and determining a total number of tampering results stored in the queue. Determining that the video data contains data indicative of tampering may include comparing the total number of tampering results to a predetermined value.

In an embodiment of the third aspect, the method may further include determining a background frame from the video data, and updating the background frame after analyzing the first frame.

In an embodiment of the third aspect, updating the background frame may include determining whether each respective pixel of the background frame is moving; and updating an intensity value for each respective pixel of the background frame, wherein the intensity value for the respective pixel is unchanged in response to determining that the respective pixel is moving, and the intensity value for the respective pixel is changed in response to determining that the respective pixel is not moving.

In an embodiment of the third aspect, determining whether each respective pixel of the background frame is moving may include determining a change in intensity value for each respective pixel of the background frame as compared to a previous background frame, and comparing the change in intensity value to a respective adaptive threshold corresponding to each respective pixel.

In an embodiment of the third aspect, the method may further include, after updating the intensity value for each respective pixel of the background frame, updating the respective adaptive threshold for each respective pixel.

In an embodiment of the third aspect, determining the occurrence of tampering may further include determining that audio data collected by a microphone of the A/V recording and communication device contains data indicative of tampering.

In an embodiment of the third aspect, determining the occurrence of tampering may further include analyzing data collected by a sensor of the A/V recording and communication device, wherein the sensor is configured to detect motion of the A/V recording and communication device and/or motion of a person or object.

In an embodiment of the third aspect, analyzing the video data may further include detecting a blocking or an obscuring of a lens of the camera.

In an embodiment of the third aspect, the A/V recording and communication device is a first A/V recording and communication device, the camera is a first camera, the video data is first video data, and a second A/V recording and communication device includes a second camera. The method may further include receiving, by the first computing device, second video data from the second A/V recording and communication device; and determining the occurrence of tampering may further include analyzing the second video data.

In an embodiment of the third aspect, the method may further include, in response to determining the occurrence of tampering, causing the A/V recording and communication device to transmit at least one of audio data or video data to the first computing device.

In an embodiment of the third aspect, the A/V recording and communication device is a first A/V recording and communication device, and the method may further include, in response to determining the occurrence of tampering, causing a second A/V recording and communication device that is geographically proximate the first A/V recording and communication device to transmit data collected by the second A/V recording and communication device to the first computing device.

In an embodiment of the third aspect, the data collected by the second A/V recording and communication device may include video data.

In an embodiment of the third aspect, the data collected by the second A/V recording and communication device may further include audio data.

In an embodiment of the third aspect, the method may further include, in response to determining the occurrence of tampering, transmitting a request for first data collected by a second computing device; and receiving the first data, wherein the first data is based on data collected by a sensor of the second computing device.

In an embodiment of the third aspect, the A/V recording and communication device may further include a microphone, and the method may further include, in response to determining the occurrence of tampering, causing the A/V recording and communication device to transmit audio data captured by the microphone to the first computing device.

In an embodiment of the third aspect, the A/V recording and communication device is a first A/V recording and communication device, the video data is first video data, the camera is a first camera, and a second A/V recording and communication device that is geographically proximate the first A/V recording and communication device may include a second camera, and the method may further include, in response to determining the occurrence of tampering, causing the second A/V recording and communication device to record second video data using the second camera, and causing the second A/V recording and communication device to transmit the second video data to the first computing device.

In an embodiment of the third aspect, determining the occurrence of tampering may further include analyzing video and/or audio data collected by the second A/V recording and communication device.

In an embodiment of the third aspect, the method may further include, in response to determining the occurrence of tampering, causing a security system associated with the A/V recording and communication device to arm.

In an embodiment of the third aspect, the method may further include, in response to determining the occurrence of tampering, causing a security system associated with the A/V recording and communication device to sound an alarm, or causing the client device to provide a user notification at the client device.

In an embodiment of the third aspect, the A/V recording and communication device is a first A/V recording and communication device, and the method may further include, in response to determining the occurrence of tampering, causing a security system associated with a second A/V recording and communication device that is geographically proximate the first A/V recording and communication device to arm.

In a fourth aspect, a method for detecting tampering based on video data collected from a camera of an audio/video (A/V) recording and communication device is provided. The method may include receiving, by a first computing device, the video data from the A/V recording and communication device, wherein the video data includes a plurality of frames; and determining, by the first computing device, an occurrence of tampering with the A/V recording and communication device. Determining the occurrence of tampering may include analyzing the video data, analyzing the video data may include analysis for at least one of the plurality of frames, and determining the occurrence of tampering may further include, based on analyzing the video data, determining that the video data contains data indicative of tampering.

In an embodiment of the fourth aspect, the analysis for at least one of the plurality of frames is histogram analysis, and the method may further include determining a background frame from the video data, wherein the histogram analysis is based on a comparison of a first frame of the plurality of frames to the background frame.

In an embodiment of the fourth aspect, the analysis for at least one of the plurality of frames is edge analysis, and the method may further include determining a background frame from the video data, wherein the edge analysis is based on a comparison of a first frame of the plurality of frames to the background frame.

In an embodiment of the fourth aspect, the method may further include, based on analysis of a first frame of the plurality of frames, storing a first tampering result in a queue; determining a total number of tampering results stored in the queue; and comparing the total number of tampering results to a predetermined value.

In an embodiment of the fourth aspect, the method may further include determining a background frame from the video data, and updating the background frame after analyzing a first frame of the plurality of frames.

In an embodiment of the fourth aspect, the method may further include determining that audio data collected by a microphone of the A/V recording and communication device contains data indicative of tampering.

In an embodiment of the fourth aspect, analyzing the video data may further include detecting a blocking or an obscuring of a view of the camera.

In an embodiment of the fourth aspect, the A/V recording and communication device is a first A/V recording and communication device, the camera is a first camera, the video data is first video data, and a second A/V recording and communication device includes a second camera. The method may further include receiving, by the first computing device, second video data from the second A/V recording and communication device; and analyzing the second video data.

In an embodiment of the fourth aspect, the method may further include, in response to determining the occurrence of tampering, causing the A/V recording and communication device to transmit at least one of audio data or video data to the first computing device.

In an embodiment of the fourth aspect, the A/V recording and communication device is a first A/V recording and communication device, and the method may further include, in response to determining the occurrence of tampering, causing a second A/V recording and communication device to transmit data collected by the second A/V recording and communication device to the first computing device.

In an embodiment of the fourth aspect, the method may further include transmitting a request for data collected by a sensor of a second computing device.

In an embodiment of the fourth aspect, the A/V recording and communication device may further include a microphone, and the method may further include causing the A/V recording and communication device to transmit audio data captured by the microphone to the first computing device.

In an embodiment of the fourth aspect, the A/V recording and communication device is a first A/V recording and communication device, the video data is first video data, and the method may further include, in response to determining the occurrence of tampering, causing a second A/V recording and communication device to record second video data.

In an embodiment of the fourth aspect, the method may further include, in response to determining the occurrence of tampering, causing a security system associated with the A/V recording and communication device to arm.

In an embodiment of the fourth aspect, the method may further include, in response to determining the occurrence of tampering, causing a security system associated with the A/V recording and communication device to sound an alarm.

In an embodiment of the fourth aspect, the A/V recording and communication device is a first A/V recording and communication device, and the method may further include, causing a security system associated with a second A/V recording and communication device to arm.

In a fifth aspect, an audio/video (A/V) recording and communication device is provided. The A/V recording and communication device may include a microphone; a camera configured to capture video data, the video data comprising a plurality of frames; at least one processor; and memory storing instructions configured to instruct the at least one processor to determine an occurrence of tampering with the A/V recording and communication device, wherein determining the occurrence of tampering may include analyzing the video data, the analyzing comprising at least one of histogram analysis or edge analysis for a first frame of the plurality of frames; and in response to determining the occurrence of tampering, perform at least one of transmitting the video data to a computing device associated with the A/V recording and communication device; transmitting, to the computing device, an indication that tampering has been detected; or causing a notification of tampering to be transmitted to a client device associated with the A/V recording and communication device.

In an embodiment of the fifth aspect, the instructions are further configured to instruct the at least one processor to, in response to determining the occurrence of tampering, perform at least one of causing the camera to initiate streaming of video data to the computing device, playing a message using a speaker of the A/V recording and communication device, or changing an operational state of a light of the A/V recording and communication device.

In an embodiment of the fifth aspect, determining the occurrence of tampering may further include training a computer model using at least one of supervised or unsupervised learning, and analyzing the video data using the computer model.

In an embodiment of the fifth aspect, the computer model may include a neural network.

In an embodiment of the fifth aspect, the instructions are further configured to instruct the at least one processor to determine a background frame from the video data, wherein the histogram analysis is based on a comparison of the first frame to the background frame.

In an embodiment of the fifth aspect, the histogram analysis may further include determining a plurality of bins of a histogram for the first frame, each bin having a respective bin value; selecting at least one bin of the plurality of bins based on at least one bin value; and comparing pixel intensity values of the first frame to pixel intensity values of the background frame for corresponding frame positions.

In an embodiment of the fifth aspect, the histogram analysis may further include comparing pixel intensity values of the first frame to pixel intensity values of the background frame to provide difference values; selecting a first number of the difference values to provide a first set; selecting a second number of the difference values to provide a second set, wherein the second number is less than the first number; calculating a first sum of the difference values in the first set; calculating a second sum of the difference values in the second set; and comparing the first sum to the second sum.

In an embodiment of the fifth aspect, comparing the first sum to the second sum may include adjusting the second sum by a threshold value.

In an embodiment of the fifth aspect, the instructions are further configured to instruct the at least one processor to determine a background frame from the video data, and the edge analysis is based on a comparison of the first frame to the background frame.

In an embodiment of the fifth aspect, the edge analysis may further include building a first edges mask based on the first frame, building a second edges mask based on the background frame, and comparing the first edges mask and the second edges mask.

In an embodiment of the third aspect, building the first edges mask may include downscaling the first frame.

In an embodiment of the fifth aspect, the instructions are further configured to instruct the at least one processor to traverse the first frame using a window size; for each instance, based on the window size, of a window during traversing the first frame, calculate a total number of edges for the respective instance; compare the total number of edges for each respective instance to a first threshold; based on comparing the total number of edges for each respective instance to the first threshold, set a value for each respective instance; calculate a sum of the values for the respective instances; and compare the sum of the values for the respective instances to a second threshold.

In an embodiment of the fifth aspect, the instructions are further configured to instruct the at least one processor to determine a background frame from the video data, and update the background frame after analyzing the first frame.

In an embodiment of the fifth aspect, updating the background frame may include determining whether each respective pixel of the background frame is moving; and updating an intensity value for each respective pixel of the background frame, wherein the intensity value for the respective pixel is unchanged in response to determining that the respective pixel is moving, and the intensity value for the respective pixel is changed in response to determining that the respective pixel is not moving.

In an embodiment of the fifth aspect, determining whether each respective pixel of the background frame is moving may include determining a change in intensity value for each respective pixel of the background frame as compared to a previous background frame, and comparing the change in intensity value to a respective adaptive threshold corresponding to each respective pixel.

In an embodiment of the fifth aspect, the instructions are further configured to instruct the at least one processor to, in response to determining the occurrence of tampering, cause the A/V recording and communication device to transmit audio data captured by the microphone to the computing device.

In an embodiment of the fifth aspect, the A/V recording and communication device is a first A/V recording and communication device, and the instructions are further configured to instruct the at least one processor to, in response to determining the occurrence of tampering, cause a security system associated with a second A/V recording and communication device that is geographically proximate the first A/V recording and communication device to arm.

In a sixth aspect, an audio/video (A/V) recording and communication device is provided. The A/V recording and communication device may include a microphone; a camera configured to capture video data, the video data comprising a plurality of frames; at least one processor; and memory storing instructions configured to instruct the at least one processor to determine an occurrence of tampering with the A/V recording and communication device. Determining the occurrence of tampering may include analyzing at least one of the plurality of frames.

In an embodiment of the sixth aspect, the instructions are further configured to instruct the at least one processor to, in response to determining the occurrence of tampering, cause the camera to initiate streaming of video data to a computing device.

In an embodiment of the sixth aspect, determining the occurrence of tampering may further include analyzing the video data using at least one neural network.

In an embodiment of the sixth aspect, analyzing at least one of the plurality of frames may include histogram analysis for a first frame of the plurality of frames, and the instructions are further configured to instruct the at least one processor to determine a background frame from the video data, wherein the histogram analysis is based on a comparison of the first frame to the background frame.

In an embodiment of the sixth aspect, analyzing at least one of the plurality of frames may include edge analysis for a first frame of the plurality of frames, and the instructions are further configured to instruct the at least one processor to determine a background frame from the video data, wherein the edge analysis is based on a comparison of the first frame to the background frame.

In an embodiment of the sixth aspect, the edge analysis may further include building a first edges mask based on the first frame, building a second edges mask based on the background frame, and comparing the first edges mask and the second edges mask.

In an embodiment of the sixth aspect, the instructions are further configured to instruct the at least one processor to traverse the first frame; for each instance of a window during traversing the first frame, calculate a total number of edges for the respective instance; and compare the total number of edges for each respective instance to a first threshold.

In an embodiment of the sixth aspect, the instructions are further configured to instruct the at least one processor to determine a background frame from the video data, and update the background frame after analyzing a first frame of the plurality of frames.

In an embodiment of the sixth aspect, updating the background frame may include determining whether each respective pixel of the background frame is moving.

In an embodiment of the sixth aspect, the instructions are further configured to instruct the at least one processor to, in response to determining the occurrence of tampering, transmit audio data to a computing device.

In an embodiment of the sixth aspect, the A/V recording and communication device is a first A/V recording and communication device, and the instructions are further configured to instruct the at least one processor to, in response to determining the occurrence of tampering, cause a security system associated with a second A/V recording and communication device to arm.

The foregoing summary is illustrative only and is not intended to be in any way limiting. In addition to the illustrative aspects, embodiments, and features described above, further aspects, embodiments, and features will become apparent by reference to the figures and the rest of the detailed description and the accompanying drawings.

What is claimed is:

1. A method for detecting tampering with an audio/video recording and communication device (A/V device), the method comprising:
   receiving, by a computing device, audio data from the A/V device, wherein the audio data is representative of audio captured by a microphone of the A/V device;
   determining, by the computing device, an occurrence of tampering with the A/V device, wherein:
      the determining of the occurrence of tampering comprises determining, based on the audio data, that the audio captured by the microphone of the A/V device comprises at least one characteristic indicative of a sound associated with tampering; and
      the at least one characteristic is at least one of a frequency, a combination of frequencies, or an amplitude; and
   transmitting, based on the determining of the occurrence of tampering a notification of tampering to a client device associated with the A/V device.

2. The method of claim 1, wherein the determining the occurrence of tampering further comprises:
   detecting a target frequency or frequency range associated with the audio represented in the audio data; and
   determining that the target frequency or the frequency range was detected for at least a predetermined threshold amount of time.

3. The method of claim 1, wherein the determining of the occurrence of tampering further comprises matching a pattern of the audio data to at least one of a plurality of patterns indicative of tampering stored in a memory.

4. The method of claim 1, further comprising:
   determining a geographic location of the occurrence of tampering, the geographic location comprising at least one of a ZIP code, latitude/longitude coordinates, cross-streets, bounding streets, or geographic features; and
   transmitting the geographic location to at least one of the client device or an emergency services device.

5. The method of claim 1, wherein the determining of the occurrence of tampering further comprises at least one of applying a waveform analysis to the audio data or deriving frequency components from the audio data using a fast Fourier transform.

6. The method of claim 1, wherein the determining of the occurrence of tampering further comprises:
generating a frequency-domain representation of the audio data representative of the audio captured by the microphone;
determining audio data features based on the frequency-domain representation of the audio data; and
inputting the audio data features into a computer model, wherein the computer model comprises a neural network.

7. The method of claim 6, wherein the audio is first audio, the audio data is first audio data, and wherein the method further comprises training the neural network using second audio data representative of second audio captured by the microphone of the A/V device prior to the microphone of the A/V device capturing the first audio.

8. The method of claim 7, further comprising receiving input data indicative of a user input identifying the first audio data as an instance of tampering, wherein the neural network is further trained using the input data indicative of the user input.

9. The method of claim 6, wherein the determining the audio data features based on the frequency-domain representation comprises calculating mel-frequency cepstral coefficients based on the audio data.

10. The method of claim 6, wherein the determining that the audio data is indicative of the occurrence of the tampering further comprises comparing the determined output to a threshold.

11. The method of claim 1, wherein the A/V device is a first A/V device, the method further comprising:
in response to determining the occurrence of tampering:
causing a second A/V device that is geographically proximate the first A/V device to transmit data collected by the second A/V device to the first computing device.

12. The method of claim 1, wherein the A/V device is a first A/V device, and further wherein the method comprises:
sending, from the computing device to a second A/V device, an instruction to capture video using a second camera of the second A/V device, wherein the second A/V device is geographically proximate to the first A/V device; and
receiving, by the computing device form the second A/V device, video data representative of the video captured using the second camera of the second A/V device.

13. The method of claim 12, wherein the audio data is first audio data, the audio is first audio, the microphone is a first microphone, and further wherein the determining of the occurrence of tampering further comprises analyzing second audio data representative of second audio captured by a second microphone of the second A/V device.

14. An audio/video recording and communication device (A/V device), comprising:
a microphone;
a camera;
a processor; and
memory having instructions stored thereon that, upon execution by the processor, cause the processor to:
capture audio using the microphone;
determine an occurrence of tampering by identifying data indicative of tampering in audio data representative of the audio captured by the microphone, wherein the data indicative of tampering is indicative of a sound associated with tampering in the audio captured by the microphone; and
based on the determination of the occurrence of tampering, transmit at least one of:
the audio data to a computing device associated with the A/V device;
an indication to the computing device that the occurrence of tampering has been detected; or
a notification of tampering to a client device associated with the A/V device.

15. The A/V device of claim 14, wherein the instructions, upon execution by the processor, further cause the processor to, based on the determination of the occurrence of tampering:
initiate streaming of video data to the computing device, wherein the video data is representative of video captured by the camera;
play an audio message using a speaker of the A/V device; or
change an operational state of a light of the A/V device.

16. The A/V device of claim 14, wherein the instructions, upon execution by the processor, further cause the processor to, based on the determination of the occurrence of tampering:
activate an alarm; and
disable at least one functionality of the A/V device until authentication data associated with the client device is authenticated by the A/V device, the computing device, or the client device.

17. The A/V device of claim 16, wherein the authentication data comprises an audio or text password, and wherein the instructions, upon execution by the processor, further cause the processor to disable the alarm based on authentication of the audio or text password.

18. The A/V device of claim 14, wherein the instructions, upon execution by the processor, further cause the processor to:
extract an amplitude component from the audio data and determine that the amplitude component is indicative of touching of the A/V device, wherein the data indicative of tampering comprises the amplitude component; or
extract a frequency component from the audio data and determine that the frequency component exceeds a predetermined threshold indicative of tampering, wherein the data indicative of tampering comprises the frequency component.

19. The A/V device of claim 14, wherein the determination of the occurrence of tampering further comprises:
training a computer model using at least one of supervised or unsupervised learning to identify the data indicative of tampering; and
analyzing the audio data using the computer model to identify the data indicative of tampering.

20. The A/V device of claim 14, wherein the determination of the occurrence of tampering further comprises:
generating a frequency-domain representation of the audio data;
determining audio data features based on the frequency-domain representation by calculating mel-frequency cepstral coefficients of the audio data; and
inputting the audio data features into a computer model, wherein the computer model comprises a neural network.

21. The method of claim 6, wherein the determining the audio data features based on the frequency-domain representation comprises:
- generating transformed audio data by performing a Fourier transform on the audio data;
- calculating mel-frequency cepstral coefficients (MFCCs) based on the transformed audio data; and
- calculating at least one of a delta or a double delta based on the transformed audio data.

\* \* \* \* \*